US010869003B2

(12) United States Patent
Kirmani et al.

(10) Patent No.: US 10,869,003 B2
(45) Date of Patent: *Dec. 15, 2020

(54) USING A SCENE ILLUMINATING INFRARED EMITTER ARRAY IN A VIDEO MONITORING CAMERA FOR DEPTH DETERMINATION

(71) Applicant: Google LLC, Mountain View, CA (US)

(72) Inventors: Ghulam Ahmed Kirmani, Mountain View, CA (US); Andrea Colaco, Mountain View, CA (US); Dongeek Shin, Cambridge, MA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,447

(22) Filed: Aug. 19, 2019

(65) Prior Publication Data

US 2019/0387202 A1  Dec. 19, 2019

Related U.S. Application Data

(63) Continuation of application No. 15/900,766, filed on Feb. 20, 2018, now Pat. No. 10,389,986, which is a (Continued)

(51) Int. Cl.
  *H04N 7/18* (2006.01)
  *H04N 5/33* (2006.01)
  (Continued)

(52) U.S. Cl.
  CPC ......... *H04N 7/183* (2013.01); *G06K 9/00201* (2013.01); *G06K 9/00771* (2013.01);
  (Continued)

(58) Field of Classification Search
  CPC .......... G06K 9/00201; G06K 9/00771; G06K 9/2018; G06K 9/2027; G06K 9/2036;
  (Continued)

(56) References Cited

U.S. PATENT DOCUMENTS 2,997,935 A  8/1961 Scheffold
3,782,260 A  1/1974 Ettiseher et al.
(Continued)

FOREIGN PATENT DOCUMENTS

GB       2492833 A       1/2013
WO  WO 2005/004035 A2   1/2005
WO  WO 2005/034505 A1   4/2005

OTHER PUBLICATIONS

0308 Brand USB 2.0 HD Night Vision Webcam Web Cam Camera Webcamera With Microphone Sucker Stand for PC Computer Laptop Notebook, Dec. 18, 2015, 13 pgs.
(Continued)

*Primary Examiner* — Anner N Holder
(74) *Attorney, Agent, or Firm* — Morgan, Lewis & Bockius LLP

(57) ABSTRACT

A method generates depth maps at a camera having illuminators, a lens assembly, an image sensing element, a processor, and memory. The illuminators operate in a first mode to provide illumination, the lens assembly focuses incident light on the image sensing element, the memory stores programs for execution by the processor, and the processor executes the programs to control operation of the camera. The method reconfigures the illuminators to operate in a second mode, where each of a plurality of subsets of the illuminators provides illumination of a scene separately. For each subset, the process activates the illuminators in the subset without activating illuminators not in the subset and receives reflected illumination from the scene incident on the lens assembly and focused onto the image sensing
(Continued)

element. The measured light intensity values of the received reflected illumination at the image sensing element are transmitted to a remote server for processing.

20 Claims, 61 Drawing Sheets

Related U.S. Application Data continuation of application No. 14/740,205, filed on Jun. 15, 2015, now Pat. No. 9,900,560, which is a continuation of application No. 14/738,818, filed on Jun. 12, 2015, now Pat. No. 9,454,820.

(51) Int. Cl.
*H04N 5/222* (2006.01)
*H04N 5/225* (2006.01)
*G06T 7/50* (2017.01)
*G06T 7/586* (2017.01)
*G06K 9/00* (2006.01)
*G06K 9/20* (2006.01)
*G06K 9/46* (2006.01)
*G06K 9/52* (2006.01)

(52) U.S. Cl.
CPC .......... *G06K 9/2018* (2013.01); *G06K 9/2027* (2013.01); *G06K 9/2036* (2013.01); *G06K 9/4661* (2013.01); *G06K 9/52* (2013.01); *G06T 7/50* (2017.01); *G06T 7/586* (2017.01); *H04N 5/2226* (2013.01); *H04N 5/2256* (2013.01); *H04N 5/33* (2013.01); *H04N 7/18* (2013.01); *H04N 7/181* (2013.01); *G06T 2207/10048* (2013.01); *G06T 2207/10152* (2013.01); *G06T 2207/30232* (2013.01)

(58) Field of Classification Search
CPC ............... G06K 9/4661; G06K 9/52; G06T 2207/10048; G06T 2207/10152; G06T 2207/30232; G06T 7/50; G06T 7/586; H04N 5/2226; H04N 5/2256; H04N 5/33; H04N 7/18; H04N 7/181; H04N 7/183
See application file for complete search history.

(56) References Cited

U.S. PATENT DOCUMENTS

| | | | |
|---|---|---|---|
| D349,914 S | 8/1994 | Usui | |
| D357,267 S | 4/1995 | Yotsuya | |
| D372,490 S | 8/1996 | Sheffield et al. | |
| 5,604,534 A | 2/1997 | Hedges | |
| D385,571 S | 10/1997 | Abrams | |
| 5,862,428 A | 1/1999 | An | |
| 5,963,253 A | 10/1999 | Dwyer | |
| 5,978,028 A | 11/1999 | Yamane | |
| 5,995,273 A | 11/1999 | Chandrasekhar | |
| 6,033,592 A | 3/2000 | Chandrasekhar | |
| 6,088,470 A * | 7/2000 | Camus ................. | A61B 3/156 382/117 |
| D429,269 S | 8/2000 | Renkis | |
| D429,743 S | 8/2000 | Renkis | |
| 6,141,052 A | 10/2000 | Fukumitsu | |
| 6,147,701 A | 11/2000 | Tamura et al. | |
| D442,202 S | 5/2001 | Pfeifer | |
| D445,123 S | 7/2001 | Shen | |
| 6,268,882 B1 | 7/2001 | Elberbaum | |
| D446,534 S | 8/2001 | Zimmer | |
| 6,271,752 B1 | 8/2001 | Vaios | |
| D447,758 S | 9/2001 | Lin et al. | |
| D449,630 S | 10/2001 | Rak et al. | |
| D452,259 S | 12/2001 | Choi | |
| 6,357,936 B1 | 3/2002 | Elberbaum | |
| D455,164 S | 4/2002 | Tsang et al. | |
| 6,462,781 B1 | 10/2002 | Arnold | |
| D467,952 S | 12/2002 | Nakamura | |
| D469,775 S | 2/2003 | Bradley | |
| D470,874 S | 2/2003 | Chiu | |
| D470,875 S | 2/2003 | Liao | |
| 6,515,275 B1 | 2/2003 | Hunter et al. | |
| 6,634,804 B1 | 10/2003 | Toste et al. | |
| 6,650,694 B1 | 11/2003 | Brown et al. | |
| 6,678,001 B1 | 1/2004 | Elberbaum | |
| 6,714,236 B1 | 3/2004 | Wada | |
| 6,714,286 B1 | 3/2004 | Wheel | |
| 6,727,954 B1 | 4/2004 | Okada et al. | |
| D489,388 S | 5/2004 | Saito et al. | |
| 6,762,790 B1 | 7/2004 | Matko et al. | |
| D511,352 S | 11/2005 | Oliver et al. | |
| 7,034,884 B2 | 4/2006 | Misawa | |
| 7,066,664 B1 | 6/2006 | Sitoh et al. | |
| 7,076,162 B2 | 7/2006 | Yamashita | |
| D527,755 S | 9/2006 | Wu | |
| 7,151,565 B1 | 12/2006 | Wada | |
| D534,938 S | 1/2007 | Beasley et al. | |
| D537,097 S | 2/2007 | Freeman | |
| D542,320 S | 5/2007 | Cheng | |
| D552,649 S | 10/2007 | Logan et al. | |
| D552,659 S | 10/2007 | Stephens et al. | |
| D555,692 S | 11/2007 | Liu et al. | |
| 7,290,740 B2 | 11/2007 | Joy et al. | |
| D558,250 S | 12/2007 | Hsia | |
| D563,446 S | 3/2008 | Stephens et al. | |
| D575,316 S | 8/2008 | Liu et al. | |
| 7,443,446 B2 | 10/2008 | Seo | |
| 7,552,340 B2 | 6/2009 | Ooi et al. | |
| 7,586,537 B2 | 9/2009 | Konishi et al. | |
| D606,105 S | 12/2009 | Hinkel | |
| 7,646,425 B2 | 1/2010 | Bohaker et al. | |
| 7,649,472 B1 * | 1/2010 | Paterno ............... | F21V 33/0076 307/116 |
| D610,601 S | 2/2010 | Melder | |
| D614,223 S | 4/2010 | Kim et al. | |
| 7,705,882 B2 | 4/2010 | Engel et al. | |
| 7,741,788 B2 | 6/2010 | Ito | |
| D627,815 S | 11/2010 | Oba | |
| D628,223 S | 11/2010 | Kao | |
| 7,874,917 B2 * | 1/2011 | Marks .................. | G06F 3/0304 463/36 |
| 7,930,369 B2 | 4/2011 | Marriott et al. | |
| D638,461 S | 5/2011 | Kim et al. | |
| 7,986,369 B1 | 7/2011 | Burns | |
| D648,766 S | 11/2011 | Chen | |
| D651,229 S | 12/2011 | Tan et al. | |
| D651,230 S | 12/2011 | Tan et al. | |
| 8,072,536 B1 | 12/2011 | Campbell | |
| D651,633 S | 1/2012 | Park et al. | |
| 8,139,122 B2 | 3/2012 | Rolston | |
| D657,410 S | 4/2012 | Helaoui et al. | |
| 8,165,146 B1 | 4/2012 | Melick et al. | |
| 8,174,972 B2 | 5/2012 | Cernius et al. | |
| 8,359,622 B1 | 1/2013 | Everson | |
| D678,929 S | 3/2013 | Hancock | |
| 8,402,145 B2 | 3/2013 | Holden et al. | |
| 8,432,485 B1 | 4/2013 | Martinez et al. | |
| D687,085 S | 7/2013 | Manson | |
| 8,504,707 B2 | 8/2013 | Toebes et al. | |
| 8,520,069 B2 | 8/2013 | Haler | |
| D694,305 S | 11/2013 | Katori et al. | |
| D697,119 S | 1/2014 | Park et al. | |
| 8,625,024 B2 | 1/2014 | Hsu | |
| D700,232 S | 2/2014 | Ramsay | |
| 8,817,107 B2 | 8/2014 | Matsumoto et al. | |
| D719,205 S | 12/2014 | Matsumoto | |
| D729,296 S | 5/2015 | Shelton | |
| D730,422 S | 5/2015 | Kim et al. | |
| 9,071,740 B1 | 6/2015 | Duffy | |
| D733,781 S | 7/2015 | Chen | |
| D734,801 S | 7/2015 | Yang | |
| 9,102,055 B1 | 8/2015 | Konolige et al. | |
| D740,871 S | 10/2015 | Moon et al. | |
| D742,954 S | 11/2015 | Simonelli et al. | |

(56) References Cited

U.S. PATENT DOCUMENTS

| | | |
|---|---|---|
| D743,465 S | 11/2015 | Aglassinger et al. |
| D745,916 S | 12/2015 | Oh |
| D746,350 S | 12/2015 | Li |
| D748,709 S | 2/2016 | Jeong |
| D755,880 S | 5/2016 | Luo et al. |
| 9,330,307 B2 | 5/2016 | Litvak et al. |
| 9,386,230 B1 | 7/2016 | Duran et al. |
| 9,544,485 B2 | 1/2017 | Conner |
| 9,838,602 B2 | 12/2017 | Duran et al. |
| 9,866,760 B2 | 1/2018 | Dorai et al. |
| 9,875,718 B1 | 1/2018 | Basehore et al. |
| 2001/0015760 A1 | 8/2001 | Fellegara |
| 2001/0022550 A1 | 9/2001 | Steffel |
| 2002/0003575 A1 | 1/2002 | Marchese |
| 2002/0056794 A1 | 5/2002 | Ibrahim |
| 2002/0107591 A1 | 8/2002 | Gabai et al. |
| 2002/0118114 A1 | 8/2002 | Ohba et al. |
| 2002/0141418 A1 | 10/2002 | Ben-Dor et al. |
| 2002/0159270 A1 | 10/2002 | Lynam et al. |
| 2002/0160724 A1 | 10/2002 | Arai et al. |
| 2002/0171754 A1 | 11/2002 | Lai et al. |
| 2002/0186317 A1 | 12/2002 | Kayanuma |
| 2002/0191082 A1 | 12/2002 | Fujino et al. |
| 2003/0164881 A1 | 9/2003 | Ohe et al. |
| 2003/0169354 A1 | 9/2003 | Aotsuka |
| 2003/0193409 A1 | 10/2003 | Crank |
| 2003/0216151 A1 | 11/2003 | Kitano et al. |
| 2004/0130655 A1 | 7/2004 | Yanakawa et al. |
| 2004/0132489 A1 | 7/2004 | Ryley et al. |
| 2004/0211868 A1 | 10/2004 | Holmes et al. |
| 2004/0246341 A1 | 12/2004 | Lee et al. |
| 2004/0247203 A1 | 12/2004 | Dell'Eva |
| 2004/0257431 A1 | 12/2004 | Girish et al. |
| 2005/0062720 A1 | 3/2005 | Rotzoll et al. |
| 2005/0068423 A1 | 3/2005 | Bear et al. |
| 2005/0073575 A1 | 4/2005 | Thacher et al. |
| 2005/0088537 A1 | 4/2005 | Nakamura et al. |
| 2005/0128336 A1 | 6/2005 | Toledano et al. |
| 2005/0146792 A1 | 7/2005 | Schofield et al. |
| 2005/0149213 A1 | 7/2005 | Guzak et al. |
| 2005/0151042 A1 | 7/2005 | Watson |
| 2005/0200751 A1 | 9/2005 | Weaver |
| 2005/0212958 A1 | 9/2005 | Su et al. |
| 2005/0227217 A1 | 10/2005 | Wilson |
| 2005/0230583 A1 | 10/2005 | Wu |
| 2005/0237425 A1 | 10/2005 | Lee et al. |
| 2005/0243022 A1 | 11/2005 | Negru |
| 2005/0243199 A1 | 11/2005 | Bohaker et al. |
| 2005/0275723 A1 | 12/2005 | Sablak et al. |
| 2006/0017842 A1 | 1/2006 | Jun |
| 2006/0024046 A1 | 2/2006 | Jones |
| 2006/0086871 A1 | 4/2006 | Joseph et al. |
| 2006/0109375 A1 | 5/2006 | Ho et al. |
| 2006/0109613 A1 | 5/2006 | Chen |
| 2006/0123129 A1 | 6/2006 | Toebes et al. |
| 2006/0123166 A1 | 6/2006 | Toebes et al. |
| 2006/0150227 A1 | 7/2006 | Julia et al. |
| 2006/0210259 A1 | 9/2006 | Matsumoto |
| 2006/0238707 A1 | 10/2006 | Elvesjo |
| 2006/0244583 A1 | 11/2006 | Kawada |
| 2006/0262194 A1 | 11/2006 | Swain |
| 2006/0282866 A1 | 12/2006 | Kuo |
| 2007/0001087 A1 | 1/2007 | Shyu et al. |
| 2007/0011375 A1 | 1/2007 | Kumar |
| 2007/0036539 A1 | 2/2007 | Martinez et al. |
| 2007/0050828 A1 | 3/2007 | Renzi et al. |
| 2007/0083791 A1 | 4/2007 | Panesar et al. |
| 2007/0219686 A1 | 9/2007 | Plante |
| 2007/0222888 A1 | 9/2007 | Xiao et al. |
| 2008/0001547 A1 | 1/2008 | Negru |
| 2008/0005432 A1 | 1/2008 | Kagawa |
| 2008/0012980 A1 | 1/2008 | Yamane |
| 2008/0026793 A1 | 1/2008 | Teegan et al. |
| 2008/0031161 A1 | 2/2008 | Osthus |
| 2008/0056709 A1 | 3/2008 | Huang et al. |
| 2008/0074535 A1 | 3/2008 | Ohsuga |
| 2008/0151052 A1 | 6/2008 | Erel et al. |
| 2008/0152218 A1 | 6/2008 | Okada et al. |
| 2008/0186150 A1 | 8/2008 | Kao |
| 2008/0189352 A1 | 8/2008 | Mitchell et al. |
| 2008/0198225 A1 | 8/2008 | Gal et al. |
| 2008/0231699 A1 | 9/2008 | Konishi et al. |
| 2008/0291260 A1 | 11/2008 | Dignan et al. |
| 2008/0309765 A1 | 12/2008 | Dayan et al. |
| 2008/0315778 A1 | 12/2008 | Tatsukawa |
| 2008/0316594 A1 | 12/2008 | Hashiguchi et al. |
| 2009/0019187 A1 | 1/2009 | Okuma |
| 2009/0027570 A1 | 1/2009 | Fujinawa |
| 2009/0069633 A1 | 3/2009 | Orihara et al. |
| 2009/0102715 A1 | 4/2009 | Lou et al. |
| 2009/0141918 A1 | 6/2009 | Chris et al. |
| 2009/0141939 A1 | 6/2009 | Chambers et al. |
| 2009/0158373 A1 | 6/2009 | Belz et al. |
| 2009/0175612 A1 | 7/2009 | Wen |
| 2009/0195655 A1 | 8/2009 | Pandey |
| 2009/0245268 A1 | 10/2009 | Pugliese, IV |
| 2009/0248918 A1 | 10/2009 | Diab et al. |
| 2009/0289921 A1 | 11/2009 | Mickelson et al. |
| 2009/0296735 A1 | 12/2009 | Cernius et al. |
| 2009/0309969 A1 | 12/2009 | Wendler |
| 2010/0026811 A1 | 2/2010 | Palmer |
| 2010/0039253 A1 | 2/2010 | Zang |
| 2010/0076600 A1 | 3/2010 | Cross et al. |
| 2010/0085749 A1 | 4/2010 | Bezgachev |
| 2010/0109878 A1 | 5/2010 | Desrosiers |
| 2010/0180012 A1 | 7/2010 | Heo et al. |
| 2010/0199157 A1 | 8/2010 | Takaoka et al. |
| 2010/0271503 A1 | 10/2010 | Safaee-Rad et al. |
| 2010/0306399 A1 | 12/2010 | Khosravi et al. |
| 2010/0314508 A1 | 12/2010 | Bevirt et al. |
| 2010/0328460 A1 | 12/2010 | Merkel et al. |
| 2010/0328475 A1 | 12/2010 | Thomas et al. |
| 2010/0330843 A1 | 12/2010 | Gao |
| 2011/0007159 A1 | 1/2011 | Camp et al. |
| 2011/0102438 A1 | 5/2011 | Mathe et al. |
| 2011/0102588 A1 | 5/2011 | Trundle et al. |
| 2011/0134243 A1 | 6/2011 | Siann et al. |
| 2011/0134313 A1 | 6/2011 | Kato |
| 2011/0158637 A1 | 6/2011 | Jung |
| 2011/0161076 A1 | 6/2011 | Davis et al. |
| 2011/0193964 A1 | 8/2011 | McLeod |
| 2011/0193967 A1 | 8/2011 | Matsumoto et al. |
| 2011/0205965 A1 | 8/2011 | Sprigg et al. |
| 2011/0231903 A1 | 9/2011 | Springer |
| 2011/0234803 A1 | 9/2011 | Nakajima et al. |
| 2011/0255289 A1 | 10/2011 | Krah |
| 2011/0267492 A1 | 11/2011 | Prentice et al. |
| 2011/0285813 A1 | 11/2011 | Girdzijauskas et al. |
| 2011/0293137 A1 | 12/2011 | Gurman et al. |
| 2011/0299728 A1 | 12/2011 | Markovic et al. |
| 2012/0004956 A1 | 1/2012 | Huston et al. |
| 2012/0026325 A1 | 2/2012 | Bunker et al. |
| 2012/0081009 A1 | 4/2012 | Shteynberg |
| 2012/0086815 A1 | 4/2012 | Cooper et al. |
| 2012/0105632 A1 | 5/2012 | Renkis |
| 2012/0106037 A1 | 5/2012 | Diebel |
| 2012/0127270 A1 | 5/2012 | Zhang et al. |
| 2012/0140068 A1 | 6/2012 | Monroe et al. |
| 2012/0162416 A1 | 6/2012 | Su et al. |
| 2012/0194650 A1 | 8/2012 | Izadi et al. |
| 2012/0235884 A1* | 9/2012 | Miller ............... G06F 3/005 345/8 |
| 2012/0236373 A1 | 9/2012 | Oyama |
| 2012/0246359 A1 | 9/2012 | Scragg, Jr. et al. |
| 2012/0262575 A1 | 10/2012 | Champagne et al. |
| 2012/0263450 A1 | 10/2012 | Totani |
| 2012/0311686 A1 | 12/2012 | Medina et al. |
| 2012/0328259 A1 | 12/2012 | Seibert, Jr. et al. |
| 2012/0328358 A1 | 12/2012 | Akiyama |
| 2013/0007099 A1 | 1/2013 | Lee et al. |
| 2013/0053657 A1 | 2/2013 | Ziarno et al. |
| 2013/0156260 A1 | 6/2013 | Craig |
| 2013/0162629 A1 | 6/2013 | Huang et al. |
| 2013/0314544 A1 | 11/2013 | Ban |

(56) References Cited

U.S. PATENT DOCUMENTS

| | | |
|---|---|---|
| 2013/0321564 A1 | 12/2013 | Smith et al. |
| 2013/0342653 A1 | 12/2013 | McCloskey et al. |
| 2014/0032796 A1 | 1/2014 | Krause |
| 2014/0047143 A1 | 2/2014 | Bateman et al. |
| 2014/0049609 A1 | 2/2014 | Wilson et al. |
| 2014/0119604 A1 | 5/2014 | Mai et al. |
| 2014/0168421 A1 | 6/2014 | Xu et al. |
| 2014/0241387 A1 | 8/2014 | Ortiz |
| 2014/0267874 A1 | 9/2014 | Ratcliff et al. |
| 2014/0270387 A1 | 9/2014 | Hoof et al. |
| 2014/0333726 A1 | 11/2014 | Tokui et al. |
| 2014/0375635 A1 | 12/2014 | Johnson et al. |
| 2015/0049324 A1 | 2/2015 | Tan et al. |
| 2015/0052029 A1 | 2/2015 | Wu et al. |
| 2015/0077737 A1* | 3/2015 | Belinsky ............. G08B 17/103 356/51 |
| 2015/0120389 A1 | 4/2015 | Zhang et al. |
| 2015/0154467 A1 | 6/2015 | Feng et al. |
| 2015/0170371 A1 | 6/2015 | Muninder et al. |
| 2015/0181198 A1 | 6/2015 | Baele et al. |
| 2015/0185592 A1 | 7/2015 | Eineren et al. |
| 2015/0228114 A1 | 8/2015 | Shapira et al. |
| 2015/0304470 A1 | 10/2015 | Cheatham, III |
| 2016/0012588 A1 | 1/2016 | Taguchi et al. |
| 2016/0022181 A1 | 1/2016 | Valsan et al. |
| 2016/0027262 A1 | 1/2016 | Skotty et al. |
| 2016/0029102 A1 | 1/2016 | Daily |
| 2016/0094763 A1 | 3/2016 | Patel |
| 2016/0094829 A1 | 3/2016 | Georgiev et al. |
| 2016/0142681 A1 | 5/2016 | Yu |
| 2016/0205318 A1 | 7/2016 | Wang et al. |
| 2016/0255153 A1* | 9/2016 | Ayers ...................... A63F 13/21 702/188 |
| 2016/0261829 A1 | 9/2016 | Olsson |
| 2017/0238401 A1* | 8/2017 | Sadwick ................ F21K 9/235 315/294 |
| 2017/0328997 A1 | 11/2017 | Silverstein et al. |
| 2017/0343801 A1 | 11/2017 | Dabic et al. |
| 2018/0052376 A1 | 2/2018 | Burrows et al. |
| 2018/0113331 A1 | 4/2018 | Wang et al. |

OTHER PUBLICATIONS

720p TF Card IP Wireless Camera Indoor Built-In Microphone Support Two Way Intercom for Smart Home Life and Unique PIR Alarm, Dec. 18, 2015, 3 pgs.
Adipranata, Fast method for multiple human face segmentation in color image, 2008 Second Int'l Conference on Future Generation Communcation and Networking, IEEE, 2008, 4 pgs.
Buy Svb Ladybird Tripod Webcam 4 Mega Pixel—4 Megapixel Web Cam Online, Best Prices in India: Rediff Shopping, Dec. 16, 2015, 3 pgs.
Drivers—Video Cam; Download Drivers for (Genius VideoCAM NB) Visual/Video Camera, Computer Question Help, Jul. 3, 2008, 2 pgs.
Ebay, Belkin F7D7601AU, Net Cam IP WIFI Baby Pet Monitor Camera Security Night Vision, Dec. 15, 2015, 5 pgs.
Ebay, Lot of 2 USB WebCam Web Cam Camera Logitech Quickcam HP Hewlett Packard, Dec. 16, 2015, 3 pgs.
Ebay, Motorola, MBP241 Digital Video & Sound Rechargeable Baby Monitor 1.8" LCD Screen, Dec. 15, 2015, 5 pgs.
Ebay, New Smallest Mini Camera Camcorder Video Recorder DVR Spy Hidden Pinhole Web Cam, Dec. 2, 2015, 4 pgs.
FabulaTech, What is USB for Remote Desktop, Dec. 12, 2011, 2 pgs, http://web.archive.org/web/20111212070644/http://www.usb-over-network.com/usb-for-remote-desktop.html.
FabulaTech, What is USB over Network, Dec. 17, 2011, 2 pgs, http://web.archive.org/web/20111217080253/http://www.usb-over-network.com/usb-over-network.html.
Good in Stock PC Camera USB Plug and Play Free Driver Digital Webcam Stand Web Camera, Dec. 18, 2015, 12 pgs.
Hampapur, Smart surveillance: applications, technologies and implications, Information Communications and Signal Processing, Feb. 2003, pp. 1133-1138.
Heo, Fusion of visual and thermal face recognition techniques: A comparative study. Univ. of Tennessee, Knoxville, TN, 2003, 75 pgs.
Input Devices on Pintrest, Computers, Mice and Apples, Tanna Darty, Dec. 15, 2015, 1 pg.
Ion Camera, The Home Pro Wi-Fi Wireless Cloud Video Monitoring Security Camera (Black): Camera & Photo, Dec. 15, 2015, 6 pgs.
Joel Johnson, Glowdoodle Turns your Crappy Webcam into a Crappier Webcam (in a good way), webcam—Boing Boing, Dec. 16, 2015, 8 pgs.
John Lewis, Samsung SEB-1019RW Add-On Night Vision Baby Monitor Camera, Dec. 15, 2015, 2 pgs.
KYO-TUX, IconArchive, Device WebCam Icon, Phuzion Iconset, Jun. 8, 2010, 3 pgs.
Linksys Wireless-N Internet Home Monitoring Camera: Home Security Systems: Camera & Photo, Amazon.com, Dec. 15, 2015, 7 pgs.
Logi Circle: Portable Home Surveillance Camera for Logitech (video), AppleApple.Top World News, Feb. 10, 2015, 5 pgs.
Mini Universal Tripod Stand for Digital Camera and Webcam A33—in Tripods from Consumer Electronics on Aliexpress.com, Alibaba Group, Store: Angel One-Stop Shopping Center, Dec. 16, 2015, 3 pgs.
Parent, Android USB Port Forwarding, Dec. 26, 2011, 7 pgs, http://www.codeproject.com/Articles/191930/Android-Usb-Port-Forwarding.
Restore.Solutions, Numus Software, USB/VID, Syntek Web Cam Device Drivers, Dec. 12, 2015, 10 pgs.
Silberman, Indoor Segmentation and Support Ingerence from RGBD Images, Computer Vision—ECCV 2012, Springer Berlin Heidelbert, Oct. 2012, pp. 746-780.
SIV AL-BALL Very Small Hidden IP Network Camera Battery Powered Wireless IP Camera, Alibaba.com, 1999-2015, 7 pgs.
TechAllianz, How to Pick the Right Webcam, Satyakam, Jan. 22, 2013, 4 pgs.
TREK Ai-Ball Mini WiFi Spy Cam IP Wireless Camera for Iphone/ Android /Ipad, Tmart, www.tmart.com, Dec. 18, 2015, 6 pgs.
Tripod Support for a QuickCam (or other webcam), Instructables, 2015, 3 pgs.
USB/IP Project, USB Request Over IP Network, Dec. 27, 2011, 5 pgs, http://web.archive.org/web/20111227171215/http://usbip.sourceforge.net/.
Web Camera 6 Stock Photo, Dreamstime, Dec. 16, 2015, 2 pgs.
Google, WO/ PCT/US2016/034462, International Preliminary Report on Patentability, dated Nov. 28, 2017, 8 pgs.
Google, LLC, International Preliminary Report on Patentability/ Written Opinion, PCT/US2016/037069, dated Dec. 12, 2017, 7 pgs.
Google LLC, International Search Report / Written Opinion, PCT/ US2018/048780, dated Mar. 18, 2019, 11 pgs.
Google LLC, International Search Report / Written Opinion, PCT/ US2016/034462, dated Nov. 11, 2016, 10 pgs.
Google Inc., International Search Report / Written Opinion, PCT/ US2016/037069, dated Aug. 24, 2016, 9 pgs.

* cited by examiner

Figure 15A $$Y_{i,j} = \begin{matrix} y_{11} & y_{1k} & y_{1m} \\ y_{21} & y_{2k} & y_{2m} \\ y_{31} & y_{3k} & y_{3m} \\ y_{41} & y_{4k} & y_{4m} \end{matrix} \Bigg\} \; 4 \times m$$

$$Y_{i,j}(k)$$

depth $\longrightarrow$ $$\hat{k} = \underset{k}{\mathrm{argmax}}(\tilde{Y}_{i,j}(k) \cdot \vec{b}_{i,j})$$

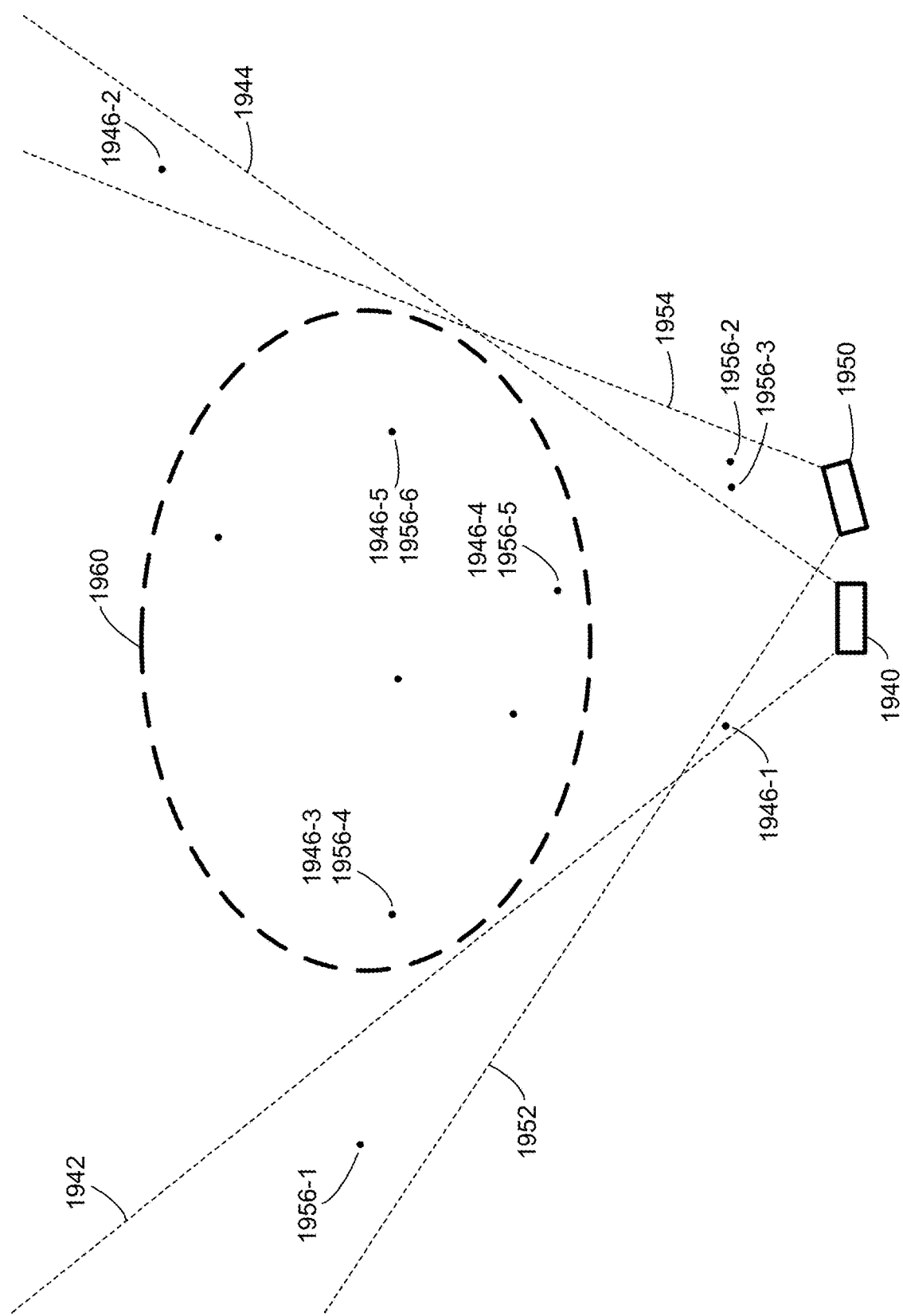

Gradient $G_x$ 940 x

Gradient $G_y$ 942 y $$E = \text{Hysteresis}\left(\sqrt{G_x^2 + G_y^2}\right)$$
Figure 20D
Figure 20E
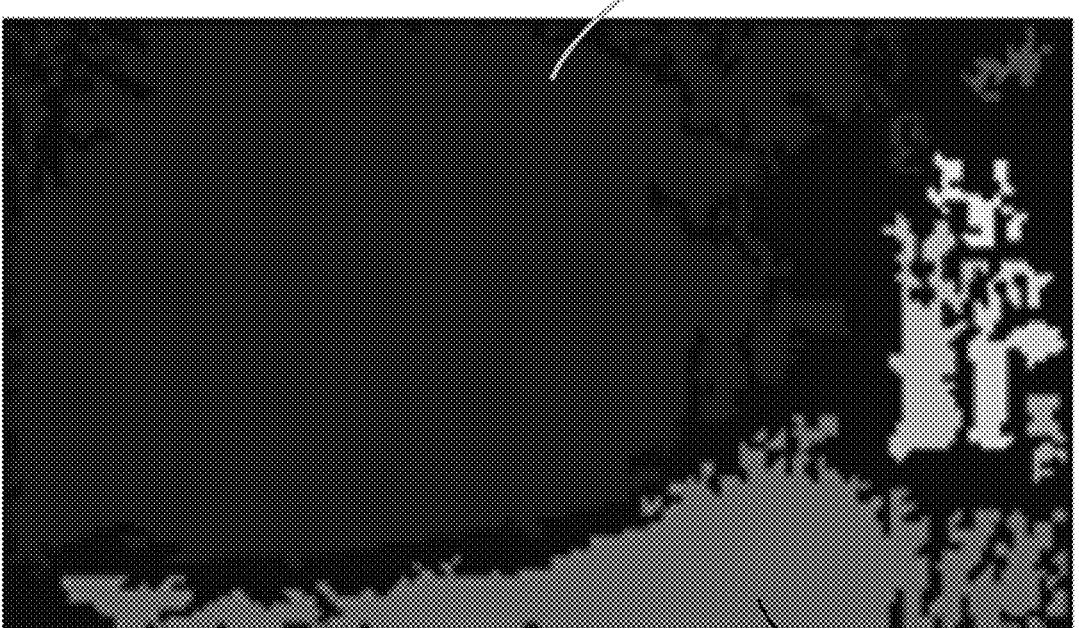
Figure 20F

$$w_x x + w_y y + w_z z = 1$$

$$C = [c_{ij}]$$

$$\sum_i (w_x c_{i1} + w_y c_{i2} + w_z c_{i3} - 1)^2$$

| Item | Height | Tilt | Image for Subset 1 | Image for Subset 2 | Image for Subset 3 | Image for Subset 4 |
|---|---|---|---|---|---|---|
| 1 | 0.6 m | 0° | $I_{1,1}$ | $I_{1,2}$ | $I_{1,3}$ | $I_{1,4}$ |
| 2 | 0.6 m | 10° | $I_{2,1}$ | $I_{2,2}$ | $I_{2,3}$ | $I_{2,4}$ |
| | | | | | | |
| 10 | 0.6 m | 90° | $I_{10,1}$ | $I_{10,2}$ | $I_{10,3}$ | $I_{10,4}$ |
| 11 | 0.7 m | 0° | $I_{11,1}$ | $I_{11,2}$ | $I_{11,3}$ | $I_{11,4}$ |
| 12 | 0.7 m | 10° | $I_{12,1}$ | $I_{12,2}$ | $I_{12,3}$ | $I_{12,4}$ |
| | | | | | | |
| 250 | 3.0 m | 90° | $I_{250,1}$ | $I_{250,2}$ | $I_{250,3}$ | $I_{250,4}$ |

Figure 21C

Subject: Re-align moved Activity Zone(s)?

Hello,

We've noticed that your camera has appeared to move. We can fix your [Doorway From Kitchen] activity zone. We recommend moving it from the current (solid) region to the recommended (dashed) region.

Click here to move your zone.

Thanks,
Your Friendly Vision Team

Figure 31C

USING A SCENE ILLUMINATING INFRARED EMITTER ARRAY IN A VIDEO MONITORING CAMERA FOR DEPTH DETERMINATION

RELATED APPLICATIONS

This application is a continuation of U.S. patent application Ser. No. 15/900,766, filed Feb. 20, 2018, entitled "Using a Scene Illuminating Infrared Emitter Array in a Video Monitoring Camera for Depth Determination," which is a continuation of U.S. patent application Ser. No. 14/740,205, filed Jun. 15, 2015, now U.S. Pat. No. 9,900,560, issued on Feb. 20, 2018, entitled "Using a Scene Illuminating Infrared Emitter Array in a Video Monitoring Camera for Depth Determination," which is a continuation of U.S. patent application Ser. No. 14/738,818, filed Jun. 12, 2015, now U.S. Pat. No. 9,454,820, issued on Sep. 27, 2016, entitled "Using a Scene Illuminating Infrared Emitter Array in a Video Monitoring Camera for Depth Determination," each of which is incorporated by reference herein in its entirety.

This application is related to U.S. Provisional Application Ser. No. 62/021,620, filed Jul. 7, 2014, entitled "Activity Recognition and Video Filtering," which is incorporated by reference herein in its entirety.

This application is related to U.S. patent application Ser. No. 14/723,276, filed May 27, 2015, entitled "Multi-Mode LED Illumination System," which is incorporated by reference herein in its entirety.

This application is related to U.S. patent application Ser. No. 14/738,803, filed Jun. 12, 2015, entitled "Simulating an Infrared Emitter Array in a Video Monitoring Camera to Construct a Lookup Table for Depth Determination," which is incorporated by reference herein in its entirety.

This application is related to U.S. patent application Ser. No. 14/738,806, filed Jun. 12, 2015, entitled "Using Infrared Images of a Monitored Scene to Identify Windows," which is incorporated by reference herein in its entirety.

This application is related to U.S. patent application Ser. No. 14/738,817, filed Jun. 12, 2015, entitled "Using a Depth Map of a Monitored Scene to Identify Floors, Walls, and Ceilings," which is incorporated by reference herein in its entirety.

This application is related to U.S. patent application Ser. No. 14/738,825, filed Jun. 12, 2015, entitled "Using Depth Maps of a Scene to Identify Movement of a Video Camera," which is incorporated by reference herein in its entirety.

This application is related to U.S. patent application Ser. No. 14/738,811, filed Jun. 12, 2015, entitled "Using a Scene Illuminating Infrared Emitter Array in a Video Monitoring Camera to Estimate the Position of the Camera," which is incorporated by reference herein in its entirety.

This application is related to U.S. patent application Ser. No. 14/738,816, filed Jun. 12, 2015, entitled "Using a Scene Information from a Security Camera to Reduce False Security Alerts," which is incorporated by reference herein in its entirety.

TECHNICAL FIELD

The disclosed implementations relate generally to video cameras, and more specifically to using illumination emitters from a video camera to identify properties of the scene monitored by the camera or to identify properties of the camera itself.

BACKGROUND

Video surveillance cameras are used extensively. Usage of video cameras in residential environments has increased substantially, in part due to lower prices and simplicity of deployment. In many cases, surveillance cameras include infrared emitters in order to illuminate a scene when light from other sources is limited or absent.

Some video cameras enable a user to identify "zones" within the scene that is visible to the camera. This can be useful to identify movement or changes within those zones.

Because a surveillance camera can capture a very large amount of data (e.g., running 24 hours a day, 7 days a week), some cameras enable a user to set up alerts based on specific criteria. The criteria can include movement within a scene, movement of a specific type, or movement within a certain time range.

SUMMARY

Accordingly, there is a need for camera systems that provide simpler usage and better utilization. In various implementations, the disclosed functionality complements or replaces the functionality of existing camera systems.

In accordance with some implementations, a process generates lookup tables for use in estimating spatial depth in a visual scene. The process is performed at a server having one or more processors and memory. The memory stores one or more programs configured for execution by the one or more processors. The process identifies a plurality of distinct subsets of IR illuminators of a camera system. The camera system has a 2-dimensional array of image sensors (e.g., photodiodes) and a plurality of IR illuminators in fixed locations relative to the array of image sensors. The process partitions the image sensors into a plurality of pixels. In some implementations, each pixel comprises a single image sensor. In some implementations, each pixel comprises a plurality of image sensors, which can be 50 or more. For each pixel and for each of m distinct depths from the respective pixel, the process simulates a virtual surface at the respective depth. In some implementations, the simulated virtual surfaces are planar, but in other implementations the simulated surfaces are spherical, parabolic, or cubic. For each of the distinct subsets of IR illuminators, the process determines an expected IR light intensity at the respective pixel based on the respective depth and based on only the respective subset of IR illuminators emitting IR light. The process then forms an intensity vector using the expected IR light intensities for each of the distinct subsets, and normalizes the intensity vector. For each pixel, the process constructs a lookup table comprising the normalized vectors corresponding to the pixel. The lookup table associates each respective normalized vector with the respective depth of the respective simulated surface.

In some implementations, the expected IR light intensity at the respective pixel is based on characteristics of the IR illuminators of the camera system. In some implementations, the characteristics include lux, orientation of the IR illuminators relative to the sensor array, and/or location of the IR illuminators relative to the sensor array.

In some implementations, the process normalizes each intensity vector by computing a respective magnitude of the intensity vector and dividing each component of the intensity vector by the respective magnitude.

In some implementations, the array of image sensors comprises more than one million image sensors. In some implementations, the array of image sensors is downsampled to a smaller number of pixels. For example, an array of image sensors with one million individual sensors may be downsampled to 10,000 pixels. The downsampling used (if any) may depend on available resources, such as memory, bandwidth, processor speed, and/or number of processors.

In accordance with some implementations, a process creates a depth map of a scene. The process is performed at a computing device having one or more processors and memory. The memory stores one or more programs configured for execution by the one or more processors. For each of a plurality of distinct subsets of IR illuminators of a camera system, the process receives a captured IR image of a first scene taken by a 2-dimensional array of image sensors of the camera system while the respective subset of IR illuminators are emitting IR light and the IR illuminators not in the respective subset are not emitting IR light. The image sensors are partitioned into a plurality of pixels. In some implementations, each pixel comprises a single image sensor, but in other implementations, each pixel comprises a plurality of image sensors. In some implementations, the computing device is a server, and the captured images are received from a remotely located camera. In some implementations, the computing device is included in a camera, and the images are processed locally at the camera. For each pixel of the plurality of pixels, the process uses the captured IR images to form a respective vector of light intensity at the respective pixel. The process then estimates a depth in the first scene at the respective pixel by looking up the respective vector in a respective lookup table. In some implementations, the lookup table is stored at the camera system during a calibration process.

In some implementations, looking up the respective vector in the respective lookup table includes computing an inner product of the respective vector with records in the lookup table. In some implementations, the inner product is computed for each record in the lookup table. The process computes the depth in the first scene at the pixel as a depth corresponding to a record in the lookup table whose inner product with the respective vector is greatest among the computed inner products for the respective vector.

In some implementations, each respective vector for a respective pixel comprises a plurality of components, with each of the components corresponding to a respective IR light intensity for the respective pixel for a respective captured IR image. In some implementations, computing an inner product comprises computing a dot product.

In some implementations, the IR illuminators are orientated at a plurality of distinct angles relative to the array of image sensors.

In some implementations, the depth map of the first scene is created in response to detecting a trigger event. In some implementations, the trigger event is detecting movement of a first object in the first scene from a first location to a second location. In some implementations, the trigger event is a power interruption event.

In some implementations, a respective lookup table is generated during the calibration process. In some implementations, the calibration process includes simulating a virtual planar surface at a plurality of respective depths in the first scene and determining, for each pixel and each respective depth, an expected IR light intensity.

Implementations select the distinct subsets of IR illuminators in various ways. In some implementations, each of the distinct subsets of IR illuminators comprises two adjacent IR illuminators, and the distinct subsets of IR illuminators are non-overlapping.

In some implementations, each respective lookup table includes a plurality of normalized IR light intensity vectors, and each normalized light intensity vector corresponds to a respective depth in the first scene.

In some implementations, the respective lookup tables are downloaded to the camera system from a remote server during an initialization process prior to creating the depth map.

In some implementations, prior to capturing the IR images, the process switches from a first mode of the camera system to a second mode of the camera system, including deactivating the first mode and activating the second mode. In some implementations, the array of image sensors has an associated first pixel gain curve while the first mode is activated, and the array of image sensors has an associated second pixel gain curve while the second mode is activated.

In some implementations, the process receives a baseline IR image of the scene captured by the array of sensors while none of the IR illuminators are emitting IR light. Then, forming each respective vector of light intensity at a respective pixel comprises subtracting a light intensity at the pixel of the baseline IR image from the light intensity at the pixel of each of the captured IR images.

In accordance with some implementations, a process classifies objects in a scene. The process is performed at a computing device having one or more processors and memory. The memory stores one or more programs configured for execution by the one or more processors. In some implementations, the computing device is included in a camera system. In some implementations, the computing device is a server distinct from the camera system. The process receives a captured IR image of a scene taken by a 2-dimensional image sensor array of the camera system while one or more IR illuminators of the camera system are emitting IR light. In this way, the process forms an IR intensity map of the scene with a respective intensity value determined for each pixel of the IR image. The process uses the IR intensity map to identify a plurality of pixels whose corresponding intensity values are within a predefined intensity range (e.g., all intensity values between 0 and a positive finite value or all values between two positive finite values). The process then clusters the identified plurality of pixels into one or more regions that are substantially contiguous. The process determines that a first region of the one or more regions corresponds to a specific material based, at least in part, on the intensity values of the pixels in the first region, and stores information in the memory that identifies the first region.

In some implementations, each pixel of the IR image corresponds to a unique respective image sensor in the image sensor array. In some implementations, the pixels of the IR image form a partition of the image sensors in the image sensor array and at least one pixel corresponds to a plurality of image sensors in the image sensor array.

In some implementations, the camera system has a plurality of IR illuminators, and forming an IR intensity map of the scene includes receiving a respective IR sub-image of the scene for each of a plurality of distinct subsets of IR illuminators. Each IR sub-image is captured while the respective subset of IR illuminators are emitting IR light and the IR illuminators not in the respective subset are not emitting IR light. The respective intensity value for a respective pixel is the average of intensity values at the pixel in each of the sub-images.

In some implementations, clustering the identified plurality of pixels into one or more regions further comprises using a depth map that was constructed using the image sensor array.

In some implementations, clustering the identified plurality of pixels into one or more regions further comprises using an RGB image of the scene captured using the image sensor array.

In some implementations, determining that a first region of the one or more regions corresponds to a specific material comprises determining that the first region is substantially a quadrilateral. In some implementations, the first region is substantially a quadrilateral when a total absolute difference in area between the first region and the quadrilateral is less than a threshold percentage of the quadrilateral's area (e.g., 5%, 10%, or 20%).

In some implementations, the predefined intensity range includes all intensity values below a threshold value, and the specific material is glass. The process thereby determines that the first region corresponds to a window in the scene.

In some implementations, the process receives a video stream of the scene from the camera system and reviews the video stream to detect movement in the scene. The first region is excluded from movement detection. The process generates a motion alert when there is motion detected at the scene outside of the first region.

In accordance with some implementations, a process identifies large planar surfaces in scenes, such as floors, walls, and ceilings. The process is performed at a computing device having one or more processors and memory. The memory stores one or more programs configured for execution by the one or more processors. The process receives a plurality of captured IR images of a scene taken by a 2-dimensional array of image sensors of a camera system. Each IR image is captured when a distinct subset of IR illuminators of the camera system are illuminated. The process constructs a depth map of a scene using the plurality of IR images, and uses the depth map to compute a binary depth edge map for the scene. The binary depth edge map identifies which points in the depth map comprise depth discontinuities. The process identifies a plurality of contiguous components based on the binary depth edge map. The process determines that a first component of the plurality of contiguous components represents a large planar surface in the scene by fitting a plane to points in the first component, determining the orientation of the plane, and determining that the plane fitting residual error is less than a predefined threshold.

In some implementations, the nature of the large plane is determined by its orientation. When the orientation of the plane is upwards, the plane is determined to be a floor. When the orientation of the plane is downwards, the plane is determined to be a ceiling. And when the orientation of the plane is horizontal, the plane is determined to be a wall.

In some implementations, the computing device is a server distinct from the camera system. In other implementations, the computing device is included in the camera system.

In some implementations, the image sensors are partitioned into a plurality of pixels. For each pixel, the process uses the captured IR images to form a respective vector of light intensity at the respective pixel and estimates a depth in the first scene at the respective pixel using the respective vector and a respective lookup table. In this way, the process constructs the depth map.

In accordance with some implementations, a process recomputes zones for a scene. The process is performed at a computing device that has one or more processors and memory. The memory stores one or more programs configured for execution by the one or more processors. The process receives a first RGB image of a scene taken by a 2-dimensional array of image sensors of a camera system at a first time. The process also receives a first plurality of distinct IR images of the scene taken by the array of image sensors temporally proximate to the first time. Each of the IR images is taken while a different subset of IR illuminators of the camera system is emitting light. Using the first plurality of IR images, the process constructs a first depth map of the scene. The first depth map indicates a respective depth in the scene at a plurality of pixels, where each pixel corresponds to one or more of the image sensors. The process receives designation from a user of a zone within the first RGB image. The zone corresponds to a contiguous plurality of pixels. At a second time later, the process receives a second plurality of distinct IR images of the scene taken by the array of image sensors. Each of the IR images in the second plurality is taken while a different subset of IR illuminators of the camera system is emitting light. Using the second plurality of IR images, the process constructs a second depth map of the scene. The process then determines physical movement of the camera system based on the first and second depth maps. Based on the determined physical movement, the process translates the zone in the first RGB image into an adjusted zone.

In some instances, the determined physical movement is an angular rotation. In some instances, the determined physical movement is a lateral displacement. In some instances, the determined physical movement includes both an angular rotation and a lateral displacement. Lateral displacements are commonly horizontal, but they can be vertical as well. As used herein, a lateral displacement is any movement in which the camera continues to point in the same direction. This includes any combination of left/right, up/down, and/or forward/backward.

In some implementations, determining the physical movement of the camera system includes identifying a plurality of points in the first depth map and a corresponding plurality of points in the second depth map and the process determines a respective displacement for each of the points between the first and second depth maps.

In some instances, the zone is a first quadrilateral. In some instances, the adjusted zone is a second quadrilateral, and a first edge of the first quadrilateral has a length that is different from a corresponding second edge of the second quadrilateral.

In some implementations, the process creates the first depth map of the scene by partitioning the image sensors into a plurality of pixels. For each pixel, the process forms a respective vector of the received IR images at the respective pixel and estimates a depth in the scene at the respective pixel by looking up the respective vector in a respective lookup table.

In some implementations, the computing device is a server distinct from the camera system. In other implementations, the computing device is included in the camera system.

In some implementations, the process receives a second RGB image of the scene taken by the image sensor array of the camera system temporally proximate to the second time and correlates the adjusted zone to a set of pixels from the second RGB image.

In some implementations, the process determines the physical movement of the camera system using point clouds. The process forms a first point cloud using a first plurality of points from the first depth map and forms a second point cloud using a second plurality of points from the second depth map. The process then computes a minimal transformation that aligns the first point cloud with the second point cloud. This process is referred to as "registration."

In accordance with some implementations, a process estimates the height and tilt angle of a camera system. The camera system has a 2-dimensional array of image sensors and a plurality of IR illuminators in fixed locations relative to the array of image sensors. The process is performed at a computing device having one or more processors and memory. The memory stores one or more programs configured for execution by the one or more processors. In some implementations, the computing device is included in the camera system. In some implementations, the computing device is a server distinct from the camera system. The process identifies a plurality of distinct subsets of the IR illuminators. In some implementations, each of the distinct subsets of the IR illuminators comprises two adjacent IR illuminators, and the distinct subsets of the IR illuminators are non-overlapping. In some implementations, one or more of the subsets of IR illuminators comprises a single IR illuminator. The process partitions the image sensors into a plurality of pixels. In some implementations, each pixel corresponds to a single image sensor. In some implementations, some of the pixels correspond to multiple image sensors (e.g., by downsampling).

In accordance with some implementations, for each of a plurality of heights and tilt angles, the process constructs a dictionary entry that corresponds to the camera system having the respective height and tilt angle above a floor. The respective dictionary entry includes respective IR light intensity values for pixels in images corresponding to activating individually each of the distinct subsets of the IR illuminators.

In some implementations, the constructed dictionary entries are based on simulating the camera, the floor, and the images, and computing expected IR light intensity values for pixels in the simulated images. In some implementations, each expected IR light intensity value is based on characteristics of the IR illuminators, including one or more characteristics selected from the group consisting of lux, orientation of the IR illuminators relative to the array of image sensors, and location of the IR illuminators relative to the array of image sensors. In some implementations, a respective dictionary entry for a respective height and respective tilt angle is based on measuring IR light intensity values of actual images captured by the camera having the respective height and respective tilt angle with respect to an actual floor.

In accordance with some implementations, for each of the plurality of distinct subsets of the IR illuminators, the process receives a captured IR image of a scene taken by the array of image sensors while the respective subset of the IR illuminators are emitting IR light and the IR illuminators not in the respective subset are not emitting IR light. Using at least one of the captured IR images, the process identifies a floor region corresponding to a floor in the scene. In some implementations, identifying the floor region includes constructing a depth map of the scene using the captured IR images, identifying a region bounded by depth discontinuities, and determining that the region is substantially planar and facing upwards.

In accordance with some implementations, the process forms a vector (sometimes referred to as a feature vector) including pixels from the captured IR images in the identified floor region and estimates the camera height and camera tilt angle relative to the floor by comparing the feature vector to the dictionary entries.

In some implementations, the respective expected IR light intensity is based on characteristics of the IR illuminators. In some implementations, these characteristics include one or more of: illuminator lux; orientation of the IR illuminators relative to the array of image sensors; and location of the IR illuminators relative to the array of image sensors.

In some implementations, constructing a dictionary entry includes normalizing the dictionary entry. In some implementations, normalizing a dictionary entry includes determining a respective total magnitude of the light intensity features in the dictionary entry and dividing each component of the dictionary entry by the respective total magnitude. In some implementations, the dictionary entries are downloaded to the camera system from the computing device during an initialization process.

In some implementations, the process receives a baseline IR image of the scene captured by the array of image sensors while none of the IR illuminators are emitting IR light and subtracts the light intensity at each pixel of the baseline IR image from the light intensity at the corresponding pixel of each of the other captured IR images.

In some implementations, estimating the camera height and camera tilt angle relative to the floor includes computing a respective distance between the feature vector and respective dictionary entries. The process selects a first dictionary entry whose corresponding computed distance is less than the other computed distances and estimates the camera height and tilt angle to be the height and tilt angle associated with the first dictionary entry. In some implementations, computing a respective distance between the feature vector and respective dictionary entries comprises computing a Euclidean distance that uses only vector components corresponding to pixels in the identified floor region. In some implementations, the process normalizes the feature vector and the dictionary entries prior to computing the distances.

In accordance with some implementations, a process reduces false positive security alerts. The process is performed at a computing device having one or more processors, and memory storing one or more programs configured for execution by the one or more processors. In some implementations, the computing device is a server distinct from a video camera. In some implementations, the computing device is included in the video camera. The process computes a depth map for a scene monitored by a video camera using a plurality of IR images captured by the video camera and uses the depth map to identify a first region within the scene having historically above average false positive detected motion events. The process monitors a video stream provided by the video camera to identify motion events. The monitored area excludes the first region. The process generates a motion alert when there is detected motion in the scene outside of the first region and the detected motion satisfies threshold criteria. In some implementations, satisfying the threshold criteria includes detecting movement of an object in the scene, and the detected movement exceeds a predefined distance within a predefined period of time. In some implementations, satisfying the threshold criteria includes detecting movement for an object that exceeds a predefined size. In some implementations, satisfying the threshold criteria includes detecting simultaneous movement of two or more objects in the scene.

In some implementations, the video camera has a plurality of IR illuminators and each of the plurality of IR images captured by the video camera is taken when a different subset of the illuminators is emitting light.

In some instances, the first region is identified as a ceiling. In some implementations, identifying the first region as a ceiling includes using the depth map to compute a binary depth edge map for the scene. The binary depth edge map identifies which points in the depth map comprise depth discontinuities. In some implementations, identifying the first region as a ceiling also includes identifying a contiguous component based on the binary depth edge map. In some implementations, identifying the first region as a ceiling also includes fitting a plane to points in the contiguous component, determining that the plane fitting residual error is less than a predefined threshold, and determining that the plane is oriented downward.

In some instances, the first region is identified as a window. In some implementations, identifying the first region as a window includes identifying the first region as a region of low light intensity within a captured IR image of the scene, fitting the first region with a quadrilateral, and determining that the absolute difference between the first region and the quadrilateral is less than a threshold percentage of the area of the quadrilateral.

In some instances, the first region is identified as a television.

In accordance with some implementations, process for generating depth maps is performed by a camera having a plurality of illuminators, a lens assembly, an image sensing element, a processor, and memory. The illuminators are configured to operate in a first mode to provide illumination using all of the illuminators, the lens assembly is configured to focus incident light on the image sensing element, the memory is configured to store image data from the image sensing element, and the processor is configured to execute programs to control operation of the camera. The process reconfigures the plurality of illuminators to operate in a second mode, where each of a plurality of subsets of the plurality of illuminators provides illumination separately from other subsets of the plurality of illuminators. The process sequentially activates each of the subsets of the illuminators to illuminate a scene and receives reflected illumination from the illuminated scene incident on the lens assembly and focused onto the image sensing element. The process measures light intensity values of the received reflected illumination at the image sensing element and stores to the memory the measured light intensity values associated with activation of each of the subsets.

In some implementations, each of the subsets of illuminators is configured at a different angle relative to the image sensing element.

In some implementations, each of the subsets of illuminators highlights a different portion of the scene.

In some implementations, the process transmits the stored light intensity values to a depth mapping module configured to estimate spatial depths of objects in the scene based on the stored light intensity values, predetermined illumination specifications of the illuminators, and response specifications of the image sensors.

In some implementations, the illuminators are IR illuminators.

In some implementations, the illuminators comprise 8 IR illuminators and each of the subsets of the illuminators comprises 2 adjacent IR illuminators.

In some implementations, the image sensing element is a 2-dimensional array of image sensors.

In some implementations, differences in the stored light intensity values associated with activation of each of the subsets for a respective image sensor correlate with spatial depth of an object in the scene from which reflected light was received at the respective image sensor.

In some implementations, the process captures a baseline image while none of the illuminators are emitting light. The captured baseline image measures ambient light intensity of the scene at each of the image sensors. The process stores the captured baseline image to the memory and for each image sensor, the process subtracts the baseline intensity value from the stored intensity values for the respective image sensor to correct the stored intensity values for ambient light at the scene.

In some implementations, the image sensors are partitioned into a plurality of pixels and for each pixel of the plurality of pixels the process using the captured IR images to form a respective vector of light intensity at the respective pixel. For each pixel, the process also estimates a depth in the first scene at the respective pixel by looking up the respective vector in a respective lookup table. In some implementations, looking up the respective vector in the respective lookup table includes computing an inner product of the respective vector with records in the lookup table and determining the depth in the first scene at the pixel as a depth corresponding to a record in the lookup table whose inner product with the respective vector is greatest among the computed inner products for the respective vector. In some implementations, computing an inner product of the respective vector with records in the lookup table includes computing an inner product of the respective vector and the respective record for each record in the respective lookup table. In some implementations, the respective vector for a respective pixel has a plurality of components, each of the components corresponds to a respective IR light intensity for the respective pixel for a respective captured IR image, and computing an inner product comprises computing a dot product.

In some implementations, each respective lookup table includes a plurality of normalized IR light intensity vectors, each normalized light intensity vector corresponds to a respective depth in the first scene.

In some implementations, the respective lookup table is downloaded to the camera system from a remote server during an initialization process.

In accordance with some implementations, a computing device has one or more processors, memory, and one or more programs stored in the memory. The programs are configured for execution by the one or more processors. The one or more programs including instructions for performing any of the processes described herein. In some implementations, the computing device is a server, which is distinct from a camera system. In other implementations, the computing device includes a camera.

In accordance with some implementations, a non-transitory computer readable storage medium stores one or more programs configured for execution by a computing device having one or more processors and memory. The one or more programs include instructions for performing any of the processes described herein. In some implementations, the computing device is a server, which is distinct from a camera system. In other implementations, the computing device includes a camera.

Thus, computing devices, server systems, and camera systems are provided with more efficient methods for utilizing IR emitters and a sensor array to classify objects in a scene or simplify creation of alerts. These disclosed camera systems thereby increase the effectiveness, efficiency, and user satisfaction with such systems. Such methods may complement or replace conventional methods.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 13, 14, 15A, and 15B illustrate a process of building a lookup table for depth estimation in accordance with some implementations.

FIGS. 19A-19I illustrate a process of zone recalculation in accordance with some implementations.

FIGS. 20A-20K illustrate a process of identifying floors, walls, and ceilings in a scene in accordance with some implementations.

FIGS. 21A-21E illustrate a process of estimating camera pose in accordance with some implementations.

FIGS. 31A-31E illustrate how some implementations address movement of a camera.

Like reference numerals refer to corresponding parts throughout the several views of the drawings.

DESCRIPTION OF IMPLEMENTATIONS

Figure 1:
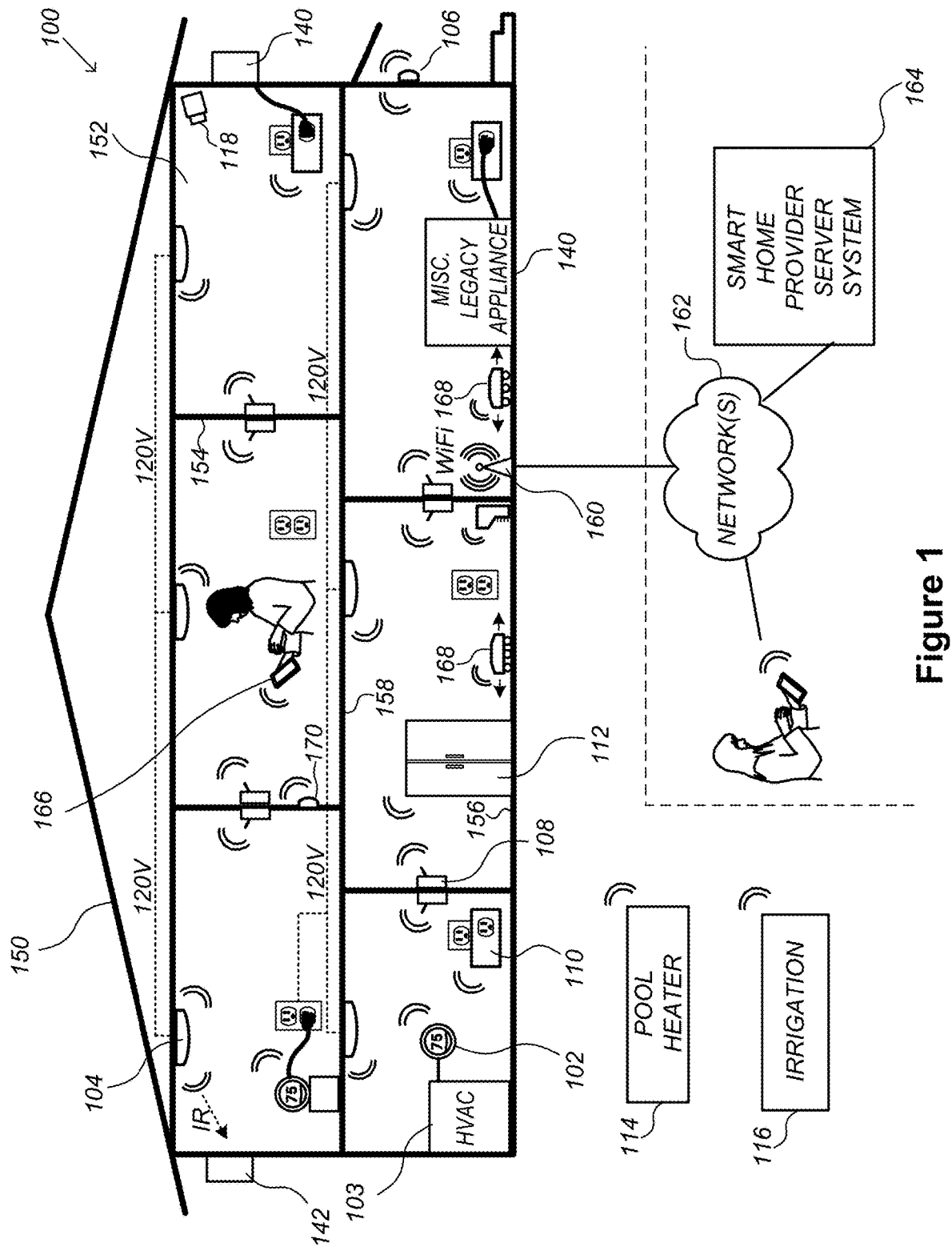
FIG. 1 is a representative smart home environment in accordance with some implementations.

Security cameras typically include illuminators so that video capture is possible even in low light conditions or in complete darkness. Many such cameras use infrared (IR) illuminators, which allow video capture without illuminating a scene with visible light. Typically, when illumination is needed, all of the illuminators are turned on.

Disclosed implementations utilize existing illuminators in different ways so that the camera can provide more information about a scene. One step in some implementations is to control the illuminators individually or in small groups rather than turning them all on or off together. Because the illuminators are in different locations with respect to the image sensor array, captured images are slightly different depending on which illuminators are on, as illustrated below in FIGS. 16A-16D.

As described below, some implementations build a depth map of a scene using the differences in captured images when different illuminators are on. A depth map estimates the distance between the image sensor array of the camera and the nearest object for each pixel in the field of vision of the camera. In some implementations, the depth map is implemented as an m×n matrix of depths, where m×n is the arrangement of pixels corresponding to image sensor array.

In some implementations, there is a one-to-one correspondence between pixels and individual image sensors in the array, but in many implementations the images are downsampled to create a more manageable set of pixels (e.g., 10,000 pixels instead of 1,000,000 pixels).

A depth map can be used in various ways to determine information about a scene. In some implementations, the depth map is used to help identify floors, walls, and ceilings. In some implementations, the depth map helps to identify when a camera has moved slightly, enabling automatic zone correction for previously defined zones in the scene. In some implementations, the depth map helps to identify the position of the camera (e.g., height above the floor and angle). These features provide useful information, and also allow for more accurate alerts. For example, if a region is identified as a ceiling, perceiving "movement" in that region is likely to be light reflections instead of an intruder. As another example, automatic zone correction can ensure that the proper region is monitored (e.g., a doorway) even if the zone is in a different location relative to a new camera position (e.g., because the camera was bumped).

Some implementations also enable detection of windows using characteristics of windows that are different from other objects. For example, whereas light incident on most objects scatters in all directions, light incident on a window either passes through the window or reflects off like a mirror. Identifying windows can be useful in various ways, including the prevention of false alerts. For example, movement of leaves on a tree outside of a window does not constitute an intruder inside a monitored room with the window.

These features may be implemented for an independent camera, but in some implementations, the camera is part of a smart home environment 100, as described below in FIGS. 1-8.

Video-based surveillance and security monitoring of a premises generates a continuous video feed that may last hours, days, and even months. Although motion-based recording triggers can help trim down the amount of video data that is actually recorded, there are a number of drawbacks associated with video recording triggers based on simple motion detection in the live video feed. For example, when motion detection is used as a trigger for recording a video segment, the threshold of motion detection must be set appropriately for the scene of the video; otherwise, the recorded video may include many video segments containing trivial movements (e.g., lighting change, leaves moving in the wind, shifting of shadows due to changes in sunlight exposure, etc.) that are of no significance to a reviewer. On the other hand, if the motion detection threshold is set too high, video data on important movements that are too small to trigger the recording may be irreversibly lost. Furthermore, at a location with many routine movements (e.g., cars passing through in front of a window) or constant movements (e.g., a scene with a running fountain, a river, etc.), recording triggers based on motion detection are rendered ineffective, because motion detection can no longer accurately select out portions of the live video feed that are of special significance. As a result, a human reviewer has to sift through a large amount of recorded video data to identify a small number of motion events after rejecting a large number of routine movements, trivial movements, and movements that are of no interest for a present purpose.

Due to at least the challenges described above, it is desirable to have a method that maintains a continuous recording of a live video feed such that irreversible loss of video data is avoided and, at the same time, augments simple motion detection with false positive suppression and motion event categorization. The false positive suppression techniques help to downgrade motion events associated with trivial movements and constant movements. The motion event categorization techniques help to create category-based filters for selecting only the types of motion events that are of interest for a present purpose. As a result, the reviewing burden on the reviewer may be reduced. In addition, as the present purpose of the reviewer changes in the future, the reviewer can simply choose to review other types of motion events by selecting the appropriate motion categories as event filters.

In addition, in some implementations, event categories can also be used as filters for real-time notifications and alerts. For example, when a new motion event is detected in a live video feed, the new motion event is immediately categorized, and if the event category of the newly detected mention event is a category of interest selected by a reviewer, a real-time notification or alert can be sent to the reviewer regarding the newly detected motion event. In addition, if the new event is detected in the live video feed as the reviewer is viewing a timeline of the video feed, the event indicator and the notification of the new event will have an appearance or display characteristic associated with the event category.

Furthermore, the types of motion events occurring at different locations and settings can vary greatly, and there are many event categories for all motion events collected at the video server system (e.g., the video server system 508). Therefore, it may be undesirable to have a set of fixed event categories from the outset to categorize motion events detected in all video feeds from all camera locations for all users. In some implementations, the motion event categories for the video stream from each camera are gradually established through machine learning, and are thus tailored to the particular setting and use of the video camera.

In addition, in some implementations, as new event categories are gradually discovered based on clustering of past motion events, the event indicators for the past events in a newly discovered event category are refreshed to reflect the newly discovered event category. In some implementations, a clustering algorithm automatically phases out old, inactive, and/or sparse categories when categorizing motion events. As a camera changes location, event categories that are no longer active are gradually retired without manual input to keep the motion event categorization model current. In some implementations, user input to edit the assignment of past motion events into respective event categories is also taken into account for future event category assignment and new category creation.

In some circumstances, there are multiple objects moving simultaneously within the scene of a video feed. In some implementations, the motion track associated with each moving object corresponds to a respective motion event candidate, such that the movement of the different objects in the same scene may be assigned to different motion event categories.

In general, motion events may occur in different regions of a scene at different times. Out of all the motion events detected within a scene of a video stream over time, a reviewer may only be interested in motion events that occur within or enter a particular zone of interest in the scene. In addition, the zones of interest may not be known to the reviewer and/or the video server system until long after one or more motion events of interest have occurred within the zones of interest. For example, a parent may not be interested in activities centered around a cookie jar until after some cookies have mysteriously disappeared. Furthermore, the zones of interest in the scene of a video feed can vary for a reviewer over time depending on the present purpose of the reviewer. For example, the parent may be interested in seeing all activities that occurred around the cookie jar one day when some cookies are missing, and the parent may be interested in seeing all activities that occurred around a mailbox the next day when some expected mail is missing. Accordingly, in some implementations, the techniques disclosed herein allow a reviewer to define and create one or more zones of interest within a static scene of a video feed, and then use the created zones of interest to retroactively identify all past motion events (or all motion events within a particular past time window) that have touched or entered the zones of interest. In some implementations, the identified motion events are presented to the user in a timeline or in a list. In some implementations, real-time alerts for any new motion events that touch or enter the zones of interest are sent to the reviewer. The ability to quickly identify and retrieve past motion events that are associated with a newly created zone of interest addresses the drawbacks of conventional zone monitoring techniques. Conventionally, the zones of interest must be defined first based on a certain degree of guessing and anticipation that may later prove to be inadequate or wrong. Also, in conventional systems, only future events (as opposed to both past and future events) within the zones of interest can be identified.

In some implementations, when detecting new motion events that have touched or entered some zone(s) of interest, the event detection is based on the motion information collected from the entire scene, rather than just within the zone(s) of interest. In particular, aspects of motion detection, motion object definition, motion track identification, false positive suppression, and event categorization are all based on image information collected from the entire scene, rather than just within each zone of interest. As a result, context around the zones of interest is taken into account when monitoring events within the zones of interest. Thus, the accuracy of event detection and categorization may be improved as compared to conventional zone monitoring techniques that perform all calculations with image data collected only within the zones of interest.

FIGS. 1-4 provide an overview of exemplary smart home device networks and capabilities. FIGS. 5-8 provide a description of the systems and devices participating in the video monitoring.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIG. 1 depicts a representative smart home environment in accordance with some implementations. The smart home environment 100 includes a structure 150, which may be a house, office building, garage, or mobile home. It will be appreciated that devices may also be integrated into a smart home environment 100 that does not include an entire structure 150, such as an apartment, condominium, or office space. Further, the smart home environment may control and/or be coupled to devices outside of the actual structure 150. Indeed, several devices in the smart home environment need not be physically within the structure 150. For example, a device controlling a pool heater 114 or irrigation system 116 may be located outside of structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with, and/or supported by a wall 154, a floor 156, or a ceiling 158.

In some implementations, the smart home environment 100 includes a plurality of devices, including intelligent, multi-sensing, network-connected devices, that integrate seamlessly with each other in a smart home network 202 and/or with a central server or a cloud-computing system to provide a variety of useful smart home functions. The smart home environment 100 may include one or more intelligent, multi-sensing, network-connected thermostats 102 ("smart thermostats"), one or more intelligent, network-connected, multi-sensing hazard detection units 104 ("smart hazard detectors"), and one or more intelligent, multi-sensing, network-connected entryway interface devices 106 ("smart doorbells"). In some implementations, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, and/or carbon monoxide). The smart doorbell 106 may detect a person's approach to or departure from a location (e.g., an outer door), control doorbell functionality, announce a person's approach or departure via audio or visual means, and/or control settings on a security system (e.g., to activate or deactivate the security system when occupants go and come).

In some implementations, the smart home environment 100 includes one or more intelligent, multi-sensing, network-connected wall switches 108 ("smart wall switches"), along with one or more intelligent, multi-sensing, network-connected wall plug interfaces 110 ("smart wall plugs"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 includes a plurality of intelligent, multi-sensing, network-connected appliances 112 ("smart appliances"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices may further allow a user to interact with the device even if the user is not proximate to the device. For example, a user may communicate with a device using a computer (e.g., a desktop computer, laptop computer, or tablet) or other portable electronic device (e.g., a smartphone) 166. A webpage or application may be configured to receive communications from the user and control the device based on the communications and/or to present information about the device's operation to the user. For example, the user may view a current set point temperature for a device and adjust it using a computer. The user may be in the structure during this remote communication or outside the structure.

As discussed above, users may control the smart thermostat and other smart devices in the smart home environment 100 using a network-connected computer or portable electronic device 166. In some examples, some or all of the occupants (e.g., individuals who live in the home) may register their devices 166 with the smart home environment 100. Such registration may be made at a central server to authenticate the occupant and/or the device as being associated with the home and to give permission to the occupant to use the device to control the smart devices in the home. Occupants may use their registered devices 166 to remotely control the smart devices of the home, such as when an occupant is at work or on vacation. The occupant may also use a registered device to control the smart devices when the occupant is actually located inside the home, such as when the occupant is sitting on a couch inside the home. It should be appreciated that instead of or in addition to registering the devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, the devices 102, 104, 106, 108, 110, 112, 114, 116, and/or 118 ("the smart devices") are capable of data communications and information sharing with other smart devices, a central server or cloud-computing system, and/or other devices that are network-connected. The required data communications may be carried out using any of a variety of custom or standard wireless protocols (IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (CAT6 Ethernet, HomePlug, etc.), or any other suitable communication protocol.

In some implementations, the smart devices serve as wireless or wired repeaters. For example, a first one of the smart devices communicates with a second one of the smart devices via a wireless router. The smart devices may further communicate with each other via a connection to one or more networks 162 such as the Internet. Through the one or more networks 162, the smart devices may communicate with a smart home provider server system 164 (also called a central server system and/or a cloud-computing system herein). In some implementations, the smart home provider server system 164 may include multiple server systems, each dedicated to data processing associated with a respective subset of the smart devices (e.g., a video server system may be dedicated to data processing associated with camera(s) 118). The smart home provider server system 164 may be associated with a manufacturer, support entity, or service provider associated with the smart device. In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

Figure 2:
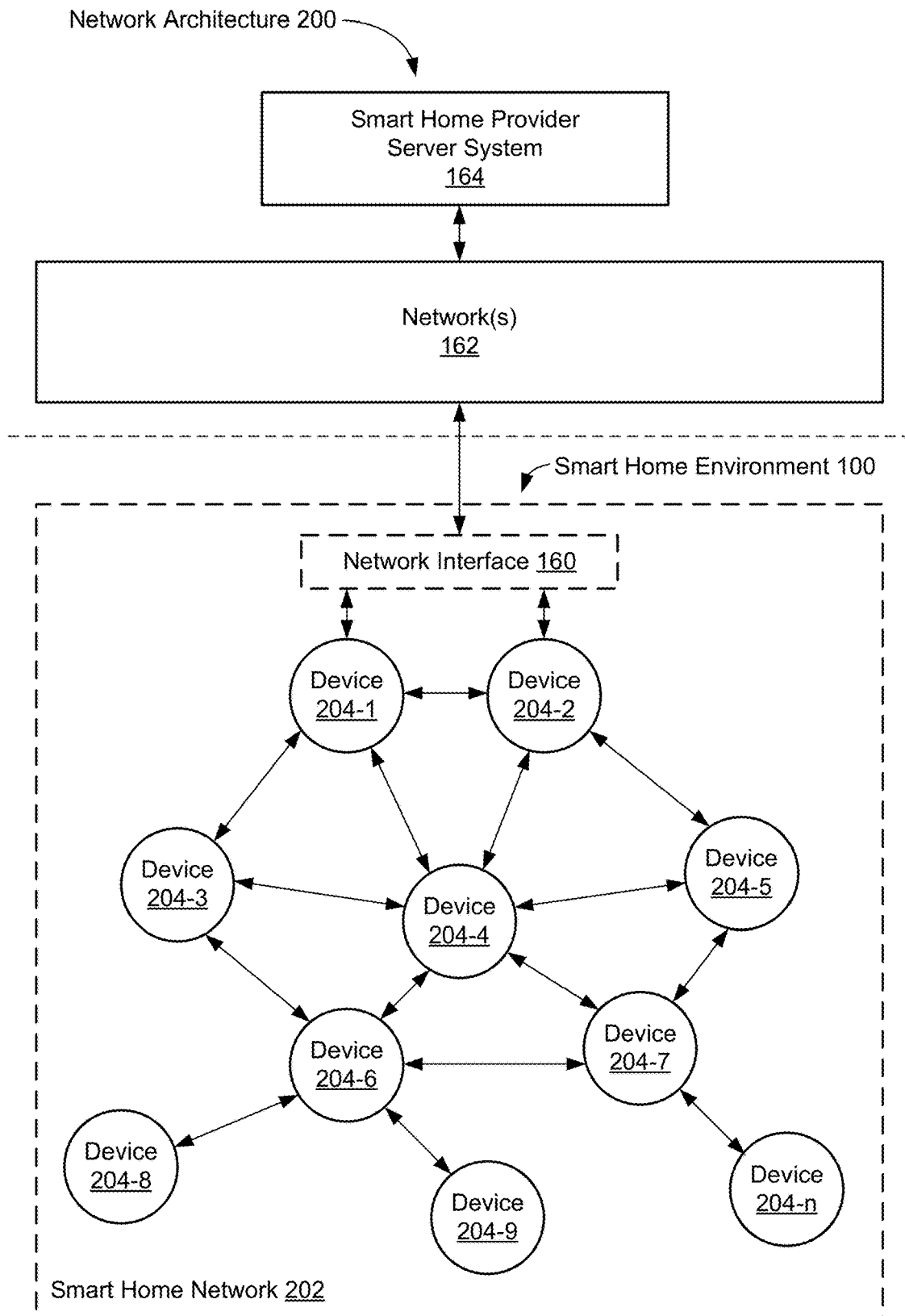
FIG. 2 is a block diagram illustrating a representative network architecture that includes a smart home network in accordance with some implementations.

FIG. 2 is a block diagram illustrating a representative network architecture 200 that includes a smart home network 202 in accordance with some implementations. In some implementations, one or more smart devices 204 in the smart home environment 100 (e.g., the devices 102, 104, 106, 108, 110, 112, 114, 116, and/or 118) combine to create a mesh network in the smart home network 202. In some implementations, the one or more smart devices 204 in the smart home network 202 operate as a smart home controller. In some implementations, a smart home controller has more computing power than other smart devices. In some implementations, a smart home controller processes inputs (e.g., from the smart device(s) 204, the electronic device 166, and/or the smart home provider server system 164) and sends commands (e.g., to the smart device(s) 204 in the smart home network 202) to control operation of the smart home environment 100. In some implementations, some of the smart device(s) 204 in the mesh network are "spokesman" nodes (e.g., node 204-1) and others are "low-powered" nodes (e.g., node 204-9). Some of the smart device(s) 204 in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the central server or cloud-computing system 164. In some implementations, one or more "spokesman" nodes operate as a smart home controller. On the other hand, the devices that are battery powered are referred to as "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

As described, the spokesman nodes and some of the low-powered nodes are capable of "listening." Accordingly, users, other devices, and/or the central server or cloud-computing system 164 may communicate control commands to the low-powered nodes. For example, a user may use the portable electronic device 166 (e.g., a smartphone) to send commands over the Internet to the central server or cloud-computing system 164, which then relays the commands to one or more spokesman nodes in the smart home network 202. The spokesman nodes drop down to a low-power protocol to communicate the commands to the low-power nodes throughout the smart home network 202, as well as to other spokesman nodes that did not receive the commands directly from the central server or cloud-computing system 164.

In some implementations, a smart nightlight 170 is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart home network 202 as well as over the one or more networks 162 to the central server or cloud-computing system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors, carbon monoxide/dioxide sensors, occupancy/motion sensors, ambient light sensors, temperature sensors, humidity sensors, and the like. Furthermore, the smart hazard detectors 104 may send messages that correspond to each of the respective sensors to the other devices and/or the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore may include more power-consuming components, such as one or more communication chips capable of bidirectional communication in a variety of protocols.

In some implementations, the smart home environment 100 includes service robots 168 that are configured to carry out, in an autonomous manner, any of a variety of household tasks.

Figure 3:
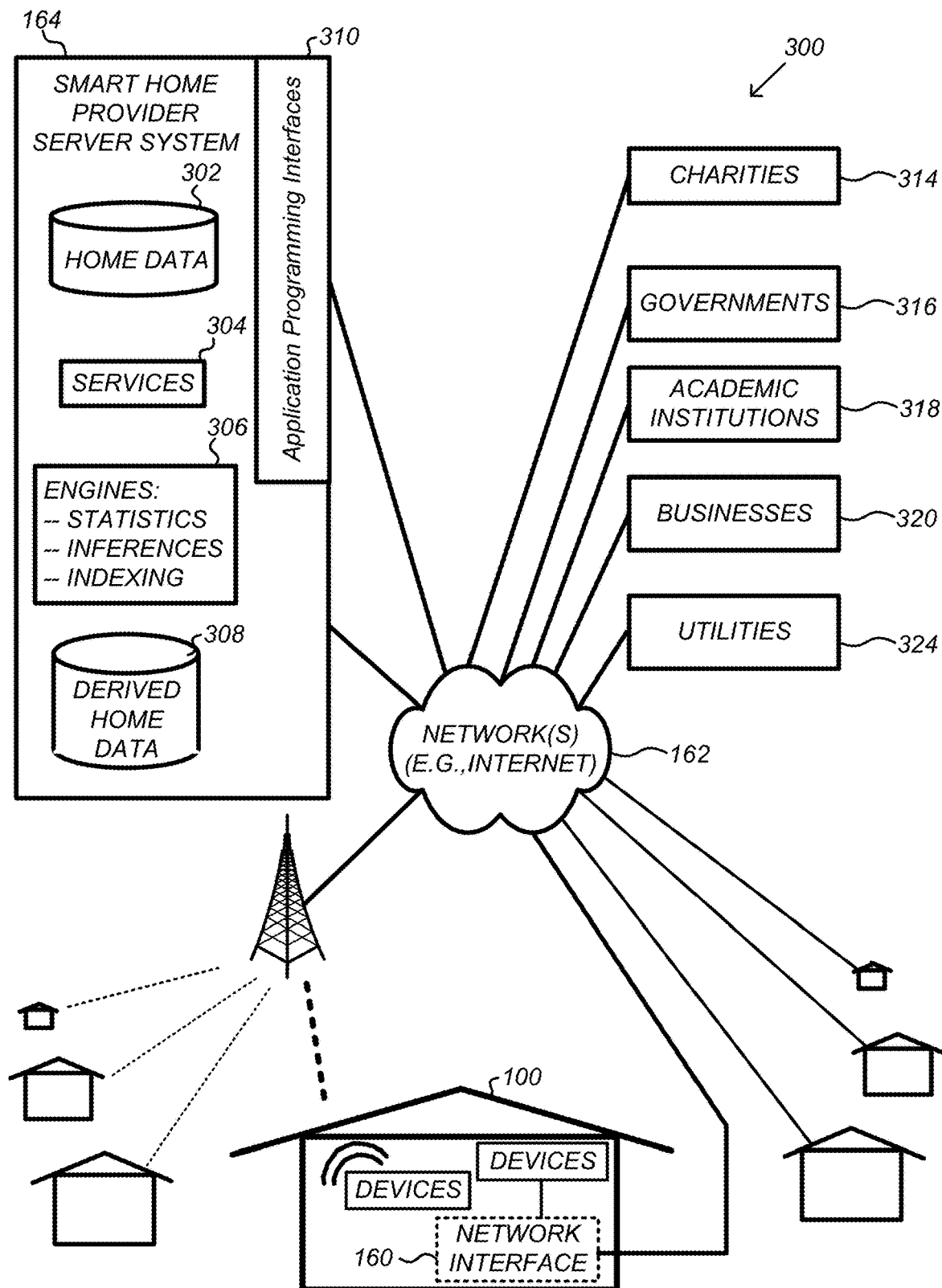
FIG. 3 illustrates a network-level view of an extensible platform for devices and services, which may be integrated with the smart home environment of FIG. 1 in accordance with some implementations.

FIG. 3 illustrates a network-level view of an extensible devices and services platform 300 with which the smart home environment 100 of FIG. 1 is integrated, in accordance with some implementations. The extensible devices and services platform 300 includes remote servers or cloud computing system 164. Each of the intelligent, network-connected devices 102, 104, 106, 108, 110, 112, 114, 116, and 118 from FIG. 1 (identified simply as "devices" in FIGS. 2-4) may communicate with the remote servers or cloud computing system 164. For example, a connection to the one or more networks 162 may be established either directly (e.g., using 3G/4G connectivity to a wireless carrier), or through a network interface 160 (e.g., a router, switch, gateway, hub, or an intelligent, dedicated whole-home control node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments, where the devices may routinely transmit home data or may transmit home data in specific instances (e.g., when a device queries the home data 302). Example collected home data 302 includes, without limitation, power consumption data, occupancy data, HVAC settings and usage data, carbon monoxide levels data, carbon dioxide levels data, volatile organic compounds levels data, sleeping schedule data, cooking schedule data, inside and outside temperature and humidity data, television viewership data, inside and outside noise level data, pressure data, video data, etc.

In some implementations, the smart home provider server system 164 provides one or more services 304 to smart homes. Example services 304 include, without limitation, software updates, customer support, sensor data collection/logging, remote access, remote or distributed control, and/or use suggestions (e.g., based on the collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and the services platform 300 includes a processing engine 306, which may be concentrated at a single server or distributed among several different computing entities. In some implementations, the processing engine 306 includes engines configured to receive data from the devices of smart home environments (e.g., via the Internet and/or a network interface), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, use statistics, use statistics relative to use of other devices, use patterns, and/or statistics summarizing sensor readings are generated by the processing engine 306 and transmitted. The results or statistics may be provided via the one or more networks 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications, such as web applications or mobile applications, that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
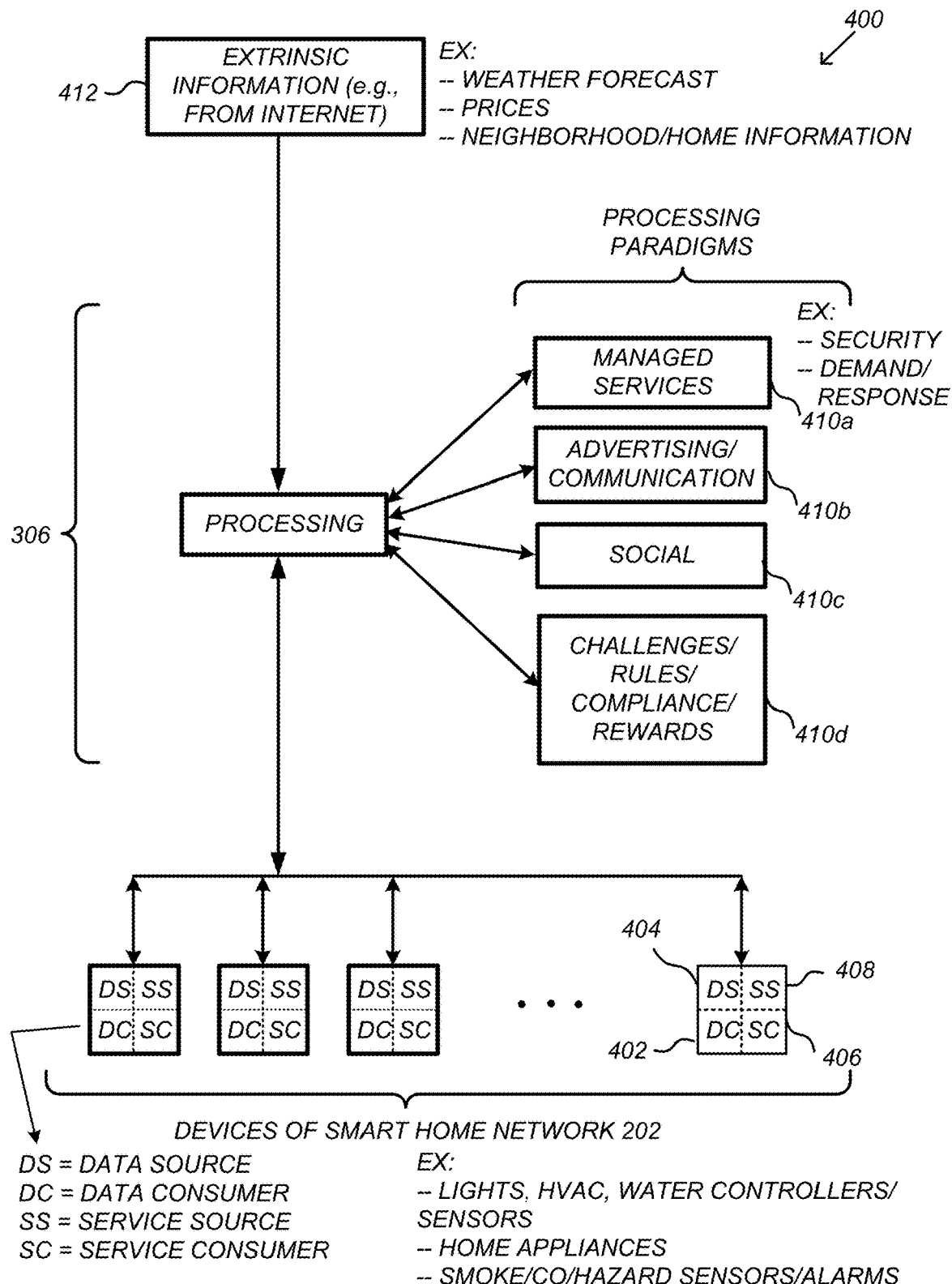
FIG. 4 illustrates an abstracted functional view of the extensible platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows the processing engine 306 as including a number of processing paradigms 410. In some implementations, the processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, and/or alerting a user of a current or predicted future event or characteristic. In some implementations, the processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, the processing engine 306 includes a social paradigm 410c that uses information from a social network, provides information to a social network (for example, based on device usage), and/or processes data associated with user and/or device interactions with the social network platform. For example, a user's status as reported to trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, the processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, the processing engine 306 integrates or otherwise uses extrinsic information 412 from extrinsic sources to improve the functioning of one or more processing paradigms. The extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
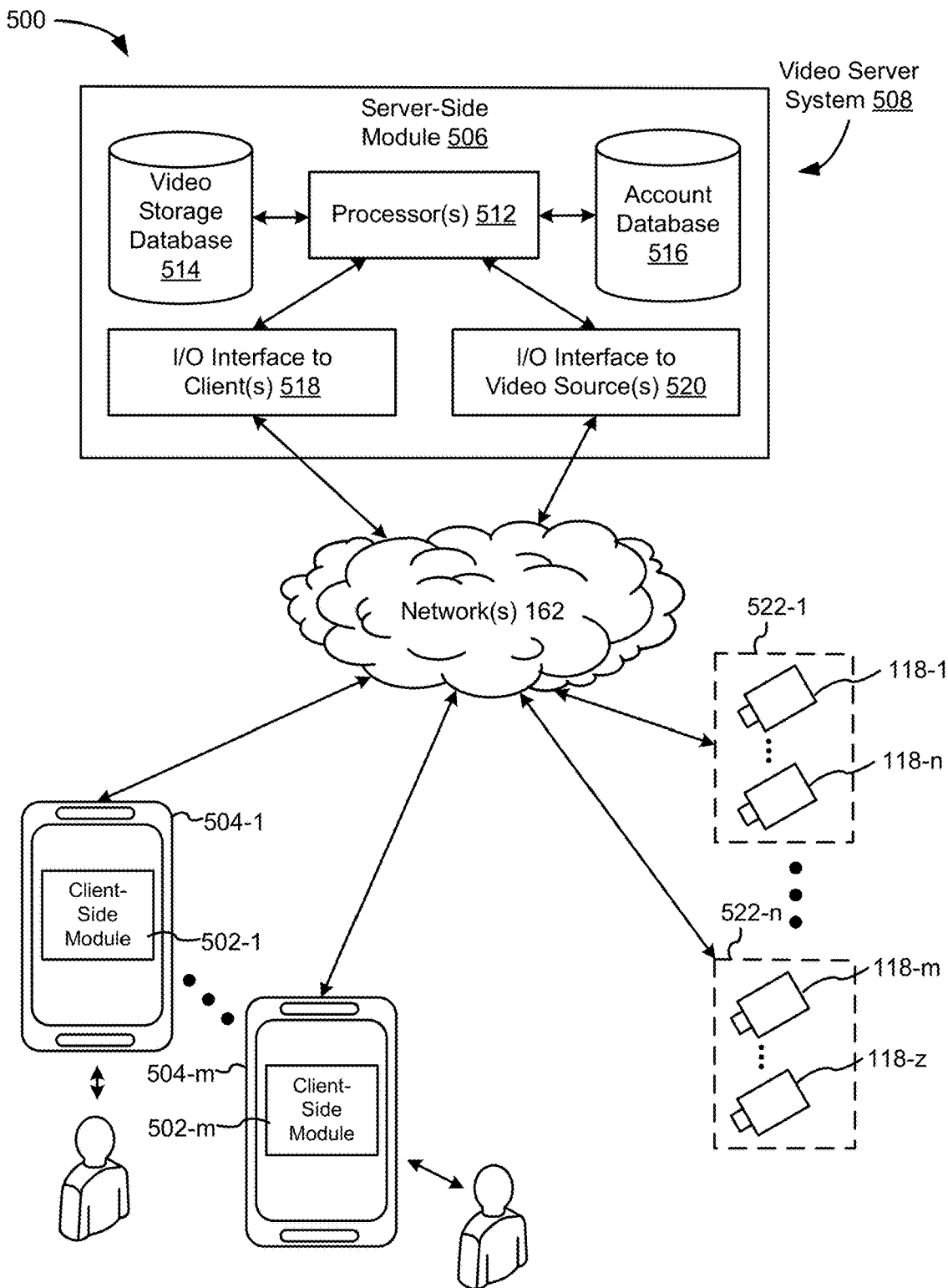
FIG. 5 is a representative operating environment in which a video server system interacts with client devices and video sources in accordance with some implementations.

FIG. 5 illustrates a representative operating environment 500 in which a video server system 508 provides data processing for monitoring and facilitating review of motion events in video streams captured by video cameras 118. As shown in FIG. 5, the video server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the video server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the video server system 508. In some implementations, the video server system 508 is a dedicated video processing server that provides video processing services to video sources and client devices 504 independent of other services provided by the video server system 508.

In some implementations, each of the video sources 522 includes one or more video cameras 118 that capture video and send the captured video to the video server system 508 substantially in real-time. In some implementations, each of the video sources 522 includes a controller device (not shown) that serves as an intermediary between the one or more cameras 118 and the video server system 508. The controller device receives the video data from the one or more cameras 118, optionally performs some preliminary processing on the video data, and sends the video data to the video server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the video server system 508.

As shown in FIG. 5, in accordance with some implementations, each of the client devices 504 includes a client-side module 502. The client-side module 502 communicates with a server-side module 506 executed on the video server system 508 through the one or more networks 162. The client-side module 502 provides client-side functionality for the event monitoring and review processing and communications with the server-side module 506. The server-side module 506 provides server-side functionality for event monitoring and review processing for any number of client-side modules 502 each residing on a respective client device 504. The server-side module 506 also provides server-side functionality for video processing and camera control for any number of the video sources 522, including any number of control devices and the cameras 118.

In some implementations, the server-side module 506 includes one or more processors 512, a video storage database 514, an account database 516, an I/O interface to one or more client devices 518, and an I/O interface to one or more video sources 520. The I/O interface to one or more clients 518 facilitates the client-facing input and output processing for the server-side module 506. The account database 516 stores a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the video server system 508 is implemented on one or more standalone data processing apparatuses or a distributed network of computers. In some implementations, the video server system 508 also employs various virtual devices and/or services of third party service providers (e.g., third-party cloud service providers) to provide the underlying computing resources and/or infrastructure resources of the video server system 508. In some implementations, the video server system 508 includes, but is not limited to, a handheld computer, a tablet computer, a laptop computer, a desktop computer, or a combination of any two or more of these data processing devices or other data processing devices.

The server-client environment 500 shown in FIG. 5 includes both a client-side portion (e.g., the client-side module 502) and a server-side portion (e.g., the server-side module 506). The division of functionality between the client and server portions of operating environment 500 can vary in different implementations. Similarly, the division of functionality between a video source 522 and the video server system 508 can vary in different implementations. For example, in some implementations, the client-side module 502 is a thin-client that provides only user-facing input and output processing functions, and delegates all other data processing functionality to a backend server (e.g., the video server system 508). Similarly, in some implementations, a respective one of the video sources 522 is a simple video capturing device that continuously captures and streams video data to the video server system 508 with limited or no local preliminary processing on the video data. Although many aspects of the present technology are described from the perspective of the video server system 508, the corresponding actions performed by a client device 504 and/or the video sources 522 would be apparent to one of skill in the art. Similarly, some aspects of the present technology may be described from the perspective of a client device or a video source, and the corresponding actions performed by the video server would be apparent to one of skill in the art. Furthermore, some aspects of the present technology may be performed by the video server system 508, a client device 504, and a video sources 522 cooperatively.

Figure 6:
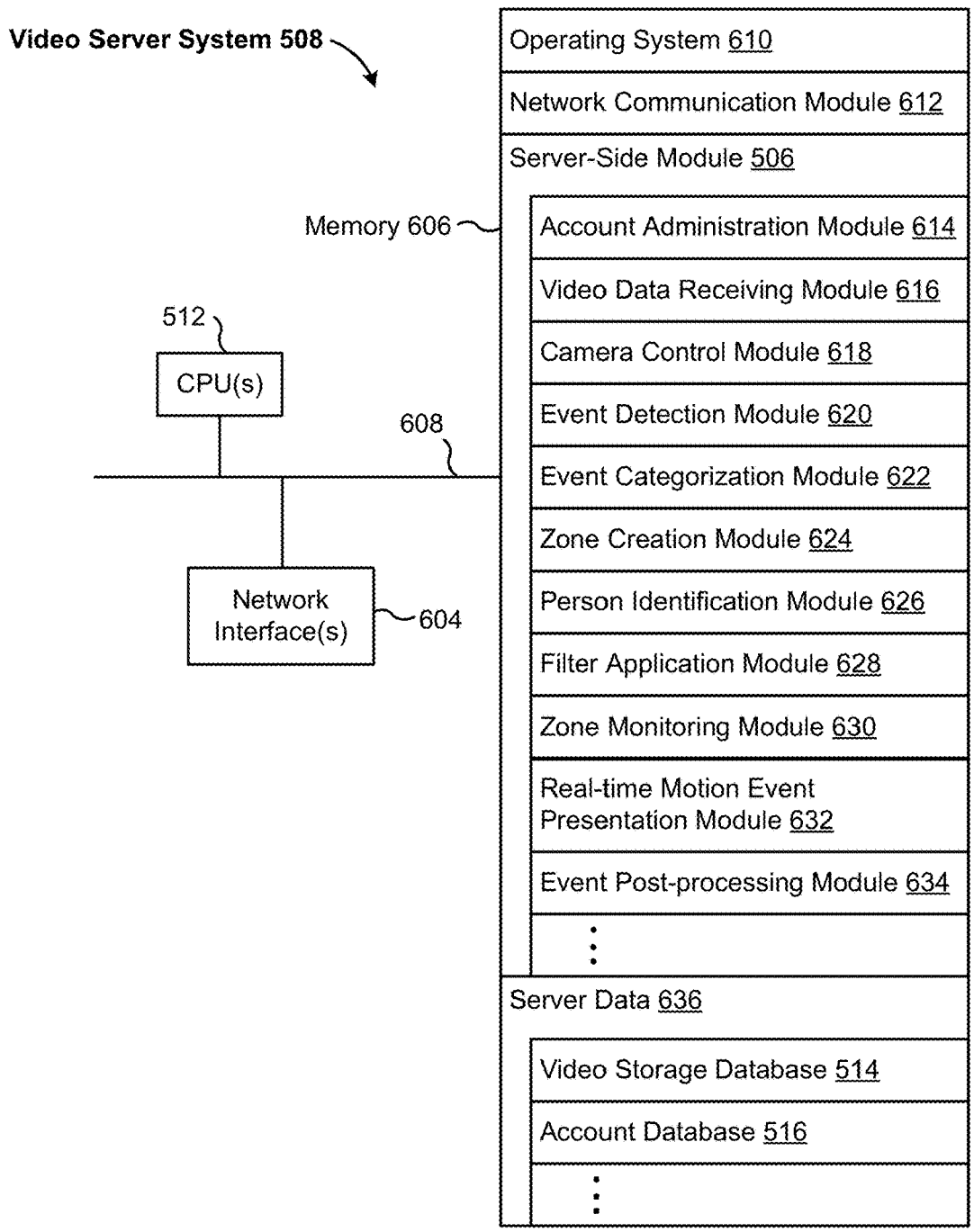
FIG. 6 is a block diagram illustrating a representative video server system in accordance with some implementations.

FIG. 6 is a block diagram illustrating a video server system 508 in accordance with some implementations. The video server system 508 typically includes one or more processing units (CPUs) 512, one or more network interfaces 604 (e.g., including the I/O interface to one or more clients 504 and the I/O interface to one or more video sources 522), memory 606, and one or more communication buses 608 for interconnecting these components (sometimes called a chipset). The memory 606 includes high-speed random access memory, such as DRAM, SRAM, DDR RAM, or other random access solid state memory devices. In some implementations, the memory 606 includes non-volatile memory, such as one or more magnetic disk storage devices, one or more optical disk storage devices, one or more flash memory devices, or one or more other non-volatile solid state storage devices. In some implementations, the memory 606 includes one or more storage devices remotely located from the one or more processing units 512. The memory 606, or alternatively the non-volatile memory within the memory 606, comprises a non-transitory computer readable storage medium. In some implementations, the memory 606, or the non-transitory computer readable storage medium of the memory 606, stores the following programs, modules, and data structures, or a subset or superset thereof:

- an operating system 610, including procedures for handling various basic system services and for performing hardware dependent tasks;
- a network communication module 612 for connecting the video server system 508 to other computing devices (e.g., the client devices 504 and the video sources 522 including camera(s) 118) connected to the one or more networks 162 via the one or more network interfaces 604 (wired or wireless);
- a server-side module 506, which provides server-side data processing and functionality for the event monitoring and review, including but not limited to:
  - an account administration module 614 for creating reviewer accounts, performing camera registration processing to establish associations between video sources to their respective reviewer accounts, and providing account login-services to the client devices 504;
  - a video data receiving module 616 for receiving raw video data from the video sources 522, and preparing the received video data for event processing and long-term storage in the video storage database 514;
  - a camera control module 618 for generating and sending server-initiated control commands to modify the operation modes of the video sources, and/or receiving and forwarding user-initiated control commands to modify the operation modes of the video sources 522;
  - an event detection module 620 for detecting motion event candidates in video streams from each of the video sources 522, including motion track identification, false positive suppression, and event mask generation and caching;
  - an event categorization module 622 for categorizing motion events detected in received video streams;
  - a zone creation module 624 for generating zones of interest in accordance with user input;
  - a person identification module 626 for identifying characteristics associated with the presence of humans in the received video streams;
  - a filter application module 628 for selecting event filters (e.g., event categories, zones of interest, a human filter, etc.) and applying the selected event filters to past and new motion events detected in the video streams;
  - a zone monitoring module 630 for monitoring motion within selected zones of interest and generating notifications for new motion events detected within the selected zones of interest, where the zone monitoring takes into account changes in the surrounding context of the zones and is not confined within the selected zones of interest;
  - a real-time motion event presentation module 632 for dynamically changing characteristics of event indicators displayed in user interfaces as new event filters, such as new event categories or new zones of interest, and for providing real-time notifications as new motion events are detected in the video streams; and
  - an event post-processing module 634 for providing summary time-lapse for past motion events detected in video streams, and providing event and category editing functions to users for revising past event categorization results; and
- server data 636, which includes data for use in data processing of motion event monitoring and review. In some implementations, this includes one or more of:
  - a video storage database 514 storing raw video data associated with each of the video sources 522 (each including one or more cameras 118) of each reviewer account, as well as event categorization models (e.g., event clusters, categorization criteria, etc.), event categorization results (e.g., recognized event categories, and assignment of past motion events to the recognized event categories, representative events for each recognized event category, etc.), event masks for past motion events, video segments for each past motion event, preview video (e.g., sprites) of past motion events, and other relevant metadata (e.g., names of event categories, locations of the cameras 118, creation time, duration, DTPZ settings of the cameras 118, etc.) associated with the motion events; and
  - an account database 516 for storing account information for reviewer accounts, including login-credentials, associated video sources, relevant user and hardware characteristics (e.g., service tier, camera model, storage capacity, processing capabilities, etc.), user interface settings, monitoring preferences, etc.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 606 stores a subset of the modules and data structures identified above. In some implementations, the memory 606 stores additional modules and data structures not described above.

Figure 7:
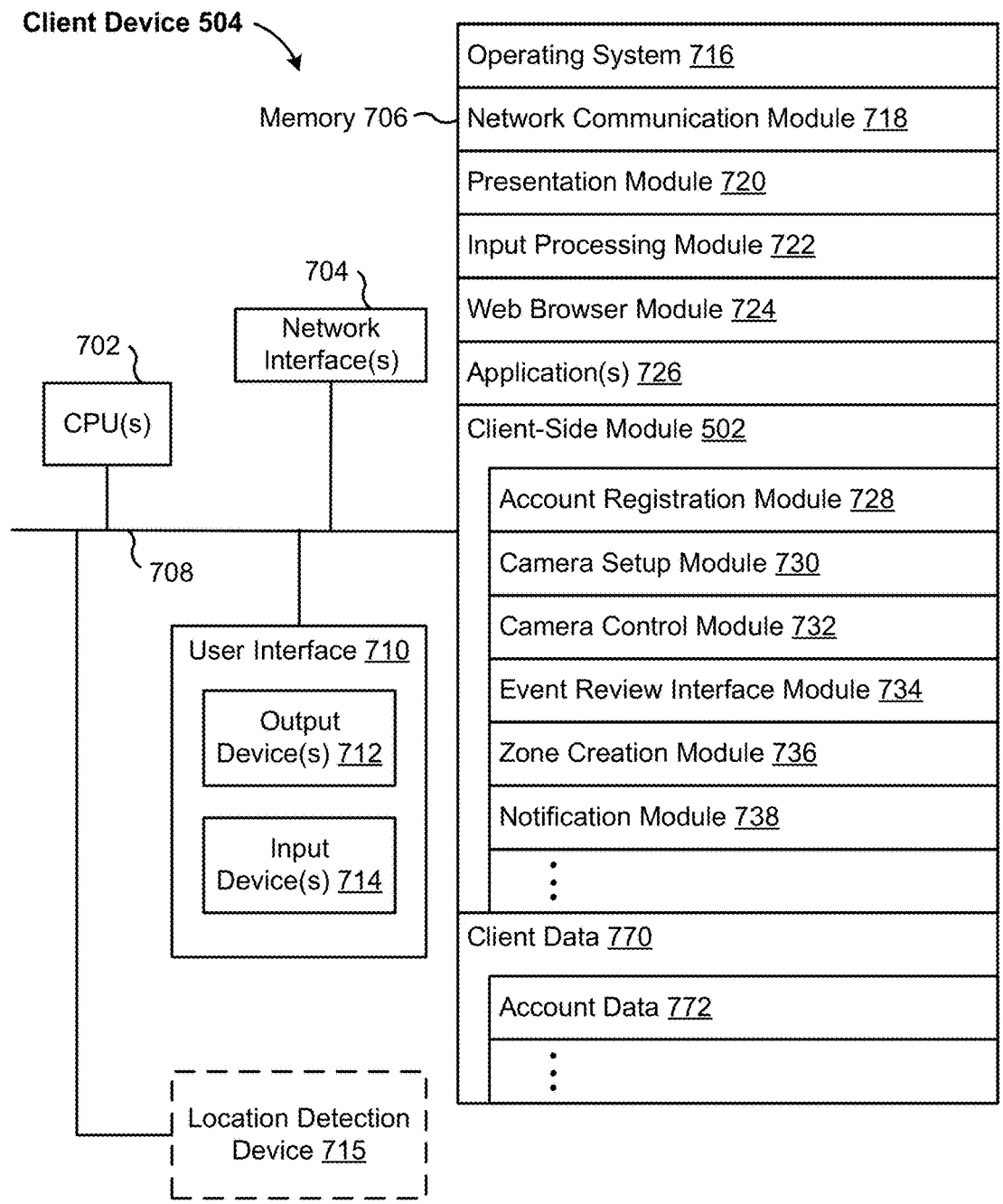
FIG. 7 is a block diagram illustrating a representative client device in accordance with some implementations.

FIG. 7 is a block diagram illustrating a representative client device 504 associated with a reviewer account in accordance with some implementations. The client device 504 typically includes one or more processing units (CPUs) 702, one or more network interfaces 704, memory 706, and one or more communication buses 708 for interconnecting these components (sometimes called a chipset). The client device 504 also includes a user interface 710. The user interface 710 includes one or more output devices 712 that enable presentation of media content, including one or more speakers and/or one or more visual displays. The user interface 710 also includes one or more input devices 714, including user interface components that facilitate user input such as a keyboard, a mouse, a voice-command input unit or microphone, a touch screen display, a touch-sensitive input pad, a gesture capturing camera, or other input buttons or controls. Furthermore, the client device 504 optionally uses a microphone and voice recognition or a camera and gesture recognition to supplement or replace the keyboard. In some implementations, the client device 504 includes one or more cameras, scanners, or photo sensor units for capturing images. In some implementations, the client device 504 includes a location detection device 715, such as a GPS (global positioning satellite) or other geo-location receiver, for determining the location of the client device 504.

The memory 706 includes high-speed random access memory, such as DRAM, SRAM, DDR RAM, or other random access solid state memory devices. In some implementations, the memory 706 includes non-volatile memory, such as one or more magnetic disk storage devices, one or more optical disk storage devices, one or more flash memory devices, or one or more other non-volatile solid state storage devices. In some implementations, the memory 706 includes one or more storage devices remotely located from the one or more processing units 702. The memory 706, or alternatively the non-volatile memory within the memory 706, comprises a non-transitory computer readable storage medium. In some implementations, the memory 706, or the non-transitory computer readable storage medium of memory 706, stores the following programs, modules, and data structures, or a subset or superset thereof:

- an operating system 716, which includes procedures for handling various basic system services and for performing hardware dependent tasks;
- a network communication module 718 for connecting the client device 504 to other computing devices (e.g., the video server system 508 and the video sources 522) connected to the one or more networks 162 via the one or more network interfaces 704 (wired or wireless);
- a presentation module 720 for enabling presentation of information (e.g., user interfaces for application(s) 726 or the client-side module 502, widgets, websites and web pages thereof, and/or games, audio and/or video content, text, etc.) at the client device 504 via the one or more output devices 712 (e.g., displays, speakers, etc.) associated with the user interface 710;
- an input processing module 722 for detecting one or more user inputs or interactions from one of the one or more input devices 714 and interpreting the detected input or interaction;
- a web browser module 724 for navigating, requesting (e.g., via HTTP), and displaying websites and web pages thereof, including a web interface for logging into a reviewer account, controlling the video sources associated with the reviewer account, establishing and selecting event filters, and editing and reviewing motion events detected in the video streams of the video sources;
- one or more applications 726 for execution by the client device 504 (e.g., games, social network applications, smart home applications, and/or other web or non-web based applications);
- a client-side module 502, which provides client-side data processing and functionality for monitoring and reviewing motion events detected in the video streams of one or more video sources, including but not limited to:
  - an account registration module 728 for establishing a reviewer account and registering one or more video sources with the video server system 508;
  - a camera setup module 730 for setting up one or more video sources within a local area network, and enabling the one or more video sources to access the video server system 508 on the Internet through the local area network;
  - a camera control module 732 for generating control commands for modifying an operating mode of the one or more video sources in accordance with user input;
  - an event review interface module 734 for providing user interfaces for reviewing event timelines, editing event categorization results, selecting event filters, presenting real-time filtered motion events based on existing and newly created event filters (e.g., event categories, zones of interest, a human filter, etc.), presenting real-time notifications (e.g., pop-ups) for newly detected motion events, and presenting smart time-lapse of selected motion events;
  - a zone creation module 736 for providing a user interface for creating zones of interest for each video stream in accordance with user input, and sending the definitions of the zones of interest to the video server system 508; and
  - a notification module 738 for generating real-time notifications for all or selected motion events on the client device 504 outside of the event review user interface; and
- client data 770 storing data associated with the reviewer account and the video sources 522, including, but not limited to:
  - account data 772, which includes information related to the reviewer account, and the video sources, such as cached login credentials, camera characteristics, user interface settings, display preferences, etc.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, the memory 706 stores a subset of the modules and data structures identified above. In some implementations, the memory 706 stores additional modules and data structures not described above.

In some implementations, at least some of the functions of the video server system 508 are performed by the client device 504, and the corresponding sub-modules of these functions may be located within the client device 504 rather than the video server system 508. In some implementations, at least some of the functions of the client device 504 are performed by the video server system 508, and the corresponding sub-modules of these functions may be located within the video server system 508 rather than the client device 504. The client device 504 and the video server system 508 shown in FIGS. 6-7, respectively, are merely illustrative, and different configurations of the modules for implementing the functions described herein are possible in various implementations.

Figure 8:
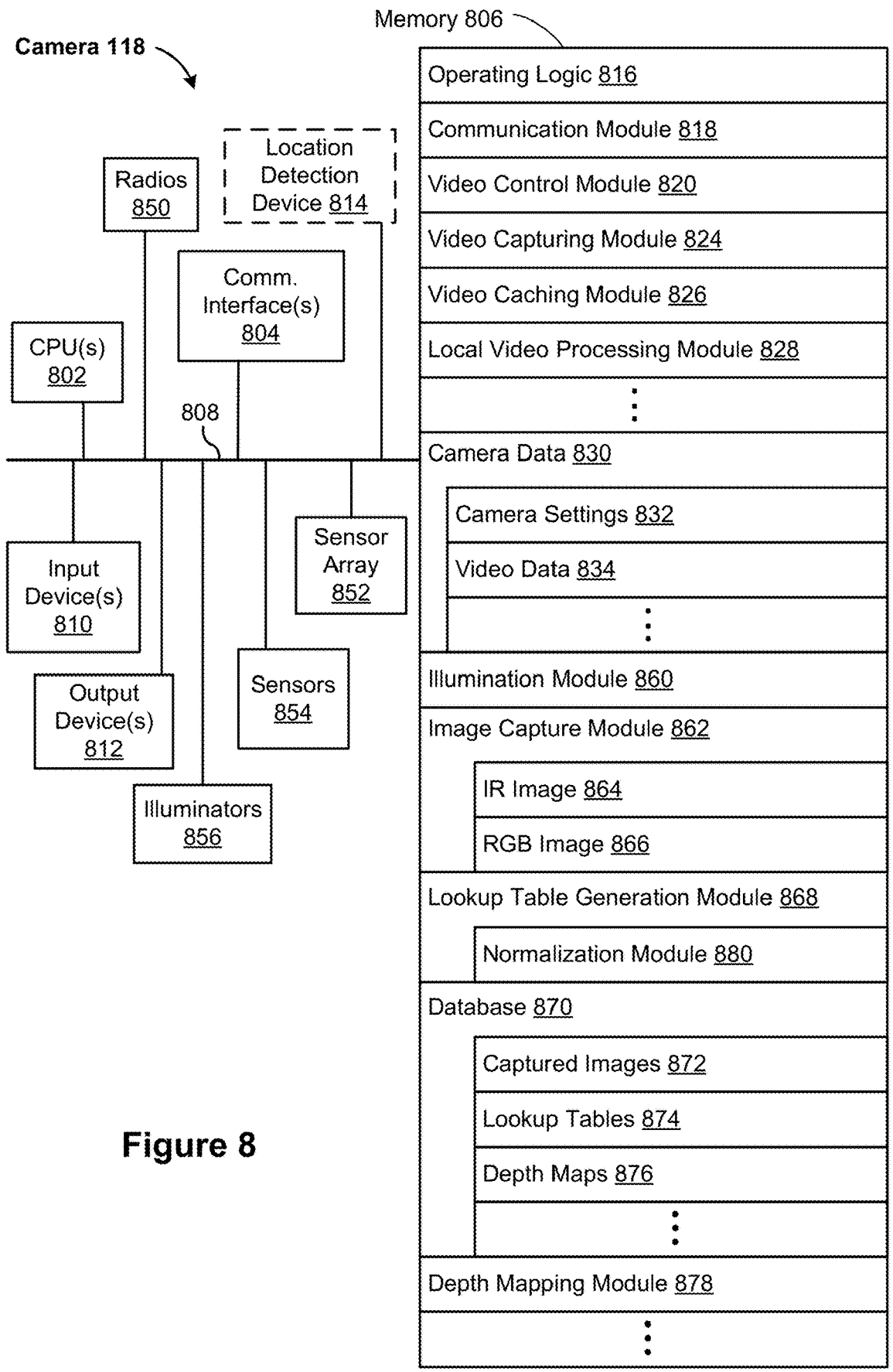
FIG. 8 is a block diagram illustrating a representative video capturing device (e.g., a camera) in accordance with some implementations.

FIG. 8 is a block diagram illustrating a representative camera system 118 in accordance with some implementations. Sometimes the camera system 118 is referred to herein as a "camera" 118. In some implementations, the camera system 118 includes one or more processing units 802 (e.g., CPUs, ASICs, FPGAs, or microprocessors), one or more communication interfaces 804, memory 806, and one or more communication buses 808 for interconnecting these components (sometimes called a chipset). In some implementations, the camera 118 includes one or more input devices 810 such as one or more buttons for receiving input and one or more microphones. In some implementations, the camera 118 includes one or more output devices 812 such as one or more indicator lights, a sound card, a speaker, a small display for displaying textual information and error codes, etc. In some implementations, the camera 118 includes a location detection device 814, such as a GPS (global positioning satellite) or other geo-location receiver, for determining the location of the camera 118.

Figure 10:
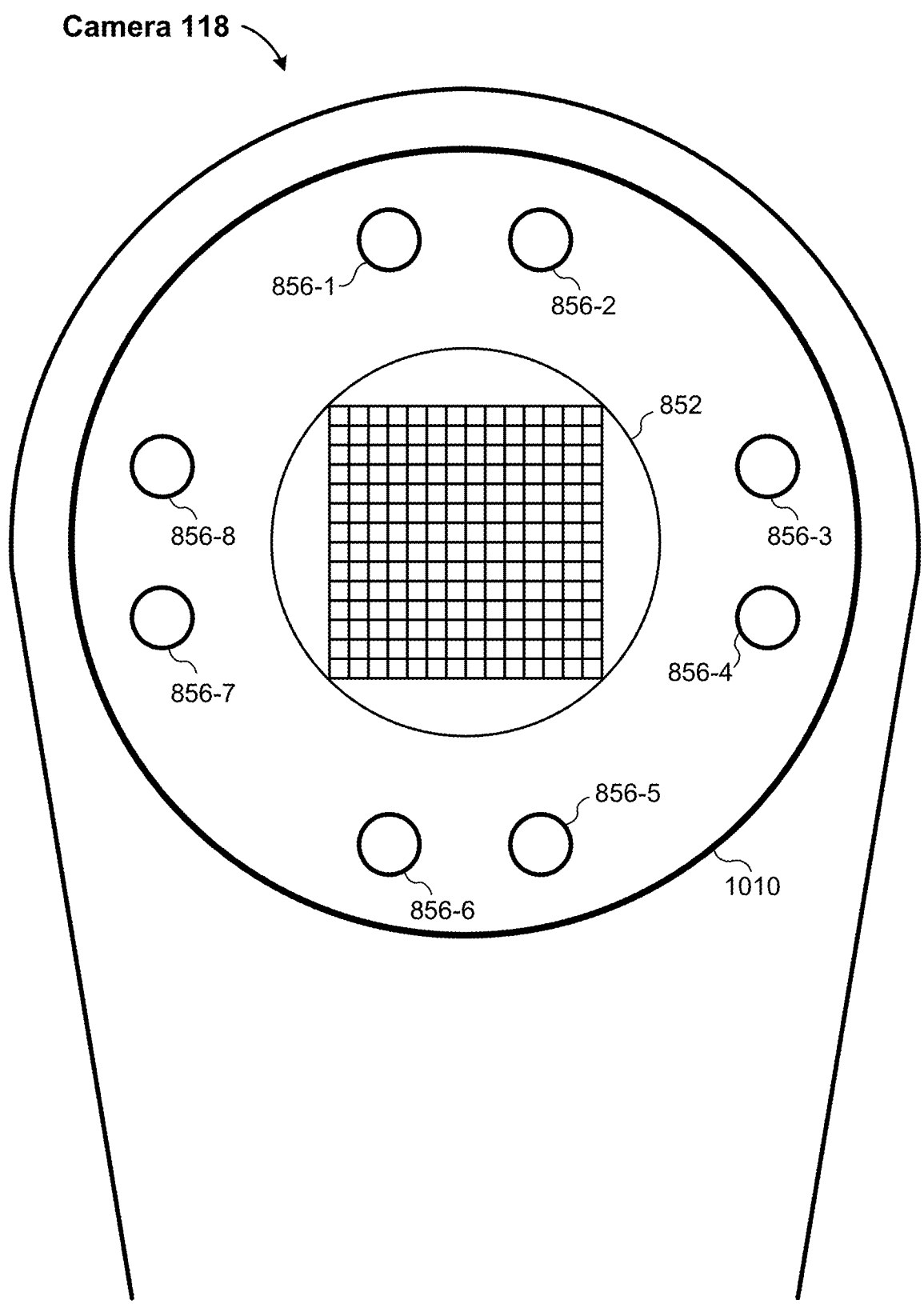
FIGS. 10-12 illustrate the illuminators and array of memory sensors for a camera in accordance with some implementations.
Figure 11:
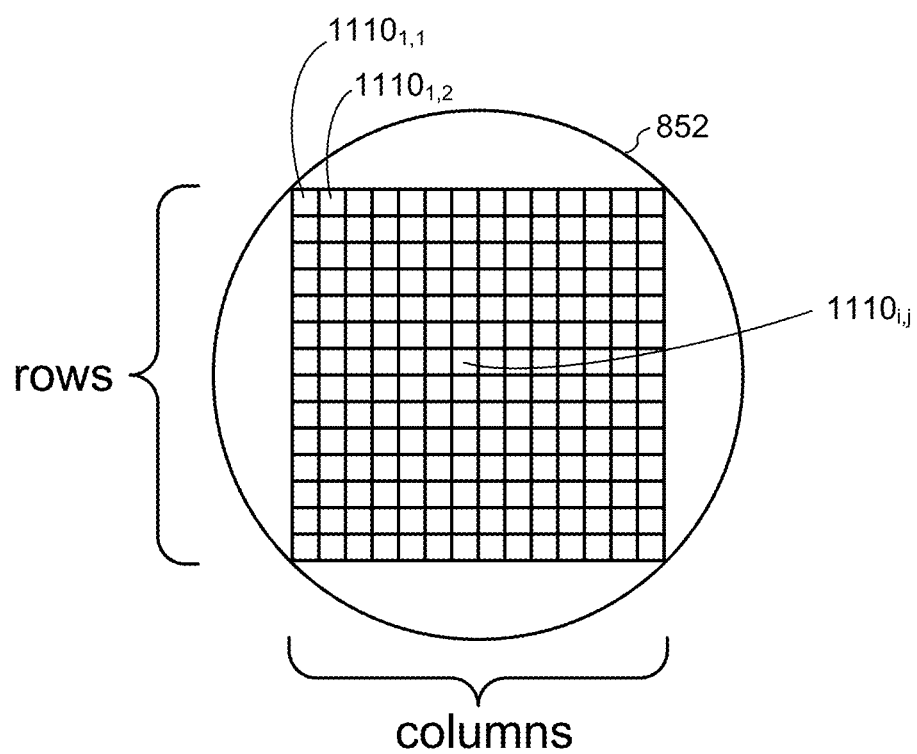
Figure 12:
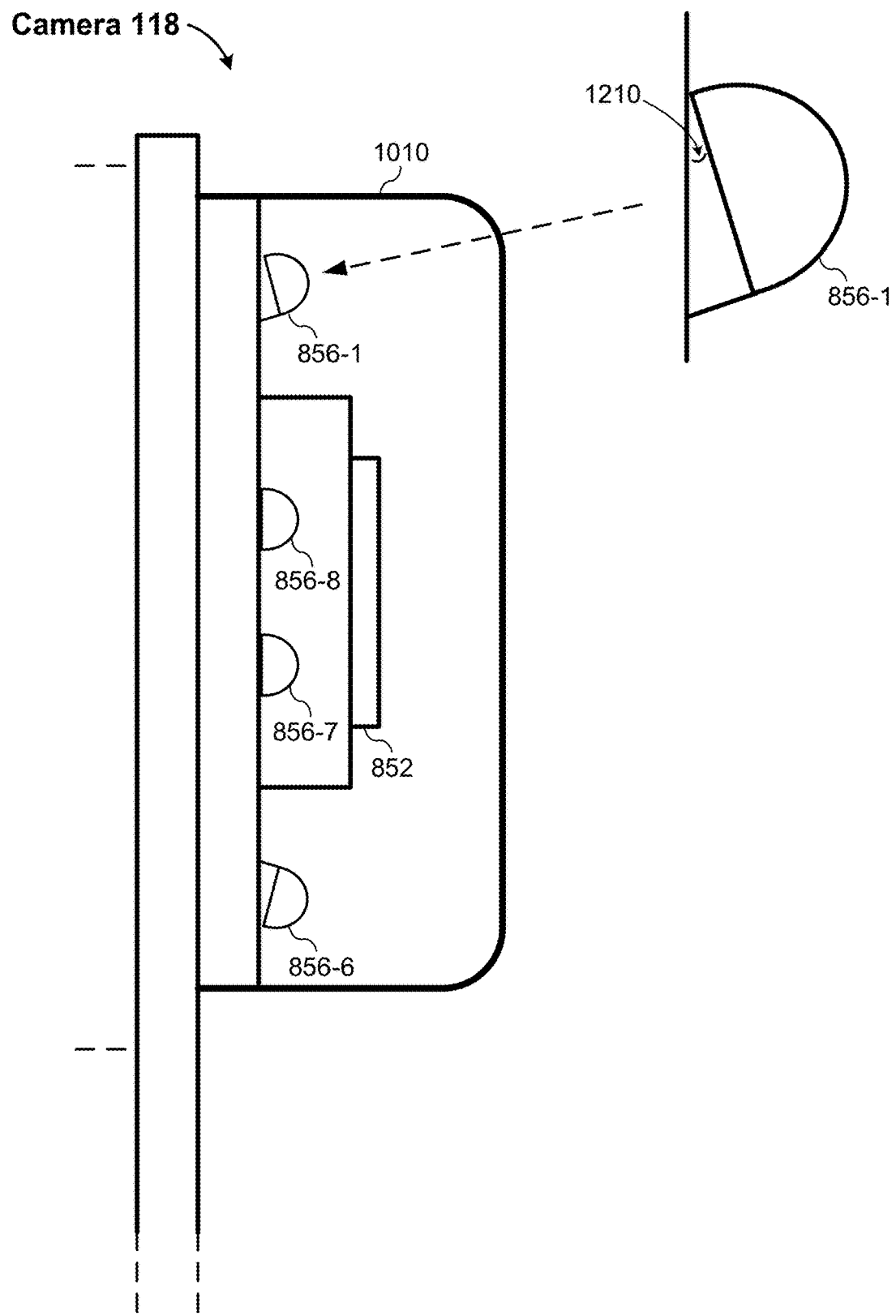

As illustrated in FIGS. 10-12 below, the camera includes a sensor array 852 that captures video images, and a plurality of illuminators 856, which illuminate a scene when there is insufficient ambient light. Typically, the illuminators emit infrared (IR) light. In some implementations, the camera 118 includes one or more optional sensors 854, such as a proximity sensor, a motion detector, an accelerometer, or a gyroscope.

In some implementations, the camera includes one or more radios 850. The radios 850 enable radio communication networks in the smart home environment and allow the camera 118 to communicate wirelessly with smart devices using one or more of the communication interfaces 804. In some implementations, the radios 850 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.), custom or standard wired protocols (e.g., Ethernet, HomePlug, etc.), and/or any other suitable communication protocol.

The communication interfaces 804 include, for example, hardware capable of data communications (e.g., with home computing devices, network servers, etc.), using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, USB, etc.), or any other suitable communication protocol.

The memory 806 includes high-speed random access memory, such as DRAM, SRAM, DDR RAM, or other random access solid state memory devices. In some implementations, the memory 806 includes non-volatile memory, such as one or more magnetic disk storage devices, one or more optical disk storage devices, one or more flash memory devices, or one or more other non-volatile solid state storage devices. The memory 806, or alternatively the non-volatile memory within the memory 806, comprises a non-transitory computer readable storage medium. In some implementations, the memory 806, or the non-transitory computer readable storage medium of the memory 806, stores the following programs, modules, and data structures, or a subset or superset thereof:

- an operating system 816, which includes procedures for handling various basic system services and for performing hardware dependent tasks;
- a network communication module 818, which connects the camera 118 to other computing devices (e.g., the video server system 508, a client device 504, network routing devices, one or more controller devices, and networked storage devices) connected to the one or more networks 162 via the one or more communication interfaces 804 (wired or wireless);
- a video control module 820, which modifies the operation mode (e.g., zoom level, resolution, frame rate, recording and playback volume, lighting adjustment, AE and IR modes, etc.) of the camera 118, enabling/disabling the audio and/or video recording functions of the camera 118, changing the pan and tilt angles of the camera 118, resetting the camera 118, and so on;
- a video capturing module 824, which captures and generates a video stream. In some implementations, the video capturing module sends the video stream to the video server system 508 as a continuous feed or in short bursts;
- a video caching module 826, which stores some or all captured video data locally at one or more local storage devices (e.g., memory, flash drives, internal hard disks, portable disks, etc.);
- a local video processing module 828, which performs preliminary processing of the captured video data locally at the camera 118. For example, in some implementations, the local video processing module 828 compresses and encrypts the captured video data for network transmission, performs preliminary motion event detection, performs preliminary false positive suppression for motion event detection, and/or performs preliminary motion vector generation;
- camera data 830, which in some implementations includes one or more of:
  - camera settings 832, including network settings, camera operation settings, camera storage settings, etc.; and
  - video data 834, including video segments and motion vectors for detected motion event candidates to be sent to the video server system 508.
- an illumination module 860, which controls the illuminators 856. In some implementations, the illumination module 860 identifies low-light conditions and turns on illuminators as needed. In some implementations, the illumination module controls the illuminators 856 individually. Some implementations store one or more illumination patterns, which are used when the illumination module is used by the depth mapping module 878;
- an image capture module 862, which uses the image sensor array 852 to capture images. In some implementations, the image capture module 852 can capture either IR images 864 or RGB images 866. Typically, the camera 118 is capable of capturing both still images as well as video streams;
- a lookup table generation module 868, which uses captured images 872 to generate lookup tables 874, as illustrated in FIGS. 13, 14, 15A, and 15B. The lookup tables are subsequently used by the depth mapping module 878 to construct depth maps 876 of a scene. In some implementations, the lookup table generation module 868 includes a normalization module 880, which is used to normalize the vectors in the lookup tables;
- one or more databases 870, which store various data used by the camera 118. In some implementations, the database stores captured images 872, including IR images 864 and/or RGB images 866. In some implementations, the image capture module 862 stores captured IR images 864 and RGB images 866 temporarily (e.g., in volatile memory) before being stored more permanently in the database 870. In some implementations, the database 870 stores lookup tables 874, which are used by the depth mapping module to generate depth maps 876. In some implementations, the computed depth maps 876 are also stored in the database 870; and
- a depth mapping module 878, which uses the lookup tables 874 to build one or more depth maps 876 as described below with respect to FIGS. 16A-16D, 17A, and 17B.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 806 stores a subset of the modules and data structures identified above. In some implementations, the memory 806 stores additional modules and data structures not described above.

In some implementations, at least some of the functions of the camera 118 are performed by a client device 504, the server system 508, and/or one or more smart devices 204, and the corresponding sub-modules of these functions may be located within the client device 504, the server system 508, and/or smart devices 204, rather than the camera 118. Similarly, in some implementations, at least some of the functions of the client device, the server system, and/or smart devices are performed by the camera 118, and the corresponding sub-modules of these functions may be located within the camera 118. For example, in some implementations, a camera 118 captures an IR image of an illuminated scene (e.g., using the illumination module 860 and the image capture module 862), while a server system 508 stores the captured images (e.g., in the video storage database 514) and creates a depth map 876 based on the captured images (e.g., performed by a depth mapping module 878 stored in the memory 606). The server system 508, the client device 504, and the camera 118, shown in FIGS. 6-8 are merely illustrative, and different configurations of the modules for implementing the functions described herein are possible in various implementations.

Figure 9:
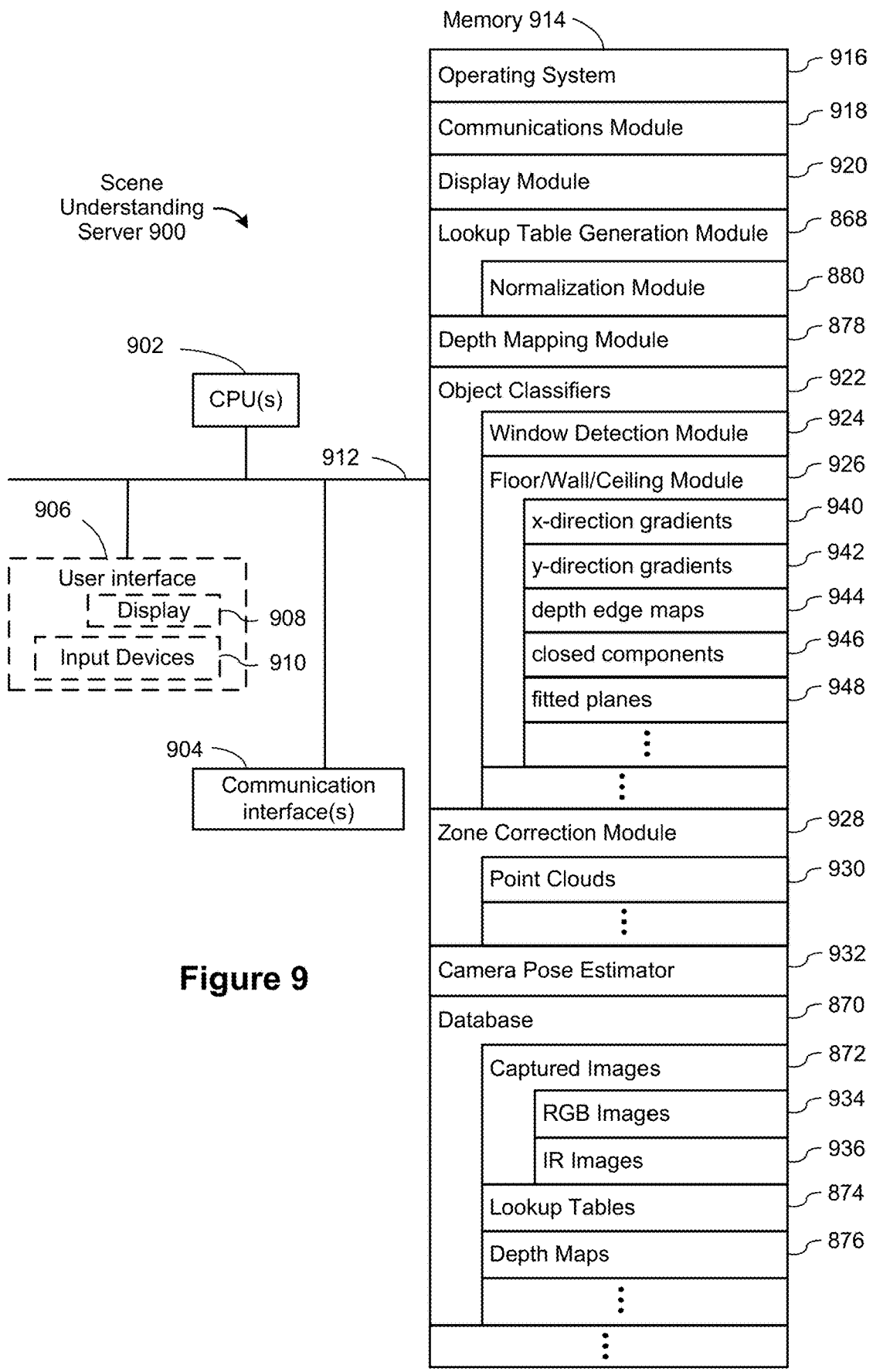
FIG. 9 is a block diagram of a scene understanding server in accordance with some implementations.

FIG. 9 is a block diagram illustrating a scene understanding server 900. A scene understanding server 900 is commonly part of a video server system 508. In some implementations, the functionality of a scene understanding server 900 is included with other functionality provided by a video server system. A scene understanding server 900 may be one or more physically separate computing devices, or may be incorporated into a server that provides other functionality as well.

A scene understanding server 900 typically includes one or more processing units (CPUs) 902 for executing modules, programs, or instructions stored in the memory 914 and thereby performing processing operations; one or more network or other communications interfaces 904; memory 914; and one or more communication buses 912 for interconnecting these components. The communication buses 912 may include circuitry (sometimes called a chipset) that interconnects and controls communications between system components. In some implementations, the server 900 includes a user interface 906, which may include a display device 908 and one or more input devices 910, such as a keyboard and a mouse.

In some implementations, the memory 914 includes high-speed random access memory, such as DRAM, SRAM, DDR RAM or other random access solid state memory devices. In some implementations, the memory 914 includes non-volatile memory, such as one or more magnetic disk storage devices, optical disk storage devices, flash memory devices, or other non-volatile solid state storage devices. In some implementations, the memory 914 includes one or more storage devices remotely located from the CPU(s) 902. The memory 914, or alternately the non-volatile memory device(s) within the memory 914, comprises a non-transitory computer readable storage medium. In some implementations, the memory 914, or the computer readable storage medium of memory 914, stores the following programs, modules, and data structures, or a subset thereof:

- an operating system 916, which includes procedures for handling various basic system services and for performing hardware dependent tasks;
- a communications module 918, which is used for connecting the server 900 to other computers via the one or more communication network interfaces 904 (wired or wireless) and communication networks 162, such as the Internet, other wide area networks, local area networks, metropolitan area networks, and so on;
- a display module 920, which receives input from one or more input devices 910, and generates user interface elements for display on a display device 908;
- a lookup table generation module 868, as described above in FIG. 8 with respect to a camera 118. In some implementations, the lookup table generation module includes a normalization module 880;
- a depth mapping module 878, as described above in FIG. 8 with respect to a camera 118;
- one or more object classifiers 922, which classify objects in the field of vision of a camera 118. Some implementations include a window detection module 924, which identifies regions of a scene as probable windows. The window detection module 924 is described below with respect to FIGS. 18A-18E. Some implementations include a floor/wall/ceiling module 926, which identifies regions of a scene as floors, walls, and ceilings. The floor/wall/ceiling module 926 is described below with respect to FIGS. 20A-20K, 25A, and 25B. In some implementations, the floor/wall/ceiling module 926 uses a depth map constructed by the depth mapping module 878 as described below with respect to FIGS. 16A-16D, 17A, 17B, and 23A-23C. In some implementations, the floor/wall/ceiling module 926 uses the depth map to construct an x-direction depth gradient $G_x$ 940 and a y-direction gradient $G_y$ 942, and uses these to construct a depth edge map 944. In some implementations, the floor/wall/ceiling module 926 uses the depth edge map 944 to identify closed components 946, as illustrated in FIG. 20F below. For each of these components, some implementations fit a plane 948, as illustrated below with respect to FIGS. 20H-20J. If the fitted plane 948 is a good fit and is facing in the proper direction, it is identified as a probable floor, wall, or ceiling. This is described below with respect to FIGS. 20A-20K, 25A, and 25B. Some implementations have classifiers in addition to the window and floor classifiers 924 and 926;
- some implementations include a zone correction module 928, which uses depth maps generated at different times to determine if the camera 118 has moved. If a user has set up zones of interest in the scene, the zone correction module 928 is able to use the original zone definition together with the computed camera movement to determine an adjusted definition of the zone based on the new camera position. This is described below with respect to FIGS. 19A-19I. In some implementations, the zone correction module creates point clouds 930 using the depth maps, and computes a transformation that maps the first point cloud to the second point cloud;
- some implementations include a camera pose estimator 932, which estimates the position of the camera 118 with respect to the room in which it is located. In some implementations, the camera position includes the estimated height of the camera 118 (i.e., the height of the image sensor array) as well as the angle of altitude. In some implementations, an angle of zero represents a camera that is pointed exactly horizontal (e.g., parallel to the floor), with positive angles when the camera is pointing down and negative angles when the camera is pointing up. One of skill in the art recognizes that alternative coordinate systems can be used as well, such as a reference angle of 0 representing a camera 118 pointing directly down and a reference angle of 180 pointing directly up. The operation of the camera pose estimator is described below with respect to FIGS. 21A-21E; and one or more databases 870, which store captured images 872, lookup tables 874, and/or depth maps 876, as described above in FIG. 8 with respect to a camera 118. In some implementations, the captured images 872 include both RGB images 934 and IR images 936.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 914 stores a subset of the modules and data structures identified above. In some implementations, the memory 914 stores additional modules and data structures not described above.

In some implementations, at least some of the functions of the scene understanding server 900 are performed by a client device 504, the camera 118, or other servers in the video server system 508. Similarly, in some implementations, at least some of the functions of the client device 504, the video server system 508, and the camera 118 are performed by the scene understanding server 900. For example, in some implementations, a camera 118 captures an IR image of an illuminated scene (e.g., using the illumination module 860 and the image capture module 862), while a scene understanding server 900 stores the captured images 872 and creates one or more depth maps 876 based on the captured images (e.g., performed by a depth mapping module 878).

FIG. 10 provides a front view of a camera 118, in accordance with some implementations. The camera 118 includes a sensor array 852, a plurality of illuminators 856 (e.g., the illuminators 856-1 to 856-8), and an enclosure 1010. In this particular implementation, the array 852 of image sensors (which are typically photodiodes) is centrally located and rectangular, but this configuration is not required. An actual image sensor array 852 typically has a much higher resolution than shown in the illustration. In this implementation, there are eight illuminators that are grouped into four pairs, with one pair for each of: top, bottom, left, and right. In other implementations, there are more of fewer illuminators, and the illuminators may be grouped in different ways (or not grouped at all). In some implementations, the camera 118 includes camera circuitry and/or other camera components that are not illustrated in this figure.

As described in greater detail below, the illuminators 856 are activated to illuminate a scene by emitting streams of light (e.g., infrared (IR) light). During illumination, light rays are scattered by and reflect off of object surfaces in the scene (e.g., walls, furniture, humans, etc.). Reflected light rays are then detected by the sensor array 852, which captures an image of the scene (e.g., and IR image or an RGB image). The captured image digitally measures the intensity of the reflected IR light for each of the pixels in the sensor array 852.

Figure 14:
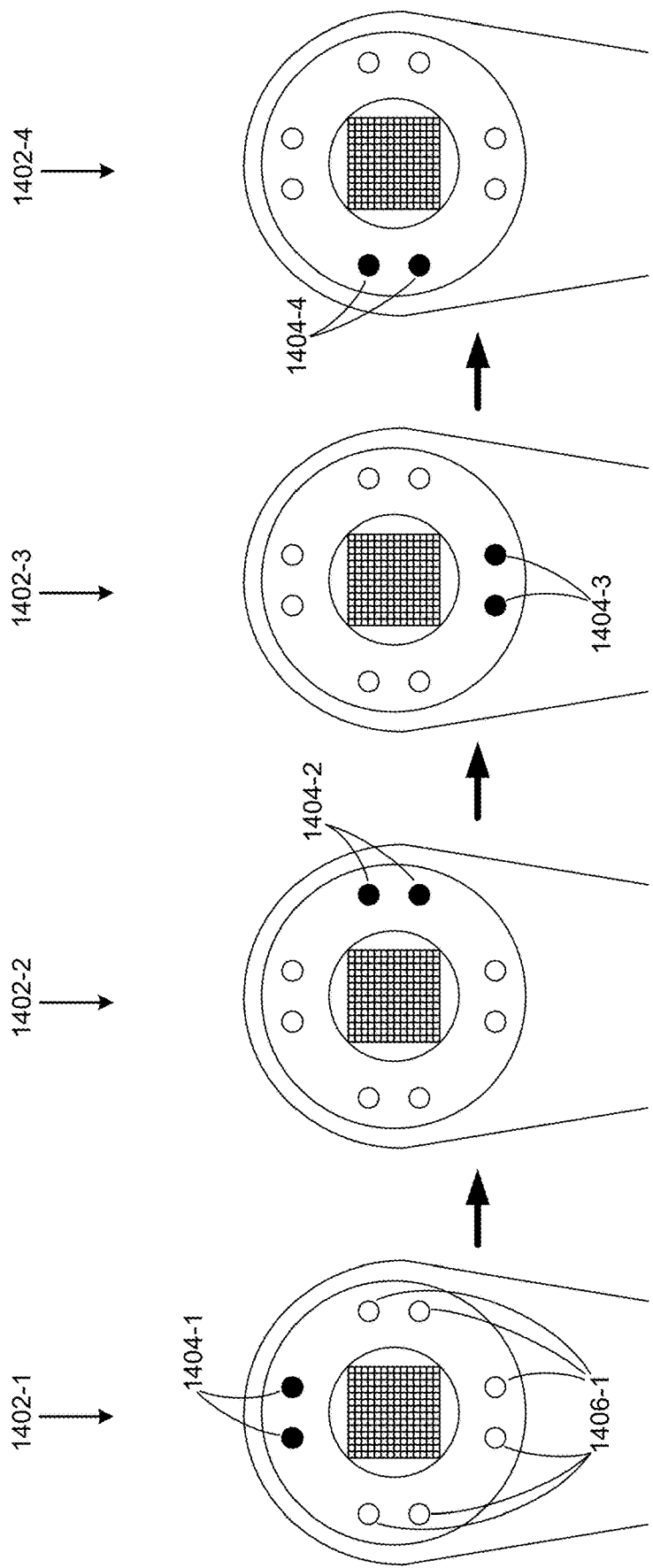

In some implementations, the illuminators 856 are light emitting diodes (LEDs). In some implementations, the illuminators 856 are semiconductor lasers or other semiconductor light sources. In some implementations, the illuminators 856 are configured to emit light spanning a broad range of the electromagnetic spectrum, including light in the IR range (e.g., 700 nm to 1 mm), the visible light range (e.g., 400 nm-700 nm), and/or the ultraviolet range (e.g., 10 nm-400 nm). In some implementations, a portion of the illuminators 856 are configured to emit light in a first range (e.g., IR range), while other illuminators 856 are configured to emit light in a second range (e.g., visible light range). In some implementations, the illuminators 856 are configured to emit light in accordance with one or more predefined illumination patterns. For example, in some implementations, the illumination pattern is circular round-robin in a clockwise order. In some of these implementations, the round-robin pattern activates two illuminators at a time, as illustrated in FIG. 14 below. An illumination pattern may specify other parameters as well, such as the length of time each illuminator is activated, the output power (e.g., measured in watts), or other parameters.

The sensor array 852 converts an optical image (e.g., reflected light rays) into an electric signal. In some implementations, the sensor array 852 is a CCD image sensor, a CMOS sensor, or another type of light sensor device (e.g., a hybrid of CCD and CMOS). The sensor array 852 includes a plurality of individual light-sensitive sensors. In some implementations, the sensors of the sensor array 852 are arranged in a rectangular grid pattern as illustrated in FIG. 10. Upon exposure to light, each sensor of the sensor array 852 detects a measurable and proportional value corresponding to the light intensity. In some implementations, the sensor array 852 or other camera circuitry converts the measured value (e.g., current) into a digital value. In some implementations, the sensor array 852 or the enclosure 1010 includes an IR filter to remove wavelengths of incident light that fall outside of a predefined range. For example, some implementations use an IR filter that passes only light having wavelengths in the range of 810 nm to 870 nm. In some implementations, the illuminators 856 emit light at a specified wavelength and the light reaching the sensor array is filtered to correspond to the specified wavelength of the illuminators.

In some implementations, the camera 118 includes additional camera components, such as one or more lenses, image processors, shutters, and/or other components known to those skilled in the art of digital photography.

In some implementations, the camera 118 also includes camera circuitry for coordinating various image capture functionality of the camera 118. In some implementations, the camera circuitry is coupled to the illuminators 856, to the sensor array 852, and/or to other camera components, and coordinates the operational timing of the various camera device components. In some implementations, when capturing an IR image of a scene, the camera circuitry activates a subset of the illuminators 856, activates the sensor array 852 to capture the image, and determines an appropriate shutter speed to manage the image exposure. In some implementations, the camera circuitry performs basic image processing of raw images captured by the sensor array 852 during the exposure. The image processing includes filtering and conversion of a produced voltage or current at the sensor array 852 into a digital value.

FIG. 11 illustrates just the image sensor array 852 for a camera 118. In this example, the sensors 1110 in the sensor array 852 are in a rectangular grid of rows and columns. In the illustration, the rectangular grid is a square, but other implementations have grids of sensors 1110 that are not square (e.g., more sensors horizontally than vertically). Also, the sensors 1110 themselves are not necessarily square. In this example, the first row consists of a line of sensors $1110_{1,1}$, $1110_{1,2}$, . . . . The sensor in the ith row and jth column is labeled $1110_{i,j}$.

FIG. 12 provides a side view of a camera 118, in accordance with some implementations. The same components of the camera 118 in FIG. 10 are illustrated in FIG. 12: the illuminators 856, the sensor array 852, and the enclosure 1010.

Figure 16A:
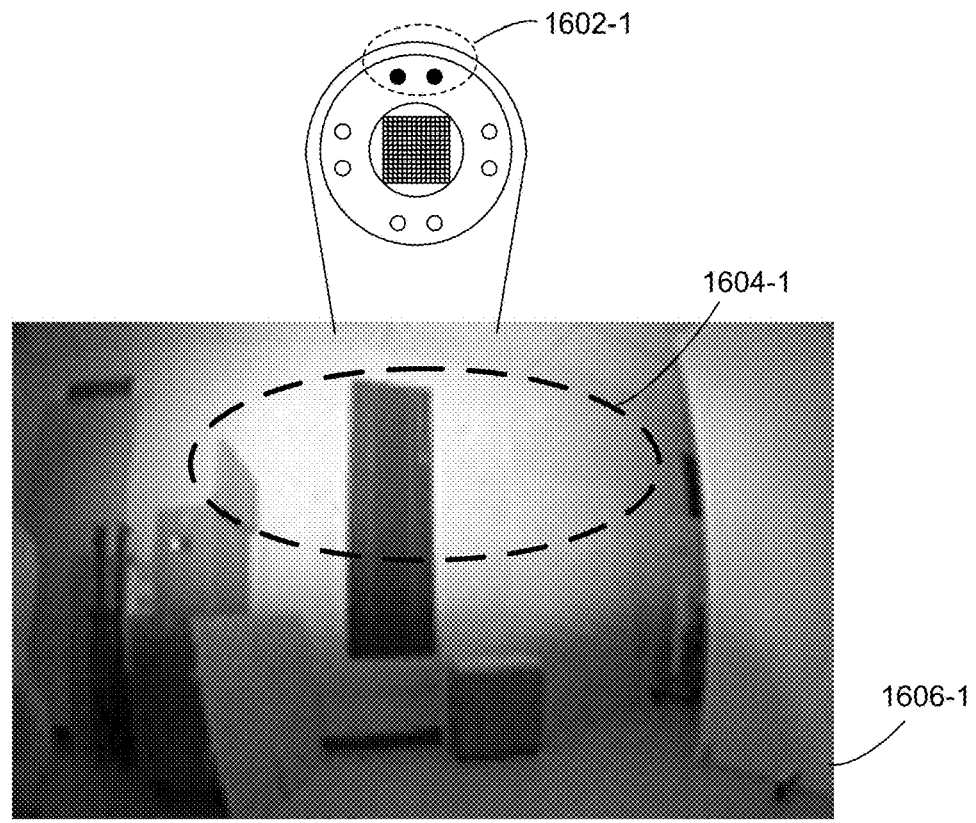
FIGS. 16A-16D, 17A, and 17B illustrate a process of creating a depth map using a sequence of captured IR images in accordance with some implementations.
Figure 16B:
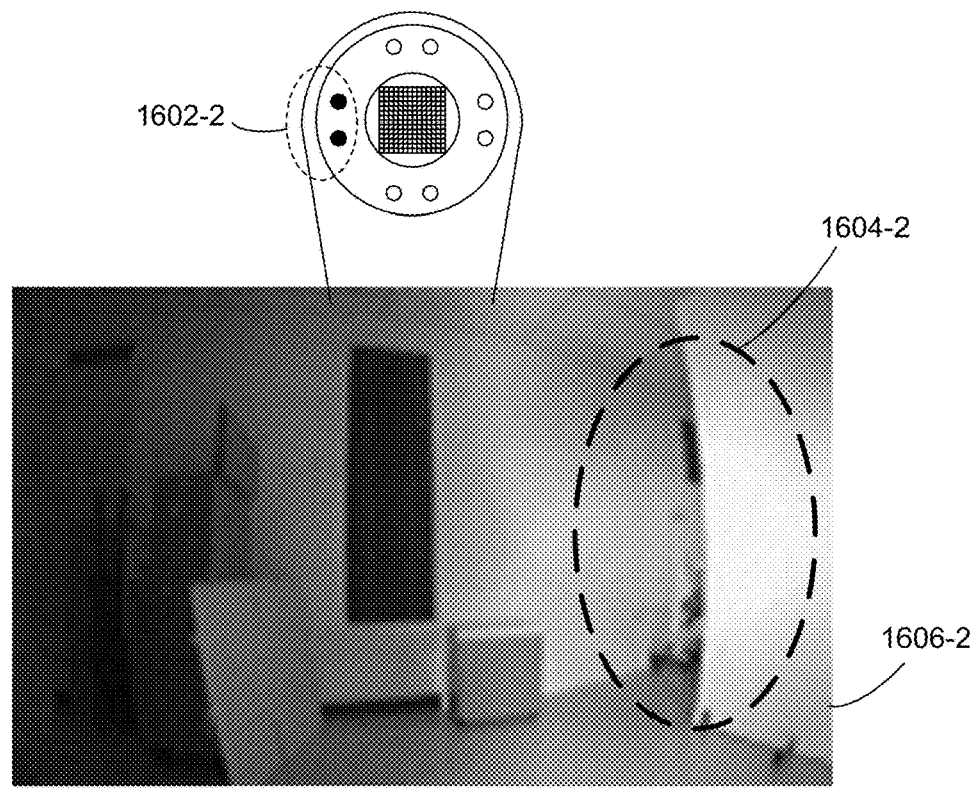
Figure 16C:
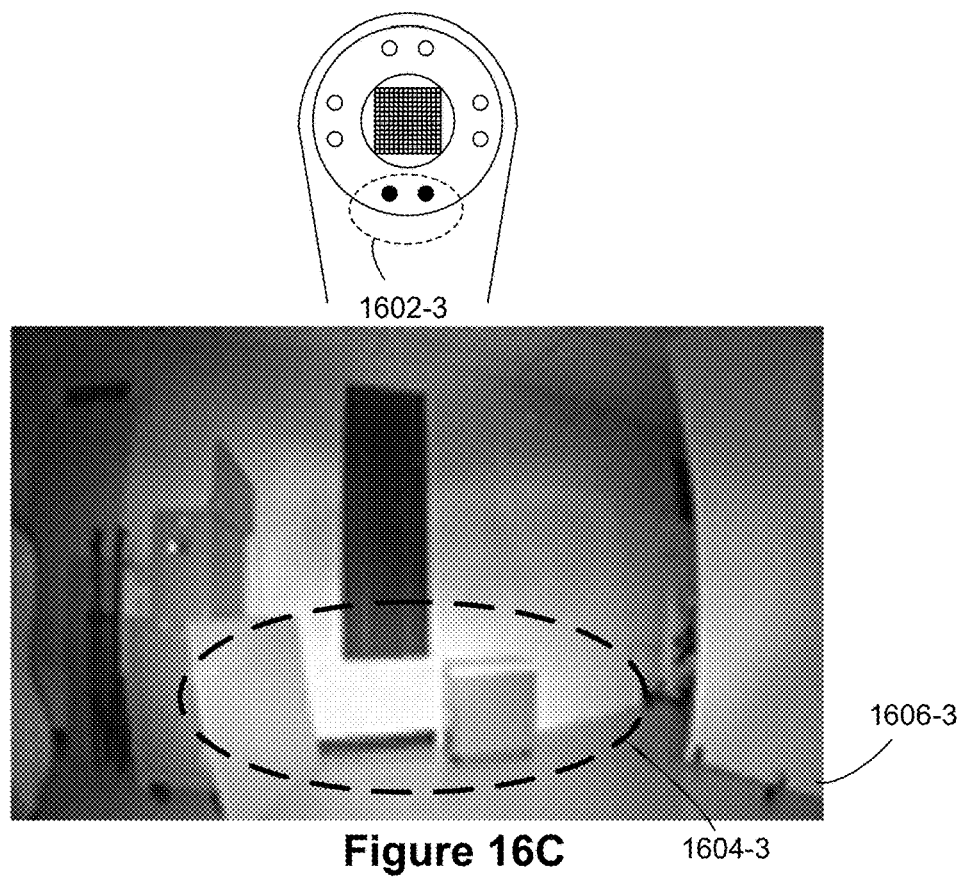
Figure 16D:
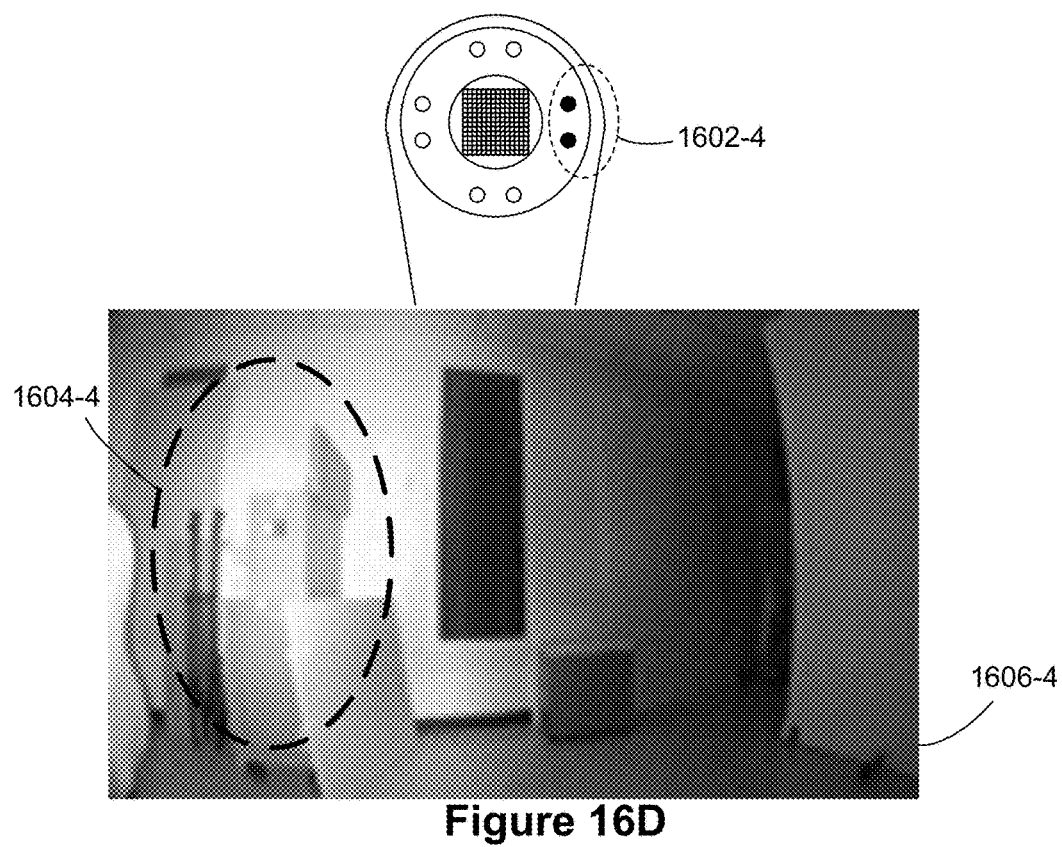

In some implementations, one or more illuminators 856 are angled relative to the planar axis of the sensor array, such as illuminator 856-1 in FIG. 12. By positioning the illuminators 856 at respective angles (e.g., angle 1210), portions of a scene will be illuminated at greater or lesser intensities depending on which of the illuminators 856 are activated and the angles at which the activated illuminators are positioned. FIGS. 16A-16D illustrate a sequence of IR images with different illuminators activated. For example, FIG. 16A is an image captured with the top two illuminators activated, whereas FIG. 16C is an image captured with the bottom two illuminators activated.

FIGS. 13-15B illustrate a method for generating a lookup table, which is later used to construct a depth map of a scene in accordance with some implementations. In some implementations, a lookup table is constructed for each pixel in the sensor array based on simulating a surface and computing an expected intensity of reflected light based on the simulated surface and a pre-selected illumination pattern. In some implementations, the physical sensors of the sensor array 852 are grouped together to simulate an array with a smaller number of pixels. For example, some implementations downsample a 1 megapixel array to about 10,000 pixels by grouping each 10×10 subarray of sensors into a single downsampled pixel. In this example, 100 physical sensors of the array are treated as a single pixel for purposes of building the lookup table and subsequently using the lookup table. In the following description, the term "pixel" will be used to describe the basic unit for a table lookup (each pixel corresponds to a lookup table) regardless of whether the pixel corresponds to a single physical sensor in the sensor array or multiple physical sensors in the sensor array.

Figure 13:
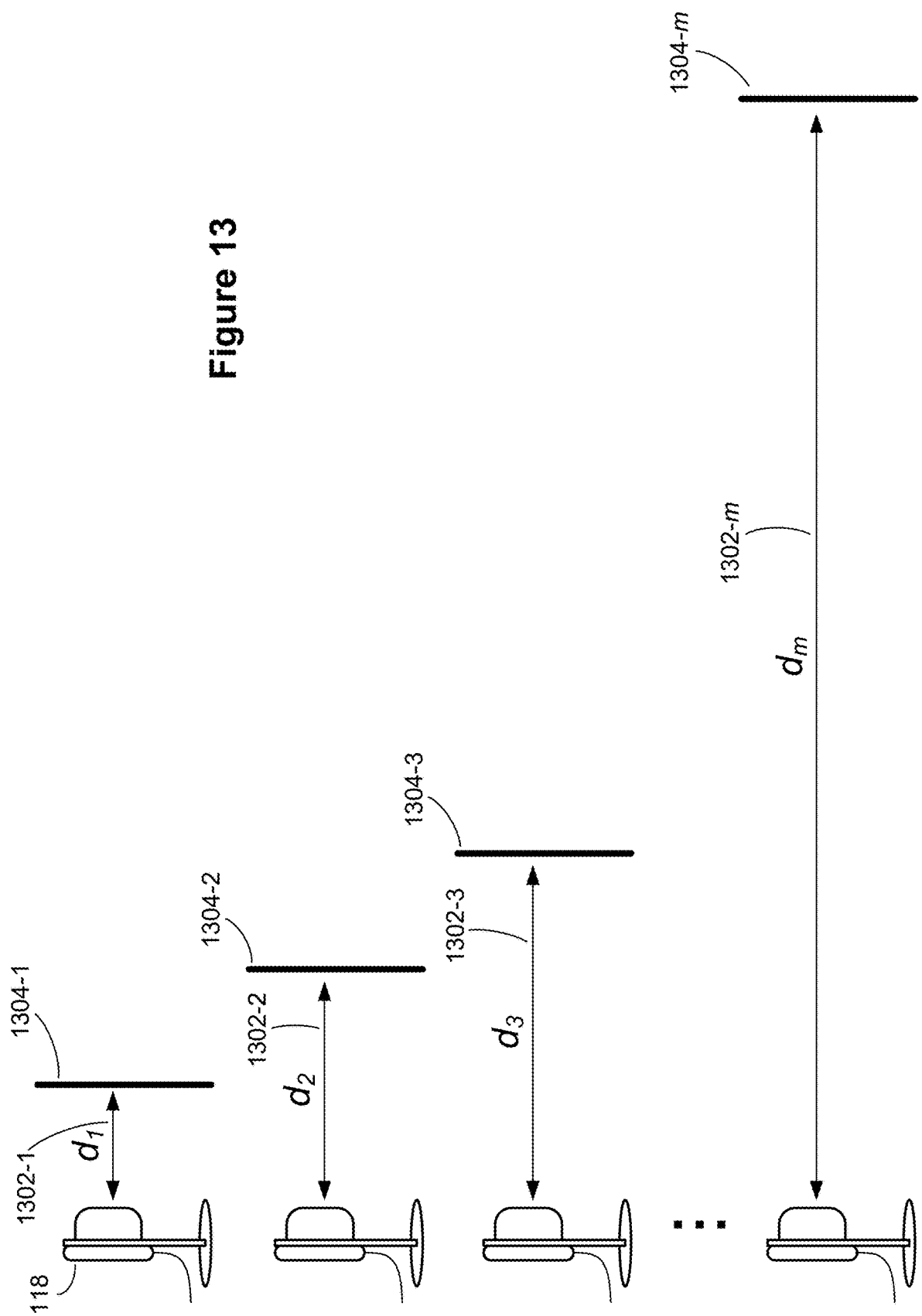

To generate a lookup table for a pixel, the lookup table generation module 868 determines an expected reflected light intensity at the pixel based on the simulated surfaces 1304 being at various fixed distances 1302 from the pixel. This is illustrated in FIG. 13, with fixed distances $d_1$ 1302-1, $d_2$ 1302-2, $d_3$ 1302-3, . . . , $d_m$ 1302-$m$, and surfaces 1304-1, 1304-2, 1304-3, . . . , 1304-$m$. The number of distinct simulated distances 1302 affects the accuracy of the subsequently estimated depths. In this example, all of the surfaces 1304 are planar. In other implementations, the surfaces are spherical, parabolic, cubic, or other appropriate shape. Typically, however, all of the surfaces are of the same type (e.g., there would generally not be a mixture of planar and spherical surfaces). In the simulation, each virtual surface has a constant surface reflectivity.

For each depth 1302, the illuminators 856 of the camera 118 are simulated to activate in accordance with a pre-defined illumination pattern. An illumination pattern specifies the grouping of illuminators 856 (if any), specifies the order the groups of illuminators are activated, and may specify other parameters related to the operation of the illuminators. FIG. 14 provides an example in which the illuminators 856 are grouped into consecutive pairs in a clockwise orientation and activated in that order. At a first time 1402-1, the top illumination group 1404-1 is activated, at a second time 1402-2 a second illumination group 1404-2 is activated, at a third time 1402-3 a third illumination group 1404-3 is activated, and at a fourth time 1402-4 a fourth illumination group 1404-4 is activated. In the example illustrated in FIG. 14, there are four illumination groups 1404 in the illumination pattern, so there are four distinct estimated light intensity values.

In some implementations, the estimated light intensity values are placed into an intensity matrix $Y_{i,j}$ 1506, as illustrated in FIG. 15A. In this matrix, each column corresponds to one depth, and each row corresponds to an illumination group from the illumination pattern. For example, the first column 1500-1 corresponds to a first distance $d_1$. The first light intensity estimate 1501-1 corresponds to the first illumination group 1404-1, the second light intensity estimate 1502-1 corresponds to the second illumination group 1404-2, the third light intensity estimate 1503-1 corresponds to the third illumination group 1404-3, and the fourth light intensity estimate 1504-1 corresponds to the fourth illumination group 1404-4.

The kth column 1500-$k$ in the intensity matrix $Y_{i,j}$ 1506 has four light intensity estimates 1501-$k$, 1502-$k$, 1503-$k$, and 1504-$k$, corresponding to the same four illumination groups in the illumination pattern. Finally, the mth column 1500-$m$ has four list intensity estimates corresponding to the same four illumination groups in the illumination pattern. Note that the matrix $Y_{i,j}$ 1506 is for a single pixel i,j (e.g., as downsampled from the sensor array 852).

As currently computed, the entries in the intensity matrix $Y_{i,j}$ 1506 depend on the reflectivity $\rho$ of the simulated surface. Because different actual surfaces have varying reflectivities, it would be useful to "normalize" the matrix in a way that eliminates the reflectivity constant $\rho$. In some implementations, the columns of the intensity matrix $Y_{i,j}$ 1506 are normalized by dividing the elements of each column by the length (e.g., $L_2$ norm) of the column.

Figure 15B:
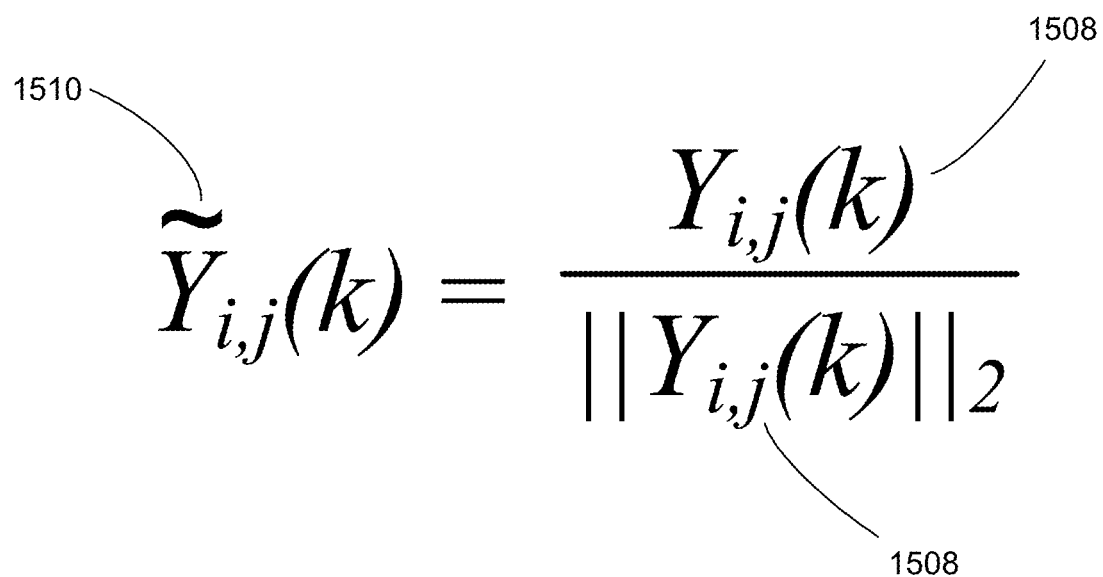

FIG. 15B illustrates normalizing the kth column $Y_{i,j}(k)$ 1508 of the matrix 1506. The normalized column $\tilde{Y}_{i,j}(k)$ 1510 is computed from the column $Y_{i,j}(k)$ 1508 by dividing each component by the length $\|Y_{i,j}(k)\|_2 = \sqrt{y_{1k}^2 + y_{2k}^2 + y_{3k}^2 + y_{4k}^2}$. Performing the same normalization process for each column in the intensity matrix $Y_{i,j}$ 1506 creates a normalized lookup table $\tilde{Y}_{i,j}$.

Note that after normalization, each column of the lookup table $\tilde{Y}_{i,j}$ has the same normalized length, even though each column corresponds to a different distance from the sensor array. However, the distribution of values across the elements (corresponding to the illumination groups) are different for different depths (e.g., the normalized first column is different from the normalized kth column).

Some implementations take advantage of symmetry to reduce the number of lookup tables. For example, using the illumination pattern illustrated in FIG. 14, some implementations reduce the number of lookup tables by a factor of four (e.g., using rotational symmetry), or reduce the number of lookup tables by a factor of eight (e.g., using rotational symmetry and reflection symmetry).

FIGS. 16A-16D, 17A, and 17B illustrate a method for creating a depth map, in accordance with some implementations. The depth map estimates the depth of objects in a scene. The scene is typically all or part of the field of vision of a camera 118. The depth map is created for a 2-dimensional array of pixels. In some implementations, the pixels correspond to the individual image sensors in the image sensor array 852. In some implementations, each pixel corresponds to plurality of individual image sensors from the array 852. For example, in some implementations, each pixel corresponds to a 10×10 square subarray of image sensors.

FIGS. 16A-16D illustrate a sequence of captured images 1606 of an illuminated scene. In each of these figures, the scene is illuminated by a different group of illuminators 856 of the camera 118 in accordance with an illumination pattern. Typically, the illumination pattern used for generating the lookup tables is used again for creating a depth map of a scene. That is, the illuminators are grouped into the same illumination groups, are activated in the same order, and use the same parameters (e.g., power and length of activation). As shown in FIGS. 16A-16D, each illumination group focuses light on a different portion of the scene. For example, the illumination group 1602-1 in FIG. 16A creates a brighter portion 1604-1 at the top of the scene, and the illumination group 1602-3 in FIG. 16C creates a brighter portion 1604-3 at the bottom of the scene. Similarly, the illumination group 1602-2 in FIG. 16C creates a brighter portion 1604-2 on the right side of the scene and the illumination group 1602-4 in FIG. 16D creates a brighter portion on the left side of the scene. In the example of FIGS. 16A-16D, there are four captured images 1606-1, 1606-2, 1606-3, and 1606-4 based on the four illumination groups 1602. In addition, a fifth image is captured when none of the illuminators are activated.

Figures 17A, 17B:
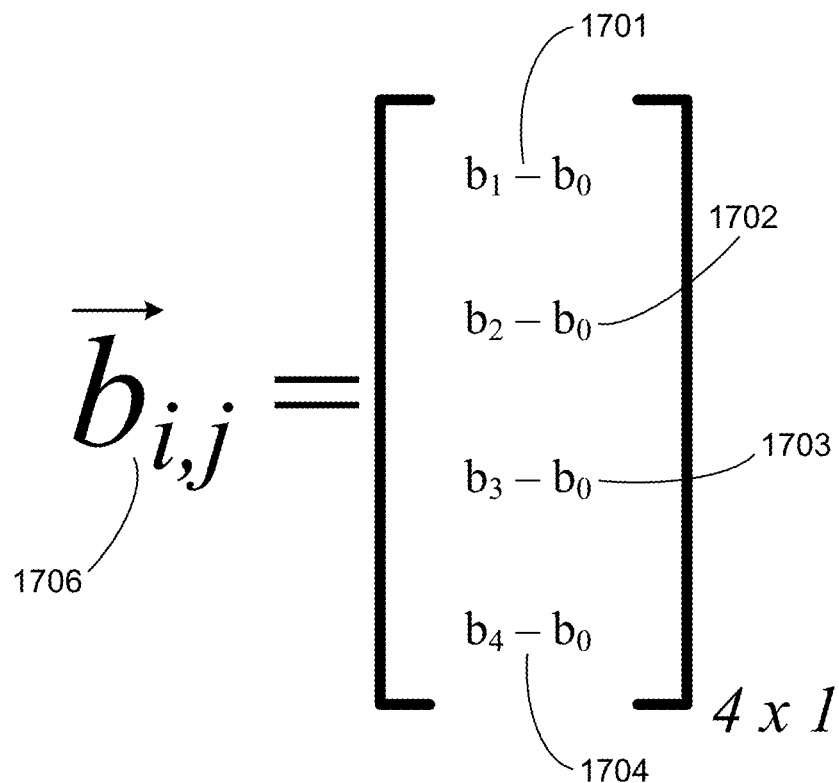

As illustrated in FIG. 17A, a vector $\vec{b}_{i,j}$ 1706 is constructed for each pixel i,j. The four components of the vector 1706 correspond to the four distinct illumination groups 1602-1, 1602-2, 1602-3, and 1602-4. The first component $b_1-b_0$ 1701 is the light intensity $b_1$ at the pixel when the first illumination group 1602-1 is active minus the light intensity $b_0$ at the pixel from the baseline image. Similarly, the second component $b_2-b_0$ 1702 is the light intensity $b_2$ at the pixel when the second illumination group 1602-2 is active minus the light intensity $b_0$ at the pixel from the baseline image. The third component $b_3-b_0$ 1703 is the light intensity $b_3$ at the pixel when the third illumination group 1602-3 is active minus the baseline light intensity $b_0$, and the fourth component $b_4-b_0$ 1704 is the light intensity $b_4$ at the pixel when the fourth illumination group 1602-4 is active minus the baseline light intensity $b_0$.

For each individual pixel there is a separate lookup table, which is generated as described above by simulating virtual surfaces at different depths. The actual depth in the scene at the pixel is determined by finding the closest matching record in the lookup table for the pixel. In this example, the vector $\vec{b}_{i,j}$ 1706 and the records in the lookup table (e.g., column $\hat{Y}_{i,j}(k)$ 1510) are four dimensional vectors. In some implementations, the closest match is computed by finding the lookup table record whose "direction" in $R^4$ most closely aligns with the sample vector $\vec{b}_{i,j}$ 1706. This can be determined by computing the inner product (e.g., dot product) of the vector $\vec{b}_{i,j}$ 1706 with each of the records in the lookup table. In some implementations, the inner product of the vector $\vec{b}_{i,j}$ 1706 with the record $\hat{Y}_{i,j}(k)$ 1510 is $\langle \vec{b}_{i,j}, \hat{Y}_{i,j}(k) \rangle = y_{1k}(b_1-b_0)+y_{2k}(b_2-b_0)+y_{3k}(b_3-b_0)+y_{4k}(b_4-b_0)$. The record in the lookup table whose inner product with the sample vector 1706 is the greatest has an associated depth (i.e., the simulated depth for which the lookup table record was created), and this is the estimated depth for the pixel. Typically, the inner product used is just the dot product, as illustrated in this example.

The process just described is shown concisely by the formula in FIG. 17B. The lookup table index $\hat{k}$ is estimated by computing the dot product of the normalized lookup table records $\hat{Y}_{i,j}(k)$ 1510 with the sample vector $\vec{b}_{i,j}$ 1706, and selecting the index for which the dot product is maximal. The estimated depth corresponds to the index $\hat{k}$.

In the example illustrated in FIGS. 16A-16D, 17A, and 17B, the eight illuminators are grouped into four illumination groups. However, many other illumination patterns are possible with the same set of eight illuminators. For example, in some implementations, the eight illuminators are activated individually, creating lookup tables with eight rows and vectors with eight components. Some implementations use other illumination patterns as well. For example, some implementations use two illuminators at a time, but use each illuminator in two groups (e.g., a first group consisting of illuminators 1 and 2, a second group consisting of illuminators 2 and 3, a third group consisting of illuminators 3 and 4, etc.).

Figure 18A:
FIGS. 18A-18E illustrate a process for identifying objects in a scene based on specularity, in accordance with some implementations.

FIGS. 18A-18E illustrate a process of identifying windows in a scene that is monitored by a camera 118. FIG. 18A is an RGB image of a scene (illustrated here in black and white) as viewed by a surveillance camera 118. Although a human can easily recognize the windows from the RGB photo, it is more difficult for a computing device to identify the windows automatically.

Figure 18B:
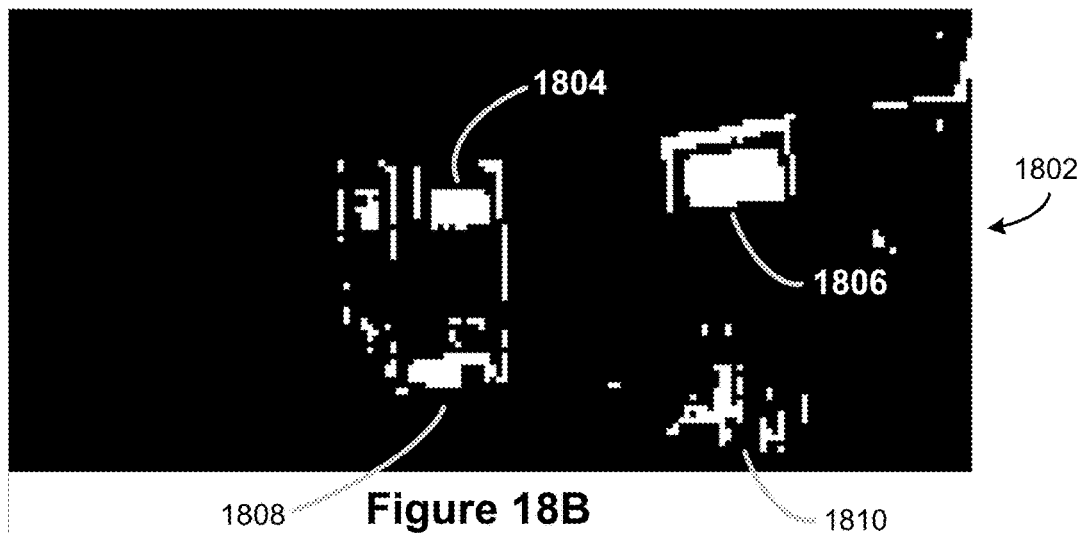

In some implementations, the camera 118 has infrared illuminators 856, which illuminate the scene (typically at night) and capture one of more IR images to form an IR intensity image 1802, as illustrated in FIG. 18B. In this example of an IR intensity image 1802, black represents high intensity and white represents low intensity. Because windows are specular, the light emitted from the IR illuminators 856 mostly reflects off in other directions rather than back towards the image sensor array 852 of the camera 118, thus creating regions of low intensity. As seen in the IR intensity image 1802, there are various areas 1804, 1806, 1808, and 1810 of low intensity. The low intensity pixels are clustered together to form contiguous regions. In addition to being specular, windows typically have a reasonable size (e.g., a house would not have a window that is one inch wide), and are generally rectangular. Because of the deformation of the images, a rectangular window appears as a quadrilateral, which may not be a rectangle.

Figure 18C:
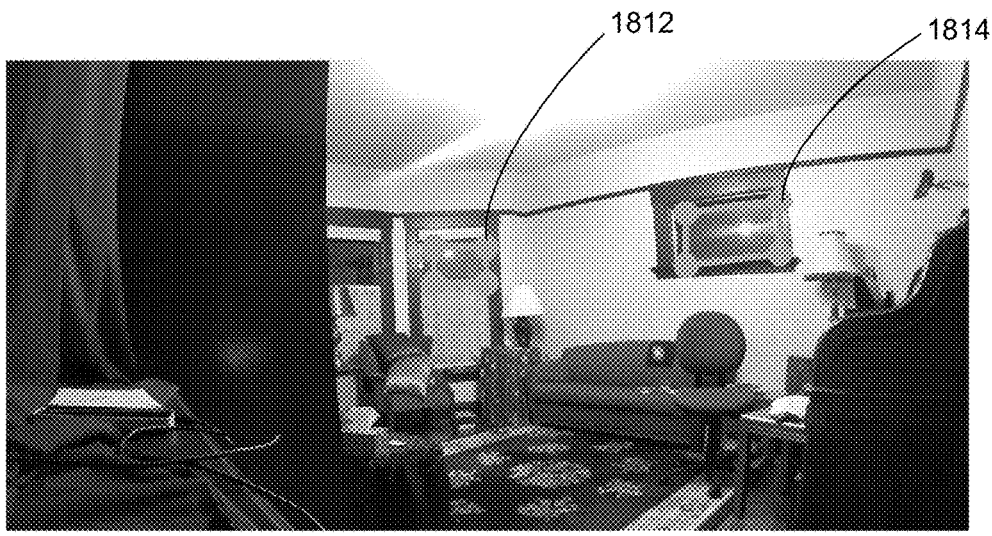

Using size and/or quadrilateral analysis of the low intensity regions in FIG. 18B, the process determines that the lower regions 1808 and 1810 do not appear to be windows. However, the upper left low intensity region 1804 is sufficiently large and fits in a quadrilateral 1812 fairly well, as indicated in FIG. 18C. Therefore, the region 1804 is designated as a probable window. Similarly, the upper right low intensity region 1806 is sufficiently large and fits well into a quadrilateral 1814, so it is identified as a probable window as well.

The same techniques described with respect to windows can identify other types of objects as well. For example, the same analysis used for windows can be applied to identify mirrors or television screens. In some implementations, a sufficiently large quadrilateral region with low intensity of reflected IR light is identified as a television rather than a window based on other information, such as frequent movement within the region. Certain materials have reflectivities that are intermediate between a specular surface and a surface with highly diffused reflections. In some implementations, these materials are identified by a range of expected image intensity from reflecting the IR light.

In some implementations, quadrilateral fitting measures the absolute difference between the quadrilateral and the region, and determines that there is a good fit when the absolute difference is less than a threshold percentage of the area of the quadrilateral (e.g., less than 5%, less than 10%, or less than 20%). In some implementations, the process uses more general polygons rather than quadrilaterals.

Some implementations use motion discontinuity as a factor in determining whether a low intensity region is a window. For example, motion of an object on an opposite side of a window will show up as discontinuous both as the object enters the field of the window and when the object exits the field of the window. In some implementations, the presence of motion discontinuity within a region is used as evidence that the region is a window, but the absence of motion discontinuity is not used as evidence that the region is not a window.

Figure 18D:
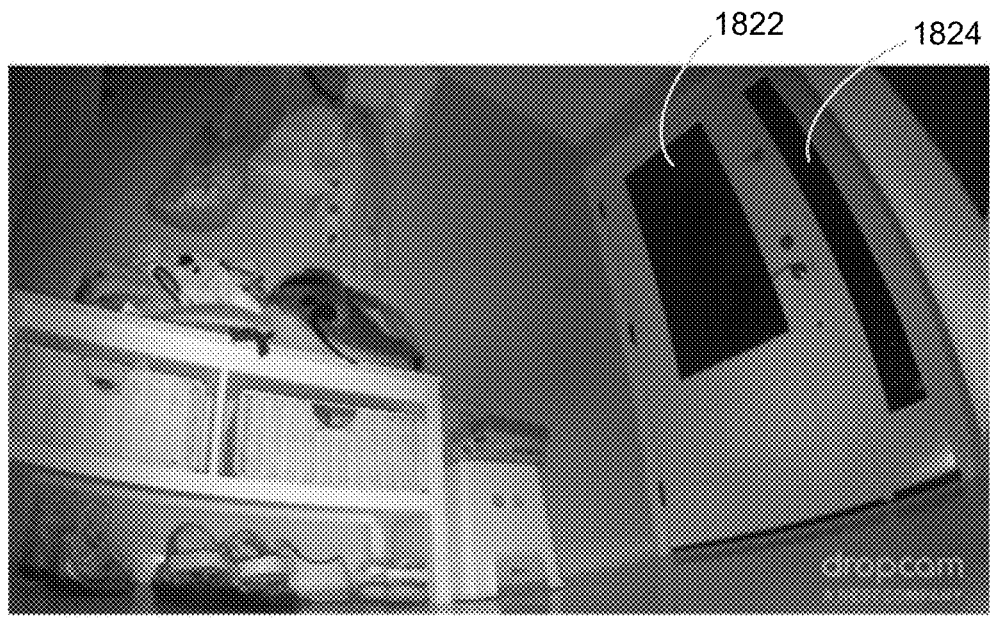
Figure 18E:

FIGS. 18D and 18E are IR images that illustrate two specular regions that are probable windows. The dark regions 1822 and 1824 in FIG. 18D show up as dark because the IR light from the illuminators is reflected in a specular way by the windows. In this example, low intensity regions appear dark, which is the opposite of the display presented in FIG. 18B. Other surfaces create diffused reflection, in which the incoming light is reflected in all directions, including back to the light source. The dark regions 1822 and 1824 in FIG. 18D are overlaid by quadrilaterals 1832 and 1834 in FIG. 18E. Even though there is some curvature introduced by the wide angle lens of the camera, the quadrilaterals 1832 and 1834 fit the dark regions 1822 and 1824 fairly well, so they are identified as probable windows.

Figure 19A:
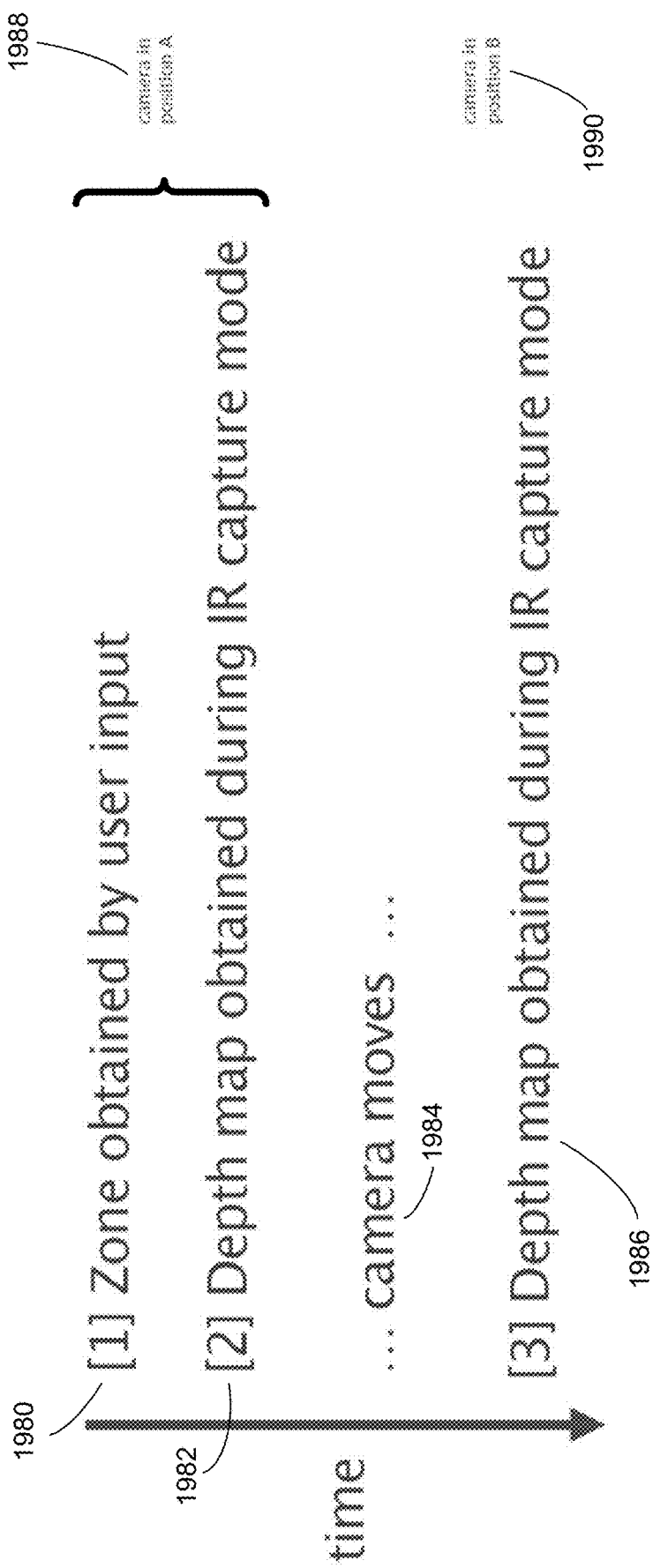
Figure 20A:
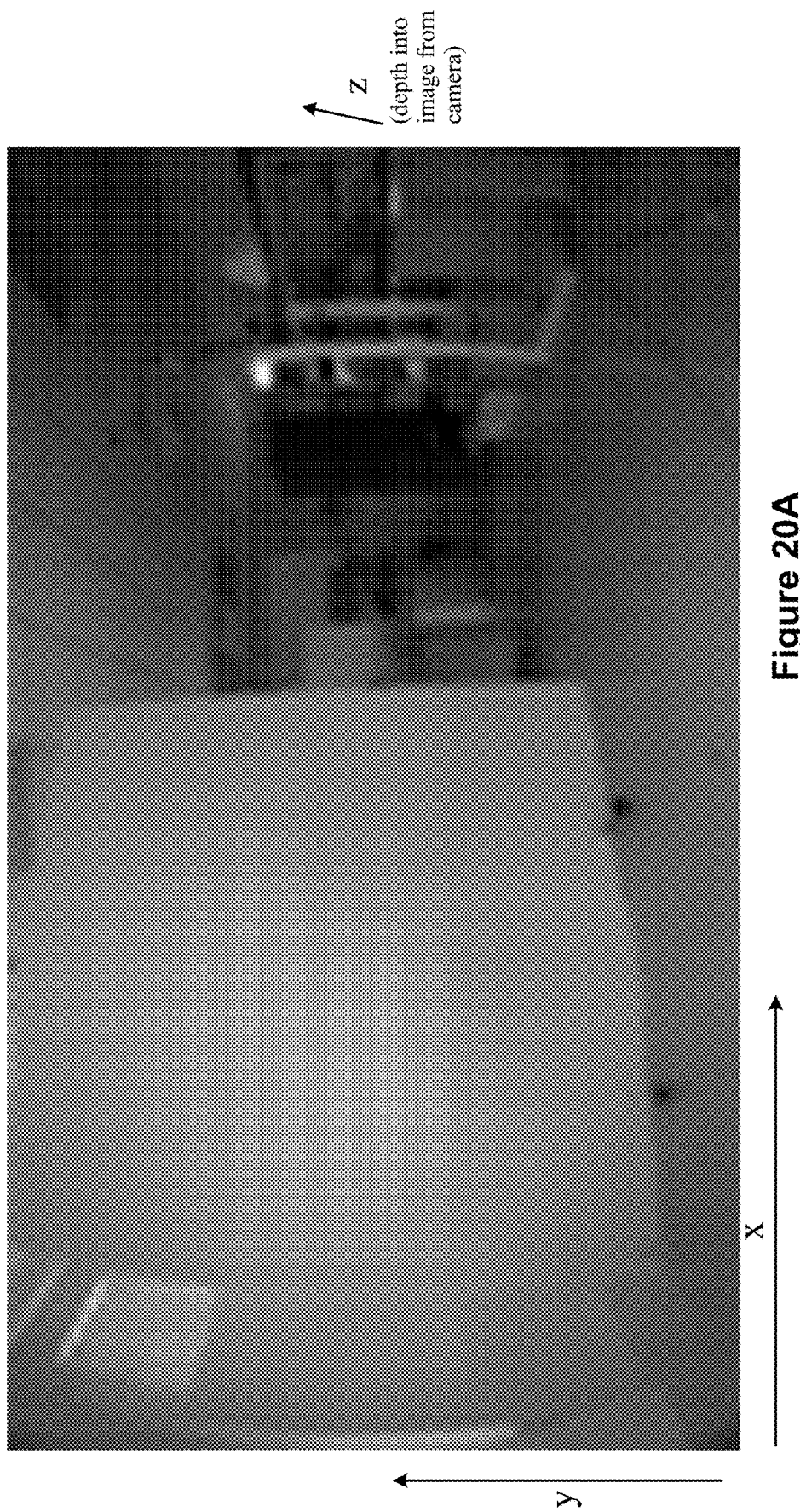

FIG. 19A provides an outline for computing zone correction according to some implementations. Initially, a user defines (1980) a zone of interest in a scene while the camera 118 is in a first position 1988. In some implementations, the zone is defined using a captured RGB image. In some implementations, the zone is defined using a captured IR image. In some implementations, zones must be polygons, but other implementations allow for broader zone definition. Zones of interest are commonly used for motion alerts. In some implementations, a camera 118 is not permanently affixed to a structure, so the camera 118 may move (intentionally or unintentionally). When the camera moves, the previously defined zone is no longer valid. Therefore, some implementations include a zone correction module 928 to compute an adjusted zone that corresponds to the zone originally defined by the user.

Some implementations build (1982) a depth map based on IR images captured while the camera 118 is in the first position 1988. In some implementations, the IR images are captured temporally proximate to the time the zone is defined in order to ensure that the depth map is built based on the same field of vision. In some implementations, temporal proximity is defined to be within 12 hours or within 24 hours. At some point later, the camera moves (1984). For example, a person may bump the camera or a person may choose to move the camera slightly to get better coverage of a room. Later, some implementations build (1986) a second depth map based on IR images captured while the camera 118 is in a second position 1990. Note that the zone correction module 928 does not necessarily know the camera has moved. In some implementations, depth maps are created on a periodic basis (e.g., once each night, every two days, or once each week).

In some implementations, the zone correction module 928 computes point clouds 930 corresponding to each of the depth maps, where each point in a point cloud 930 is a three dimensional position in the scene monitored by the camera, as illustrated below in FIGS. 19B-19I. In some implementations, a predetermined number of points are selected for each point cloud (e.g., 50, 100, or 1000 points), but in other implementations, the number of points varies based on the objects in the monitored scene. In some implementations, the points for each point cloud are selected based on designated positions within the image sensor array (e.g., the intersection of each tenth row with each tenth column). In some implementations, the points in the point cloud are selected by downsampling from the depth map (i.e., combine multiple points from the depth map to create an individual point for the point cloud). In some implementations, points for each point cloud are selected based on other characteristics, such as proximity to the camera (e.g., choose points from the depth map that are close to the camera).

The process of comparing two point clouds is sometimes referred to as "registration" by those of skill in the art. A registration process determines how to transform one point cloud into another point cloud. Some implementations use one or more iterated closest point (ICP) methods to determine the transformation. When one of the point clouds can be transformed to match the other point cloud, the iterative process builds the transformation as a sequence of steps that converge on the final transformation. When the two point clouds are fundamentally different (e.g., from IR images captured from different scenes), the iterative process is generally unable to converge.

After the transformation is determined, the transformation is applied to the zone defined by the user, thereby creating an adjusted zone that corresponds to the defined zone. This is illustrated below in FIGS. 19G and 19H. In some implementations, the user is prompted to confirm the adjusted zone. The process of performing zone correction is also described below with respect to the flowchart 2600 in FIGS. 26A-26C.

Figure 19B:
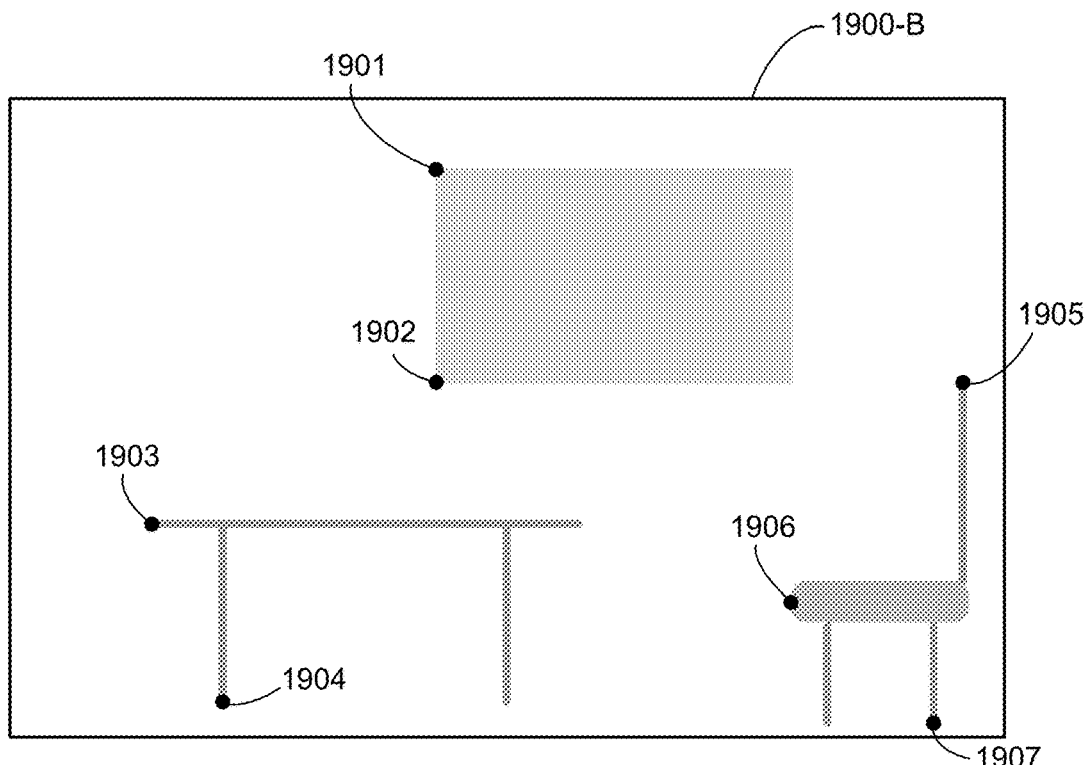
Figure 19C:
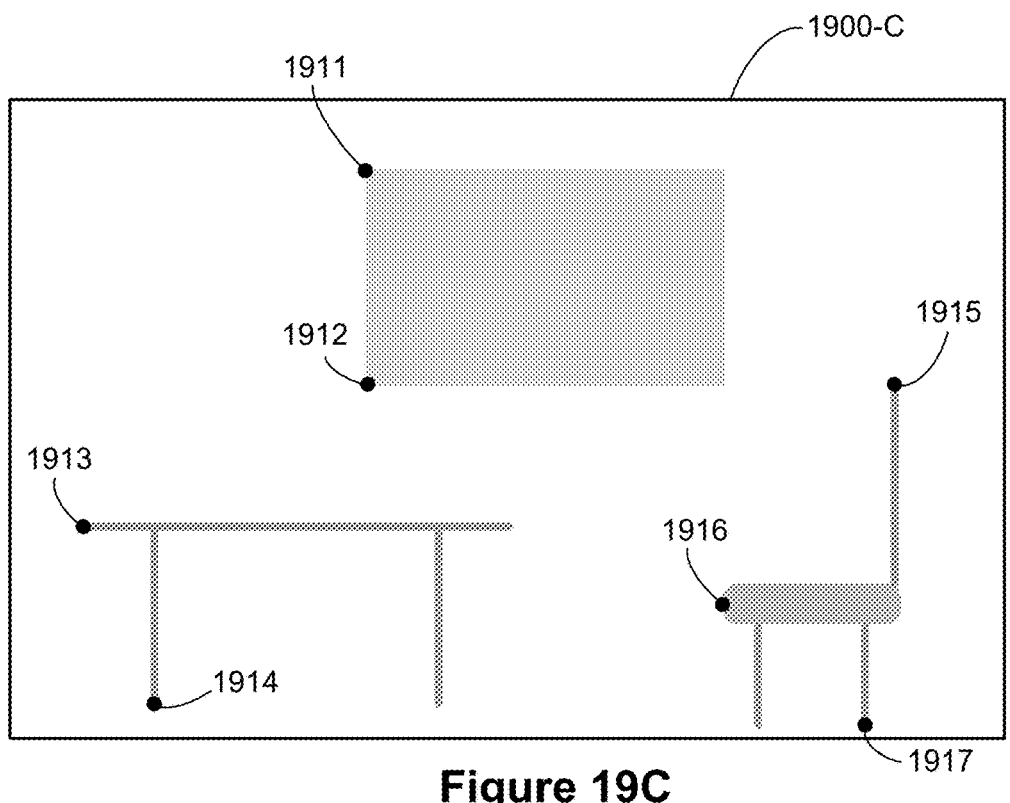

FIGS. 19B and 19C provide an example of identifying movement of a camera 118. In FIG. 19B, certain points are identified in the scene 1900-B. In some implementations, the points are identified using a depth map of the scene, as described in FIGS. 23A-23C below (e.g., selecting certain points that are closer to the camera 118 than nearby points). In some implementations, at least some of the points are selected based on a depth transition and/or color transition (using an RGB image corresponding to the depth map).

In the scene 1900-B of FIG. 19B, seven points have been identified: the points 1901 and 1902 that appear to be the left side corners of a picture frame or window; the point 1903 at the left side of an apparent table; the point 1904 that appears to be the bottom of a table leg, and three points 1905, 1906, and 1907 that are at various locations on what appears to be a chair. Note that what the points represent is not relevant to the analysis. Here, the relative positions of the points (horizontally, vertically, and depth from the camera) identify points in 3 dimensional space. In FIG. 19C, seven similar points 1911-1917 have been identified, and in this case the depths (not shown) are approximately the same as the corresponding points 1901-1907 in FIG. 19B. However, the scene 1900-B appears to have shifted to the left to create the modified scene 1900-C. Rather than concluding that the whole scene has shifted to the left, the zone correction module 928 determines that the camera has moved a little to the right. In some implementations, the points 1901-1907 and the points 1911-1917 are stored as point clouds 930. Although the example of FIGS. 19B and 19C has a one-to-one correspondence between the points in the two point clouds 930, the zone correction module 928 does not require such a perfect correspondence between the two point clouds 930.

Figure 19D:
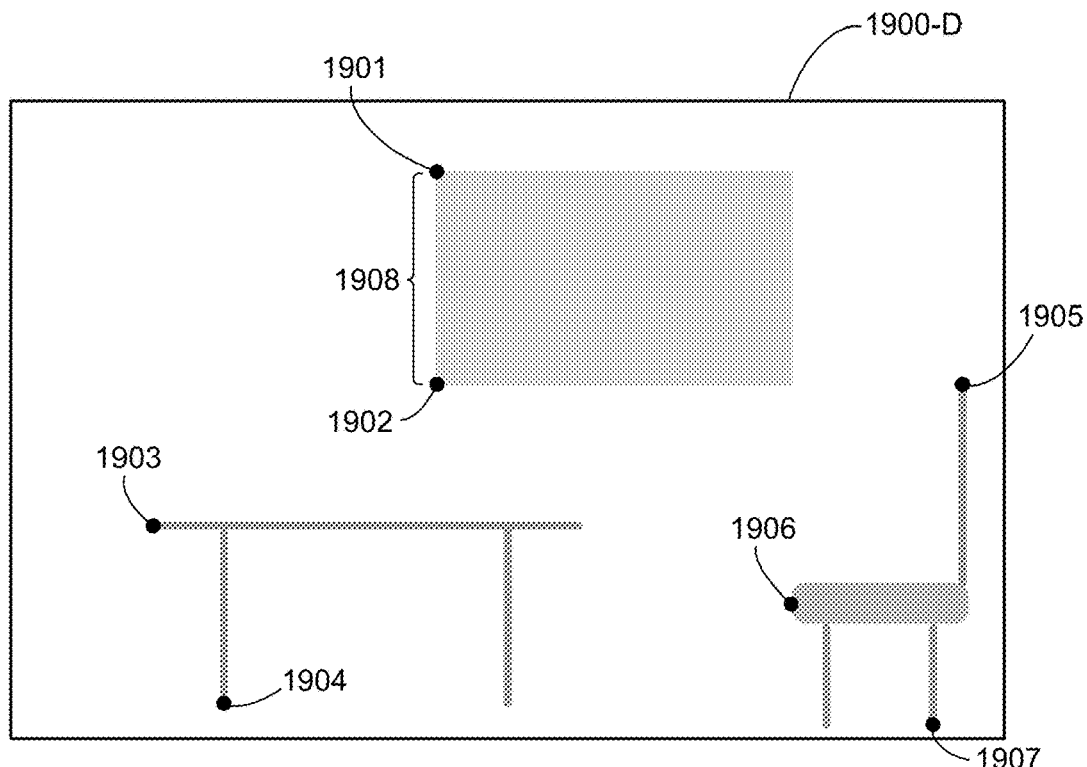
Figure 19E:
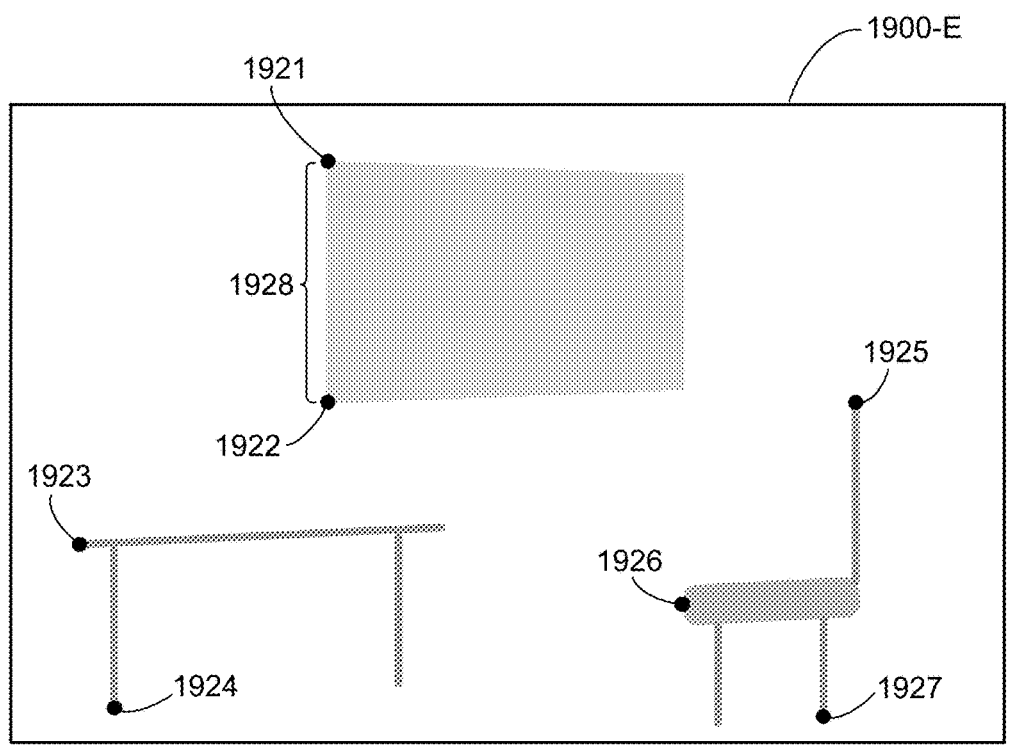

FIGS. 19D and 19E illustrate detecting camera movement of a different sort. FIG. 19D is the same as FIG. 19B, with the same seven points 1901-1907, but also identifies the distance 1908 between the two points 1901 and 1902. The seven points 1921-1927 in FIG. 19E correspond to the seven points 1901-1907 in FIG. 19D, but the depths are now different and the orientations are a little distorted. For example, the distance 1928 between the points 1921 and 1922 in FIG. 19E appears larger than the distance 1908 in FIG. 19D. Based on the cloud of points 1901-1907 in FIG. 19D and the cloud of points 1921-1927 in FIG. 19E, it appears that the scene 1900-D has rotated toward the left (counterclockwise if viewed from above) to create the scene 1900-E in FIG. 19E. The zone correction module 928 determines that the camera has been rotated a little to the right to create the different scene perspective.

As illustrated in FIGS. 19B-19E, the zone correction module uses two point clouds 930 that represent the field of vision of the camera, and determines whether the two point clouds correspond to slightly different views of the same scene. In some instances, the camera is moved to a completely different scene (e.g., a different room), so the two depth maps are quite different. The zone correction module 930 is generally able to determine that the point clouds 930 do not correspond.

FIG. 19F illustrates a top view perspective of a camera movement and how correlating two point clouds is used to identify the movement. In this illustration, a camera is initially at a first location 1940, and then is moved a little to a second location 1950. Because FIG. 19F shows a top view perspective, differences in height above the floor are not depicted. However, the techniques described here (and in FIGS. 26A-26C below) identify movement of the camera in any direction and/or rotation.

When the camera is at the first location 1940, the field of vision of the camera is illustrated by the dotted lines 1942 on the left and 1944 on the right. When the camera is at the second location 1950, the field of vision of the camera is illustrated by the dotted lines 1952 on the left and 1954 on the right. A first depth map is created based on images captured while the camera 118 is at the first position 1940, and a second depth map is created based on images captured while the camera 118 is at the second position 1950. For each of the depth maps, a point cloud is created that contains a plurality of points.

In this illustration, the points 1946-1 and 1946-2 are in the field of vision of the camera at the first position 1940 but not in the field of vision from the second location 1950. Conversely, the points 1956-1, 1956-2, and 1956-3 are in the field of vision of the camera 118 at the second position 1950 but not in the field of vision from the first location 1940. The other points in this illustration are in the shared region 1960.

A first point in this region is identified both as point 1946-3 and as point 1956-4. The two labels for the same point are due to the presence of the point in both the first and second depth maps. With respect to the camera 118, the three dimensional coordinates of the point 1946-3 are different from the 3-dimensional coordinates of the point 1956-4, even though the point has not moved. For example, the depth and horizontal position of the point 1946-3 (as measured from the first camera location 1940) are different from the depth and horizontal position of the point 1956-4 (as measured from the second camera location 1950). If the height of the camera above the floor at the first and second locations are the same, then the measured height of the point 1946-3 is the same as the height of the point 1956-4. The same analysis applies to the second labeled point in the region 1960, which is labeled as both 1946-4 and 1956-5. They are the same physical point in the scene, but have different 3-dimensional coordinates based on the two views. The same analysis applies to the third labeled point in the region 1960, which is labeled as both 1946-5 (from the first depth map) and 1956-6 (from the second depth map).

The first point cloud (containing the points 1946-1-1946-5) is correlated to the second point cloud (containing the points 1956-1-1956-6), based on points in the overlap region 1960. In practice, the points are not literally identical as they are in this example. As indicated above, an iterative algorithm determines how to map one of the point clouds to the other.

Figure 19G:
Figure 19H:
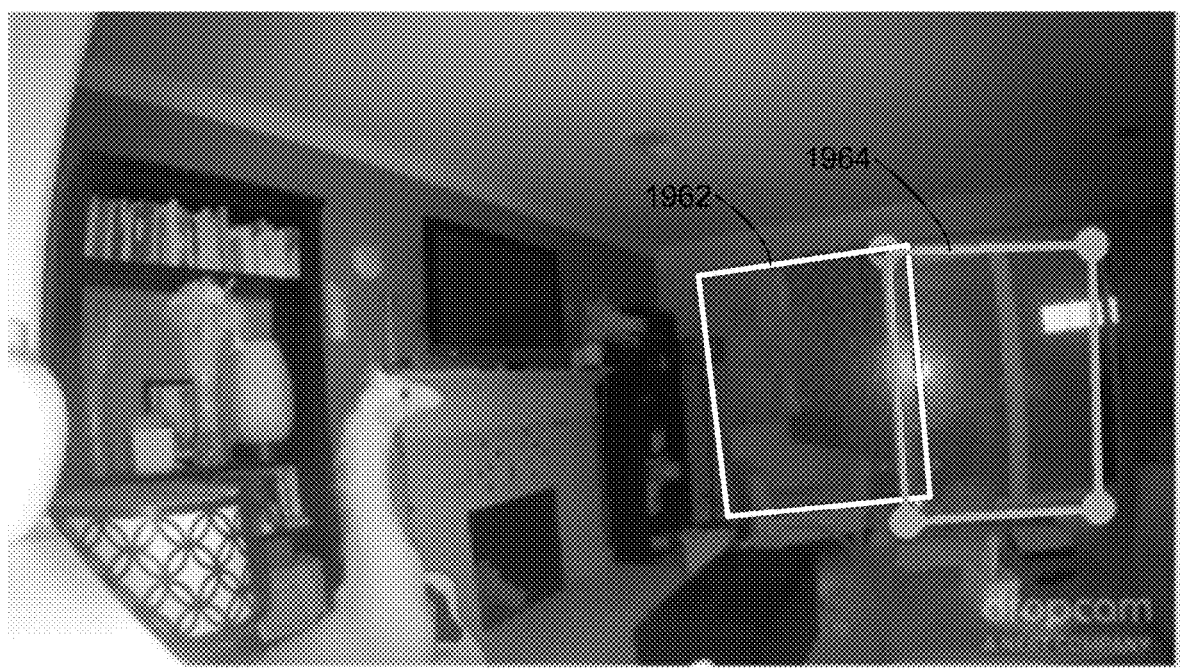

FIG. 19G shows an IR image of a monitored scene, with a zone 1960 identified by a user. This zone 1960 outlines an entryway to the room from outside, and thus the user has designated it for motion alerts. At a later time, a second IR image is captured as illustrated in FIG. 19H. In addition to the IR images illustrated in FIGS. 19G and 19H, the camera 118 captures sequences of IR images with different sets of IR illuminators activated contemporaneous with the IR images in FIGS. 19G and 19H. For example, in some implementations, when depth mapping images are captured, a first IR image is captured with no illuminators activated, a plurality of additional IR images are captured with various subsets of illuminators activated, and a final IR image is captured with all of the illuminators activated. (Of course the image capture is not necessarily in this order.) As described below with respect to FIGS. 23A-23C, the depth mapping module 878 uses the multiple IR images to build two depth maps. Points are then selected from each of the depth maps to form point clouds, and then the two point clouds are registered (aligned) as described above with respect to FIG. 19A and described below with respect to FIGS. 26A-26C.

As shown in FIG. 19H, the uncorrected zone 1962 (using the same coordinates that were saved for the original zone 1960) no longer covers the entryway that was covered by the zone 1960 previously. However, using the point clouds created from the depth maps, the zone correction module 928 determines the transformation required to correlate the two views, and applies the transformation to the first zone. The transformation constructs an adjusted zone 1964, which again covers the entryway. Even if the adjusted zone 1964 is not perfect (it should be a little wider to match the entryway), it is a much better zone for the camera in the new position than the uncorrected zone 1962.

Figure 19I:
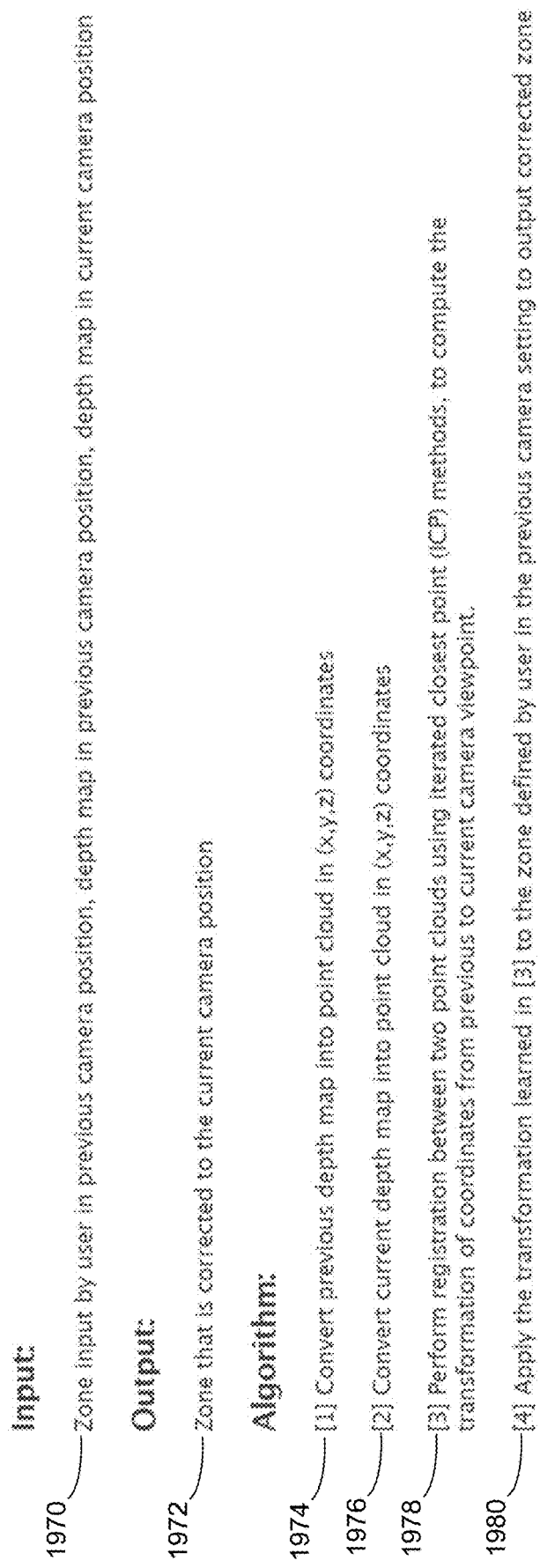

FIG. 19I provides a summary of the zone-correction process according to some implementations. The input 1970 includes a user defined zone, a depth map from an original camera position, and a depth map from a later camera position. The user-defined zone may be created with respect to an RGB image or an IR image.

When the camera has moved slightly, the process computes an output 1972, which is an adjusted zone. The adjusted zone corresponds to the original zone, but accounts for the camera movement. This is illustrated above FIGS. 19G and 19H.

In some implementations, computing the adjusted zone includes: (1) converting (1974) the original depth map to a point cloud with 3D coordinates. In some implementations, the constructed point cloud has at least 100 points. In some implementations, the point cloud has fewer or more points. For example, in some implementations, the point cloud has 50 points or 500 points. In some implementations, the points for the point cloud are randomly or pseudo-randomly selected from the depth map. In some implementations, the points in the point cloud are selected in a regular pattern, such as every tenth pixel horizontally and vertically. In some implementations, the points in the point cloud are selected based on specific characteristics, such as proximity to the camera or locations where there is significant depth discontinuity (see FIGS. 20B-20E).

The process builds (1976) a second point cloud from the second map, which corresponds to the current location of the camera. The points in the second point cloud are generally selected in the same way as for the first point cloud.

The process then compares (1978) the two point clouds. This process is sometimes referred to as point cloud registration. Some implementations use an iterative process to perform point cloud registration. In some implementations, the process uses an iterated closest point ("ICP") method. The registration process determines a transformation that maps the first point cloud to the second point cloud.

Finally, the process applies (1980) the identified transformation to the user-selected zone to identify an adjusted zone based on the new camera location. In some implementations, the new zone is used immediately. In some implementations, the user is prompted to confirm the adjusted zone, and the user may tweak the adjusted zone further.

Figure 20B:
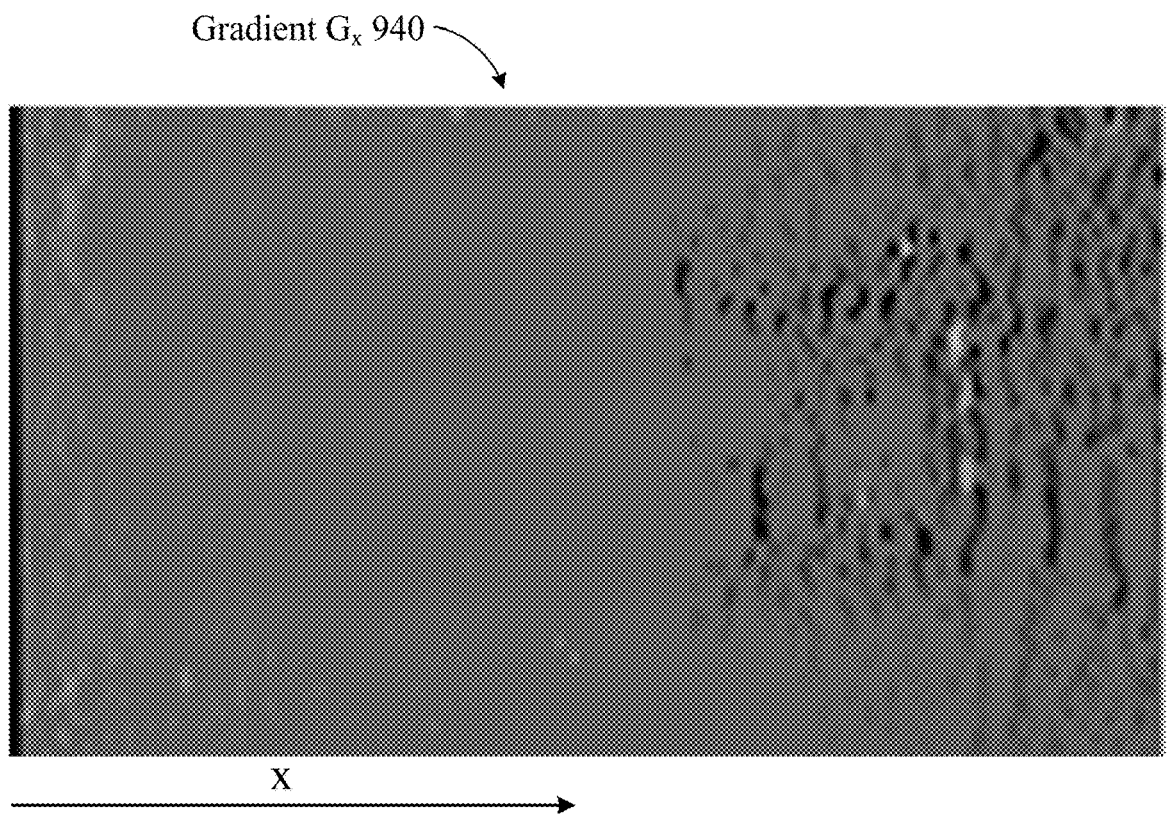
Figure 20C:
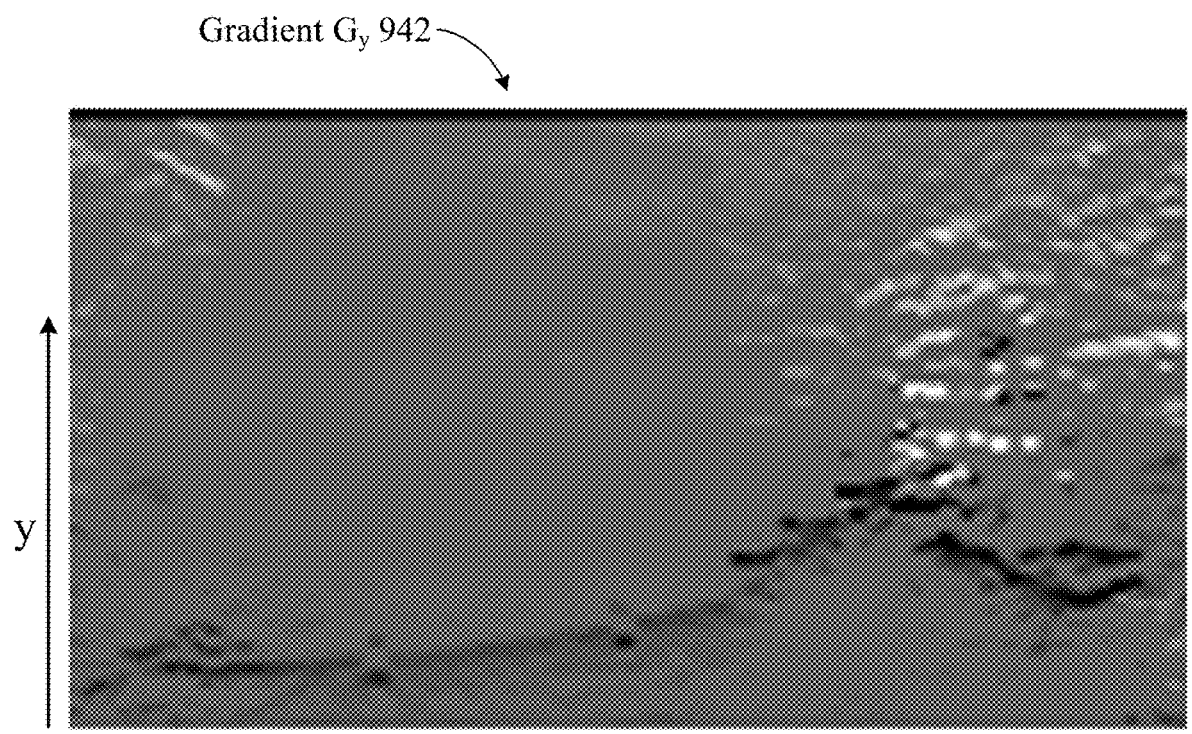
Figures 20G, 20H, 20I, 20J:
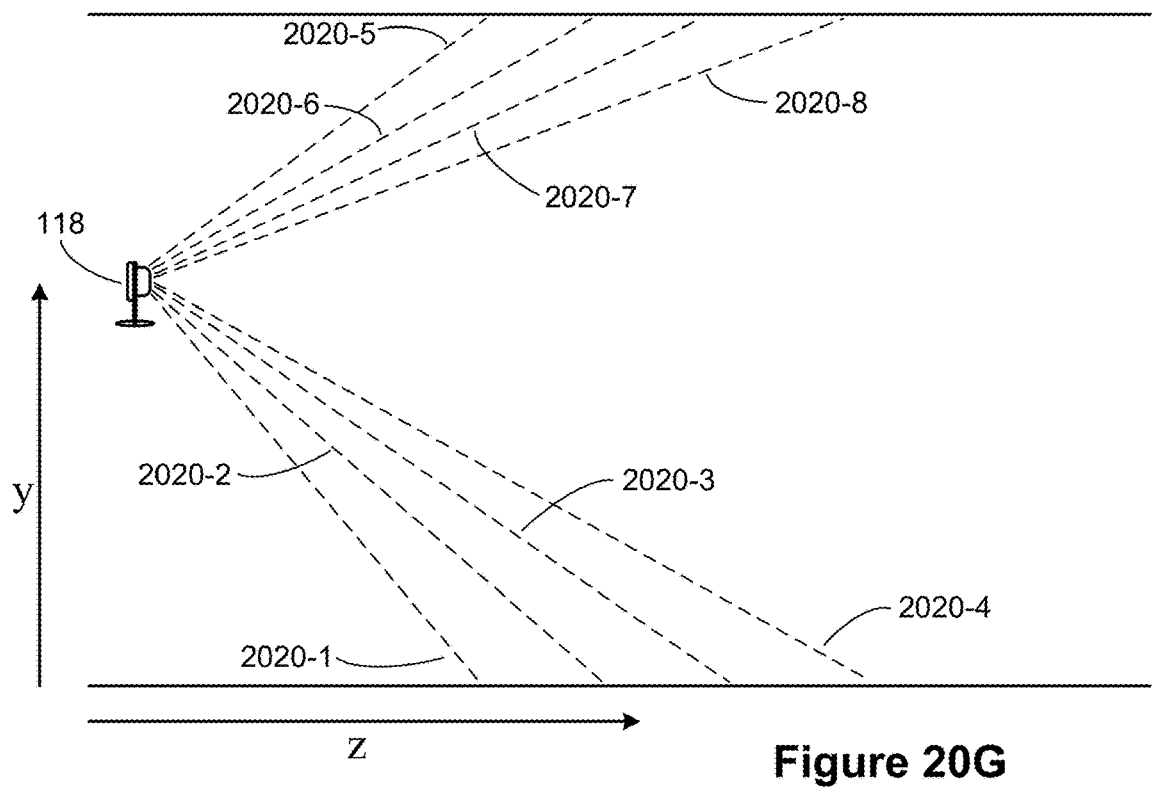

FIGS. 20A-20K illustrate a process performed by a floor/wall/ceiling module 946 to identify probable floors, walls, and ceilings. FIG. 20A is an IR image of a scene. Some implementations use a coordinate system in which x is measured horizontally, y is measured vertically, and z represents the depth into the image from the camera. As illustrated in FIG. 20G, the depth is measured from the camera.

In some implementations, the floor/wall/ceiling module 926 uses a depth map 876 of the scene, which is constructed as illustrated in FIGS. 16A-16D, 17A, 17B, and 23A-23C. The floor/wall/ceiling module 926 uses the depth map 876 to identify depth discontinuities. In some implementations, the floor/wall/ceiling module 926 identifies the discontinuities using an x-direction gradient map $G_x$ 940 as illustrated in FIG. 20B and a y-direction gradient map $G_y$ 942 as illustrated in FIG. 20C. As illustrated in FIG. 20D, some implementations combine the two gradients $G_x$ 940 and $G_y$ 942 to form a binary depth edge map 944, as shown in FIG. 20E. In some implementations, an edge is identified at a pixel when the total depth change exceeds a predefined threshold value.

Once the depth discontinuities are identified in the binary depth edge map 944, the floor/wall/ceiling module 926 identifies the closed components 946 in the image (i.e., regions that are enclosed by the edges). These closed components 946 represent the candidates for floors, walls, and ceilings. FIG. 20F shows the closed components 946 corresponding to the depth map 944 in FIG. 20E. The two largest components 946-1 and 946-2 are good candidates. In some implementations, closed components 946 that are smaller than a threshold size are excluded from further analysis. For example, in some implementations, only the two largest closed components 946-1 and 946-2 are evaluated.

FIG. 20G illustrates how "depth" is measured from the point of view of the camera 118. This is a side view of the scene, showing how the depth z correlates to the height y. For example, incident rays 2020-1 to 2020-4 have depth that increases as a function of height. This is what would be expected for a floor. The incident rays 2020-5 to 2020-8 have a depth that decreases as a function of height. This is what would be expected for a ceiling.

For each of the closed components 946 that is evaluated, the floor/wall/ceiling module 926 fits a plane to the points in the component. In some implementations, the fitted plane has an equation of the form $w_x x + w_y y + w_z z = 1$, where $w_x$, $w_y$, and $w_z$ are constants to be determined, as illustrated in FIG. 20H. For each closed component, a subset of points in the component are used to form a matrix C, as illustrated in FIG. 20I. The matrix C has a row for each selected point in the component, and has three columns corresponding to the x, y, and z-coordinates of the points. A single closed component 946 may have a large number of points, so implementations typically take a sampling (e.g., a pseudo-random sample of 20 points or 50 points). The fitted plane 948 should closely match the data, so a "best fit" can be determined by measuring the total error. Some implementations use least squares, and thus select the values for $w_x$, $w_y$, and $w_z$ to minimize the expression $\Sigma_i(w_x c_{i1} + w_y c_{i2} + w_z c_{i3} - 1)^2$, as illustrated in FIG. 20J. Some implementations use alternative methods to identify a "best" plane for a set of data points from a closed component.

Once a best plane 948 is identified for a component, the floor/wall/ceiling module 926 evaluates the plane in two ways. First, is the total error sufficiently small so that the plane is a good fit? Second, does the orientation of the plane correspond to floor, wall, or ceiling? Some implementations specify an error threshold, and designate a closed component as a probable floor, wall, or ceiling only when the actual error is less than the threshold. In some implementations, the total error is normalized based on the number of points in the sample.

As illustrated in FIG. 20G, a floor should have z increasing as a function of y. Using the formula in FIG. 20H, $$z = -\frac{w_y}{w_z} y + \text{(other terms)},$$

so the $$\text{expression} - \frac{w_y}{w_z}$$

should be positive for a floor. Similarly, for a ceiling, the $$\text{expression} - \frac{w_y}{w_z}$$

should be negative. Some implementations also evaluate the magnitude of the $$\text{expression} - \frac{w_y}{w_z}$$

to determine whether it is consistent with data expected for a floor or ceiling. For walls, the expressions are similar, but use the x-dimension rather than the y-dimension.

Figure 20K:
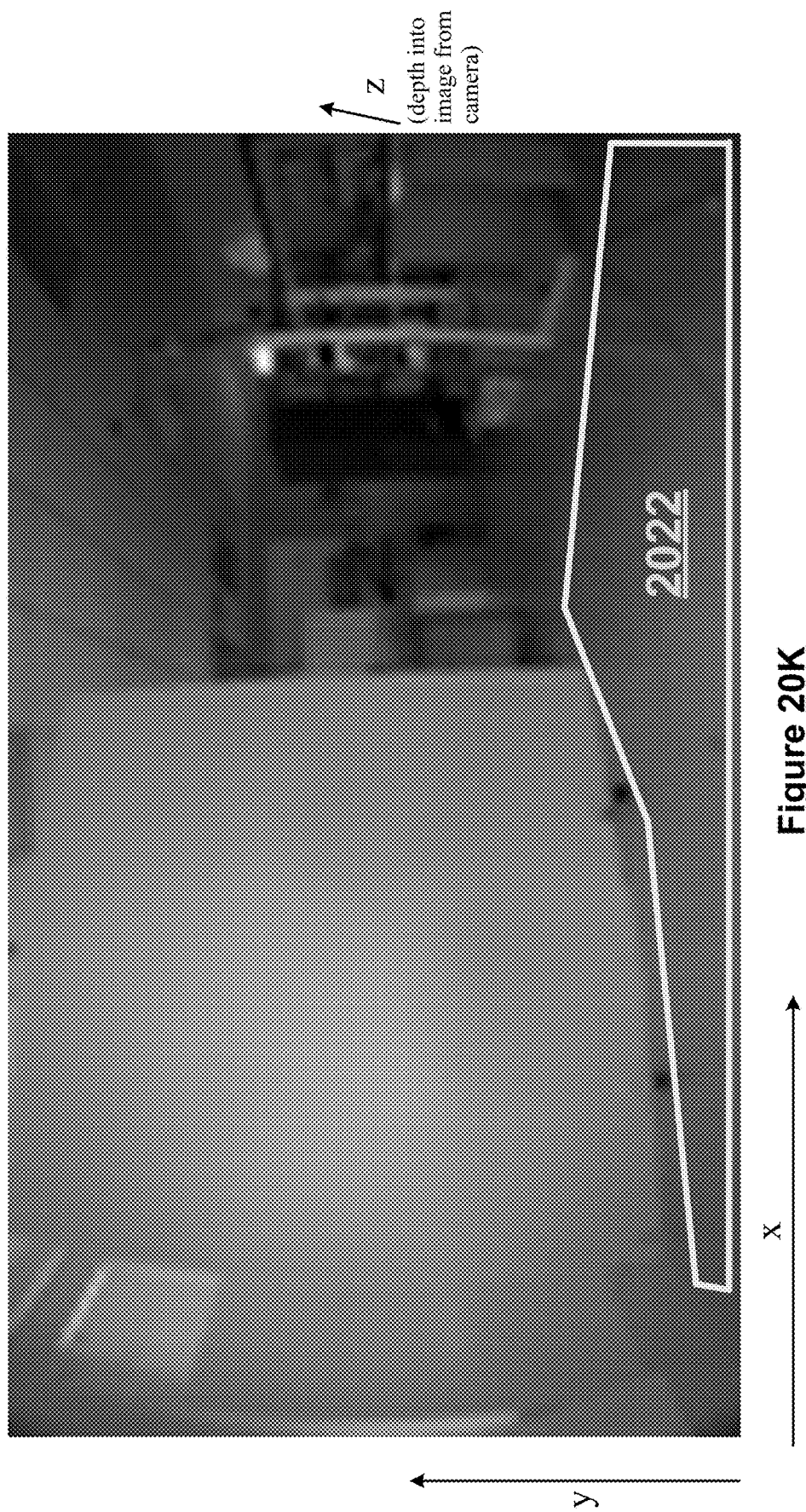

FIG. 20K illustrates that the closed component 946-2 has been identified as a probable floor region 2022. In some implementations (not illustrated here), the first closed component 946-1 is identified as a wall.

FIGS. 21A-21E illustrate a process for estimating the height and orientation of a video monitoring camera. Typically, the height is measured from a floor to the sensor array 852 of the camera 118. The orientation is measured as an angle with respect to the plane of the floor. In some implementations, an angle of 0 represents a horizontal orientation and positive angles represent tilting toward the floor (so that 90 degrees would be pointing straight down). In some implementations, the "height" is measured relative to a ceiling rather than a floor. The techniques described herein with respect to a floor can be applied in the same way to a ceiling, typically considering the distance below the ceiling as positive.

Figure 21A:
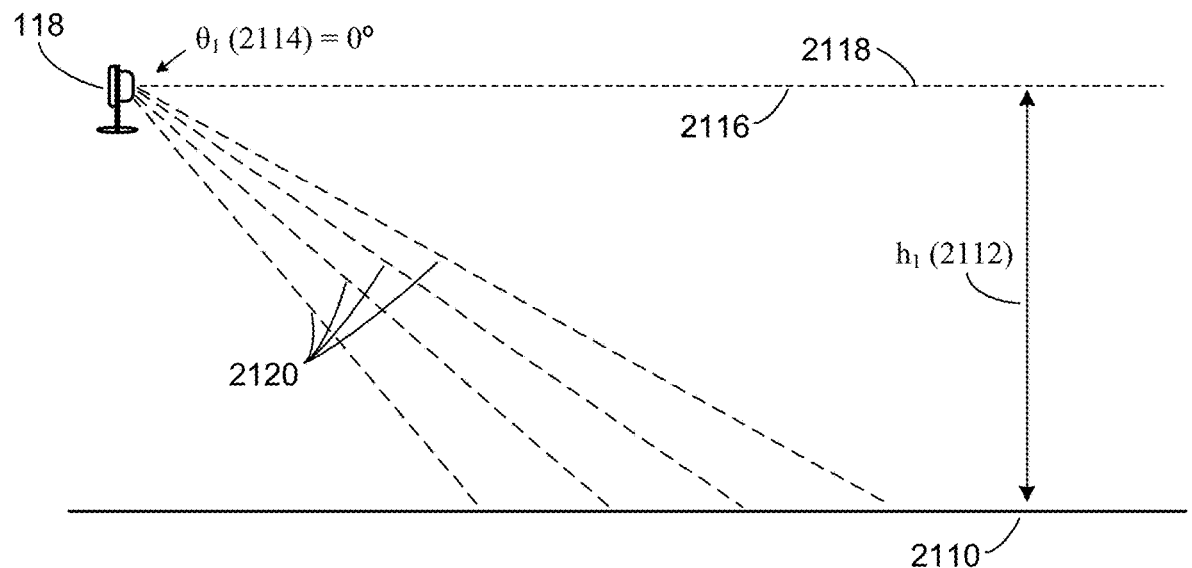

In FIG. 21A, the camera 118 is at a height $h_1$ 2112 above the floor 2110, and some of the floor 2110 is in the field of vision of the camera 118, as illustrated by the dashed lines 2120. In FIG. 21A, the camera is facing straight forward, so the camera orientation 2116 matches the plane 2118 parallel to the floor 2110. This produces a tilt angle $\theta_1$ 2114 of 0 degrees.

Figure 21B:
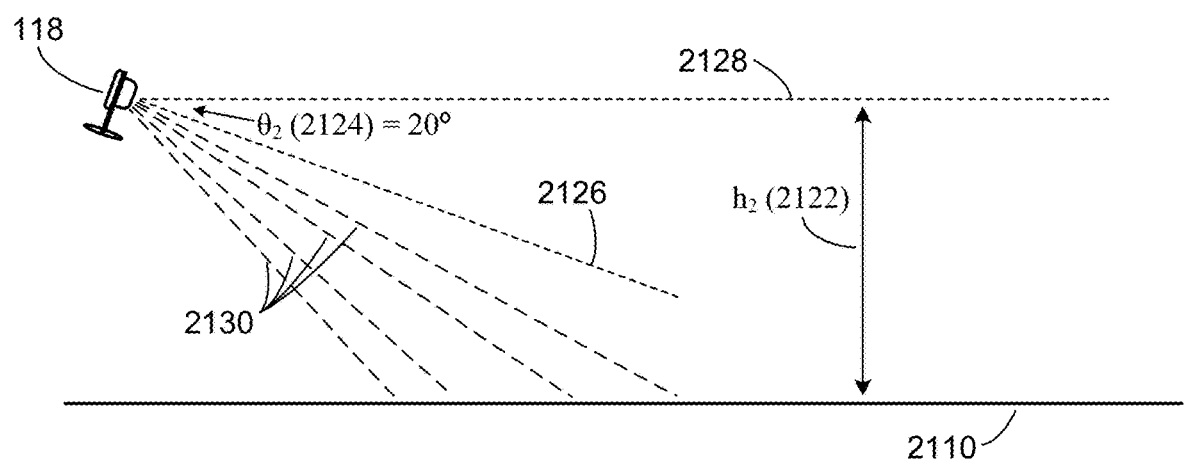

FIG. 21B shows the same camera 118 at a different height and orientation with respect to the floor 2110. A portion of the floor 2110 is in the field of vision of the camera 118, as indicated by the dashed lines 2130. The camera 118 is at a height $h_2$ 2122 above the floor 2110, and the camera is tilted at an angle $\theta_2$ 2124 of 20 degrees. The angle $\theta_2$ is measured between the plane 2128 parallel to the floor and the camera orientation 2126.

The illustrations in FIGS. 21A and 21B illustrate both the process of building a dictionary (typically using simulation with varying heights and tilt angles) as well as determining the position of an actual camera 118.

FIG. 21C illustrates a dictionary 2150 of training entries 2152, which will be used subsequently to estimate the height and tilt angle of an actual camera 118. In some implementations, the entries 2152 are constructed by simulating a camera 118 with various heights and tilt angles with respect to a simulated floor. In other implementations, the entries are constructed based on test data with an actual camera 118 at various heights and angles relative to an actual floor. In some implementations, test data is collected in an environment with little or no ambient light so that the collected images are based on just the IR light emitted by the IR illuminators of the camera.

The dictionary includes a height 2154 and a tilt 2156 for each entry, and includes data for one or more images captured based on different sets of IR illuminators emitting light. In some implementations, a single image is captured while all of the IR emitters are on. In some implementations, a separate image is captured for each individual IR emitter, taken while that IR emitter is on and the remaining IR emitters are off. In some implementations, the emitters are grouped into pairs, as illustrated above with respect to FIG. 14. In the example dictionary 2150 in FIG. 21C, there are four subsets (as in FIG. 14), and separate images 2140, 2142, 2144, and 2146 are simulated or captured for each of the subsets. When built using simulation, the estimated intensity at each pixel depends on the location and orientation of the IR emitters relative to the image sensor array 852.

In this example dictionary 2150, the second dictionary entry 2152-2 corresponds to a height of 0.6 meters and a tilt angle of 10°. In some implementations, positive title angles indicate the camera is pointing downward. For this second entry 2152-2, the process simulates or captures four images $I_{2,1}$, $I_{2,2}$, $I_{2,3}$, and $I_{2,4}$, corresponding to each of the four subsets of IR illuminators. In some implementations, abbreviated images are stored. For example, some implementations store only pixels corresponding to the simulated floor. Note that the pixels in the images are typically downsampled from the image sensor array. For example, the image sensor array may include 4 million individual image sensors, whereas the saved images may include only 10,000 pixels.

In this example dictionary 2150, there are 250 dictionary entries 2152, corresponding to heights ranging from 0.6 meters to 3.0 meters (in 0.1 meter increments) and angles ranging from 0 degrees to 90 degrees (in 10 degree increments). In some implementations, there are fewer or more dictionary entries 2152, depending on the desired granularity, available storage space, required processing speed, and/or other considerations.

Whereas a dictionary 2150 is typically creating one time for a given camera model, the dictionary 2150 can be used many times to estimate the heights and tilt angles of many cameras at many different times.

Figure 21D:
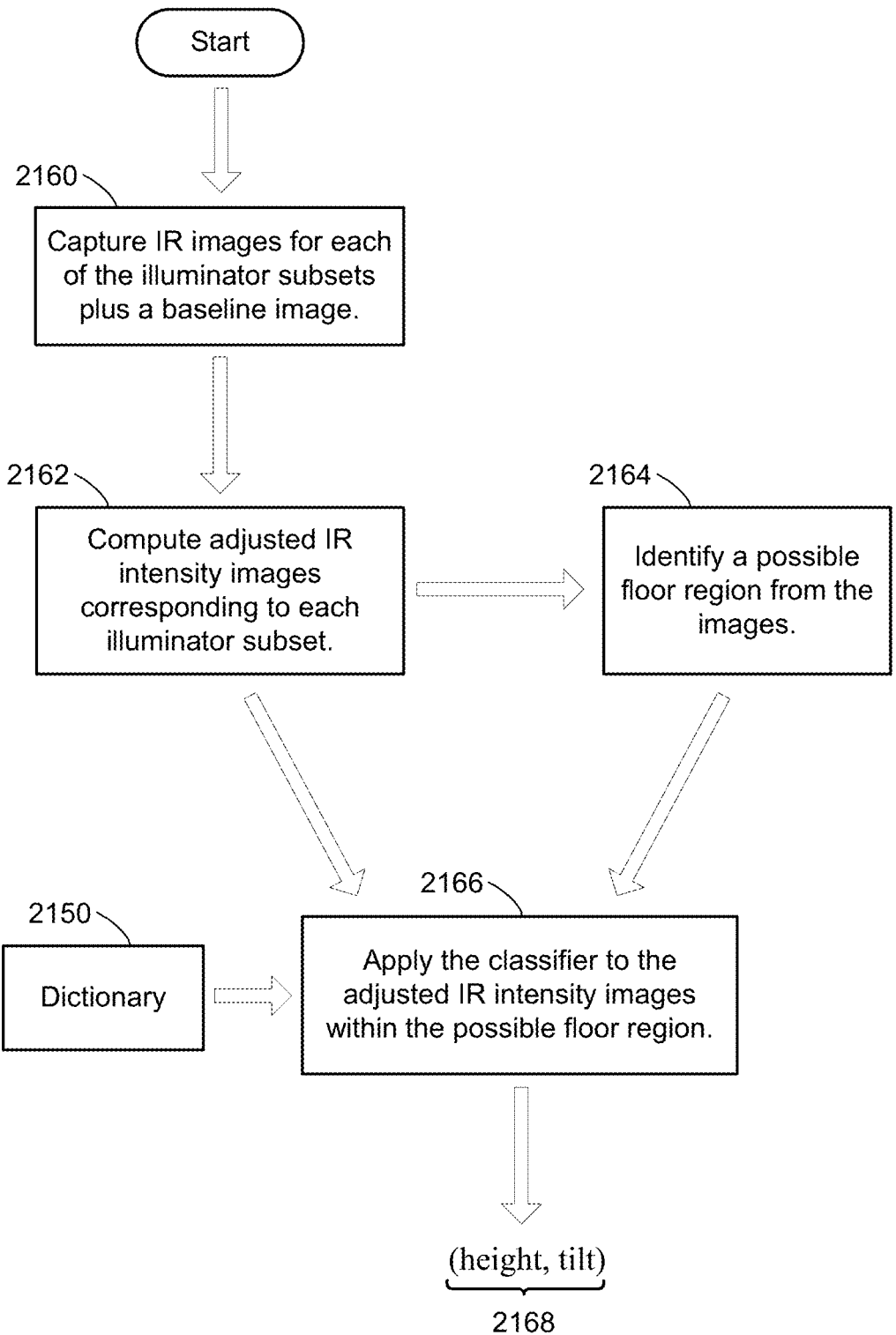

FIG. 21D illustrates a process for determining the height and tilt angle of an actual camera 118 according to some implementations. When the dictionary 2150 was created, certain distinct subsets of the IR illuminators were specified. The same subsets are used during the estimation process in FIG. 21D. For each of those distinct subsets of illuminators, the process captures (2160) an IR image (measuring IR light intensity) while the illuminators in the subset are emitting light and the IR illuminators not in the subset are not emitting light. In addition, the process captures (2160) a baseline light intensity image when none of the IR illuminators are emitting light. The process then computes (2162) adjusted IR intensity images for each of the distinct subsets of IR illuminators by subtracting the baseline intensity image from each of the other images (subtracting on a pixel-by-pixel basis).

Using the adjusted intensity images, the process identifies (2164) at least one possible floor region. In some implementations, identifying a possible floor region uses techniques illustrated in FIGS. 20A-20K and 25A-25B. If no floor regions are identified, some implementations automatically switch to determining the position of the camera relative to the ceiling. When more than one floor region is identified, some implementations estimate a camera position relative to each of the identified regions, then select a best fit or compute an aggregated estimate. If there are two or more regions and the estimates are similar, some implementations compute an average or weighted average. If there are two or more regions and the estimates differ substantially, some implementations select the data for the larger height based on the statistical reasoning that the higher number is more likely to be correct (e.g., because the smaller number is from a table).

Some implementations use an iterative algorithm for identifying a floor region. In some of these implementations, the entire set of pixels is used as a starting point for the first iteration, and in each iteration some of the pixels are removed. In some implementations, the pixels identified for removal in each iteration are selected based on overall contribution to the computed distances between the adjusted IR intensity images and entries in the dictionary. In some implementations, the process combines floor selection (2164) and classification (2166) into an iterative loop.

Once a floor region is identified, a classifier estimates (2166) the (height, tilt) 2168 using the adjusted IR intensity images, the previously computed dictionary 2150, and limiting the analysis to pixels in the identified floor region. The operation of the classifier is described in more detail in FIG. 21E.

The classifier identifies a "closest" dictionary entry 2152 to the adjusted IR intensity images, and estimates the height and tilt of the camera based on that closest dictionary entry. When the number of dictionary entries is small (e.g., 100), some implementations compare the adjusted IR intensity images to each of the dictionary entries to find the closest one. In some implementations, the process is able to prune some of the dictionary entries, thereby comparing the adjusted IR intensity images to a smaller list of dictionary entries.

Figure 21E:
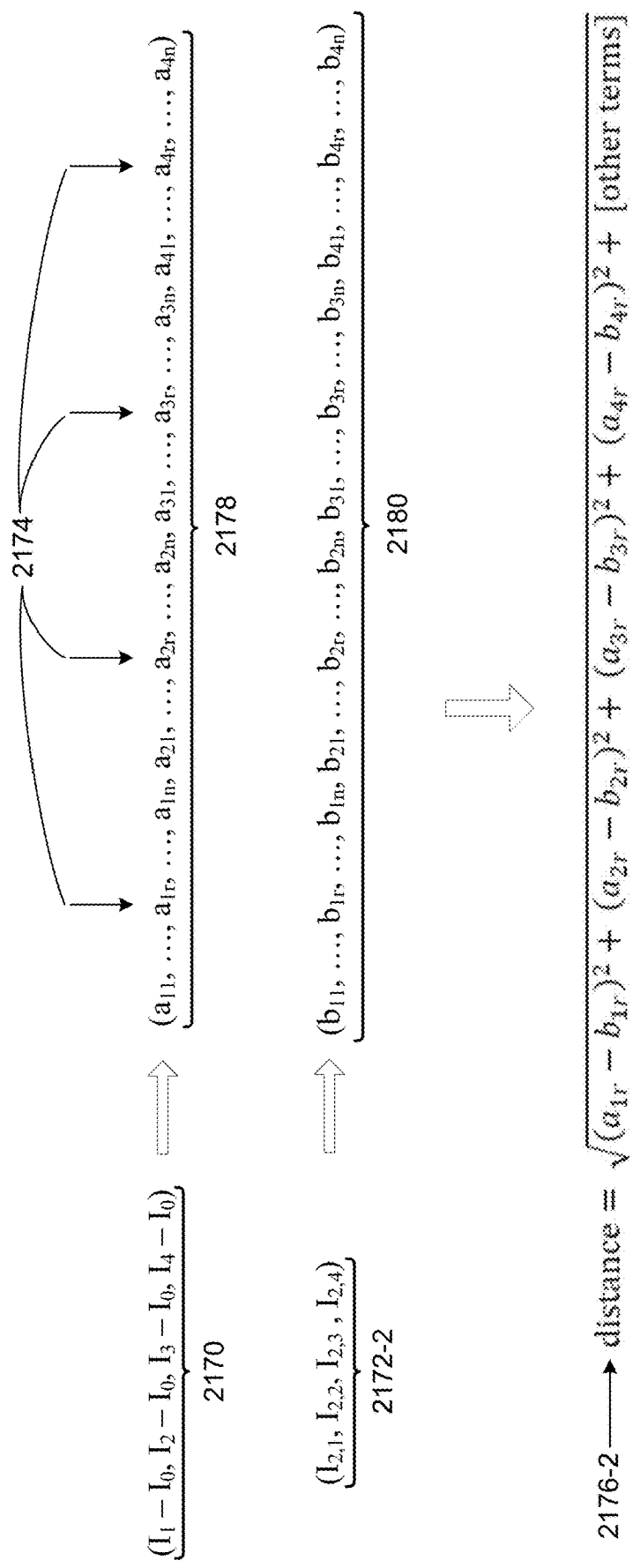

To identify a closest dictionary entry 2152, some implementations compute distances between vectors, as illustrated in FIG. 21E. In this figure, the input is the set of four images $I_1$, $I_2$, $I_3$, and $I_4$ based on the different subsets of illuminators, and the baseline image $I_0$. The baseline image $I_0$ is subtracted from the others to create the input 2170, which can be viewed as a long feature vector 2178. In this example, each image has n pixels, and the elements are arranged in order of the images. For example, the elements $a_{11}$, ..., $a_{1r}$, ..., $a_{1n}$ correspond to the pixels of the image $I_1-I_0$. In this example, the index r corresponds to one specific pixel in the identified floor region. Because there are four distinct images, there are four feature vector components $a_{1r}$, $a_{2r}$, $a_{3r}$, $a_{4r}$ 2174 corresponding to the rth pixel.

FIG. 21E illustrates comparing the feature vector to the second entry 2152-2 in the dictionary 2150. This second entry 2152-2 includes intensity images $(I_{2,1}, I_{2,2}, I_{2,3}, I_{2,4})$ 2172-2, which can be represented as a long dictionary entry vector 2180, with components corresponding to the components of the feature vector 2178.

To compute the distance between the feature vector 2178 and a dictionary entry vector 2180, some implementations use Euclidean distance based on the relevant vector components. The relevant components are the ones associated with the pixels in the identified floor region. For example, in this case, the rth pixel is part of the identified floor region, so the four components corresponding to r are included in the calculation of the distance, as illustrated in formula 2176-2. If there are four illuminator subsets and 100 pixels in the identified floor region, then the distance calculation will use 400 components of the vectors. In some implementations, alternative distance metrics are used, such as the total absolute difference between vector components $|a_{1r}-b_{1r}|+ \ldots$ or the maximum absolute difference between vector components.

In some implementations, the single closest dictionary entry is used to estimate the camera position. For example, if the second dictionary entry 2152-2 above is determined to be closer than all of the other dictionary entries, then the camera is estimated to be at a height of 0.6 meters and at an angle of 10 degrees (see FIG. 21C). In some implementations, the k closest dictionary entries are identified for a predefined positive integer k. These k entries are then used to estimate the height and tilt angle for the camera. For example, some implementations compute a weighted average from the k nearest entries, and weight each entry inversely based on its calculated distance. Some implementations use alternative techniques, such as other regression algorithms.

Figure 22A:
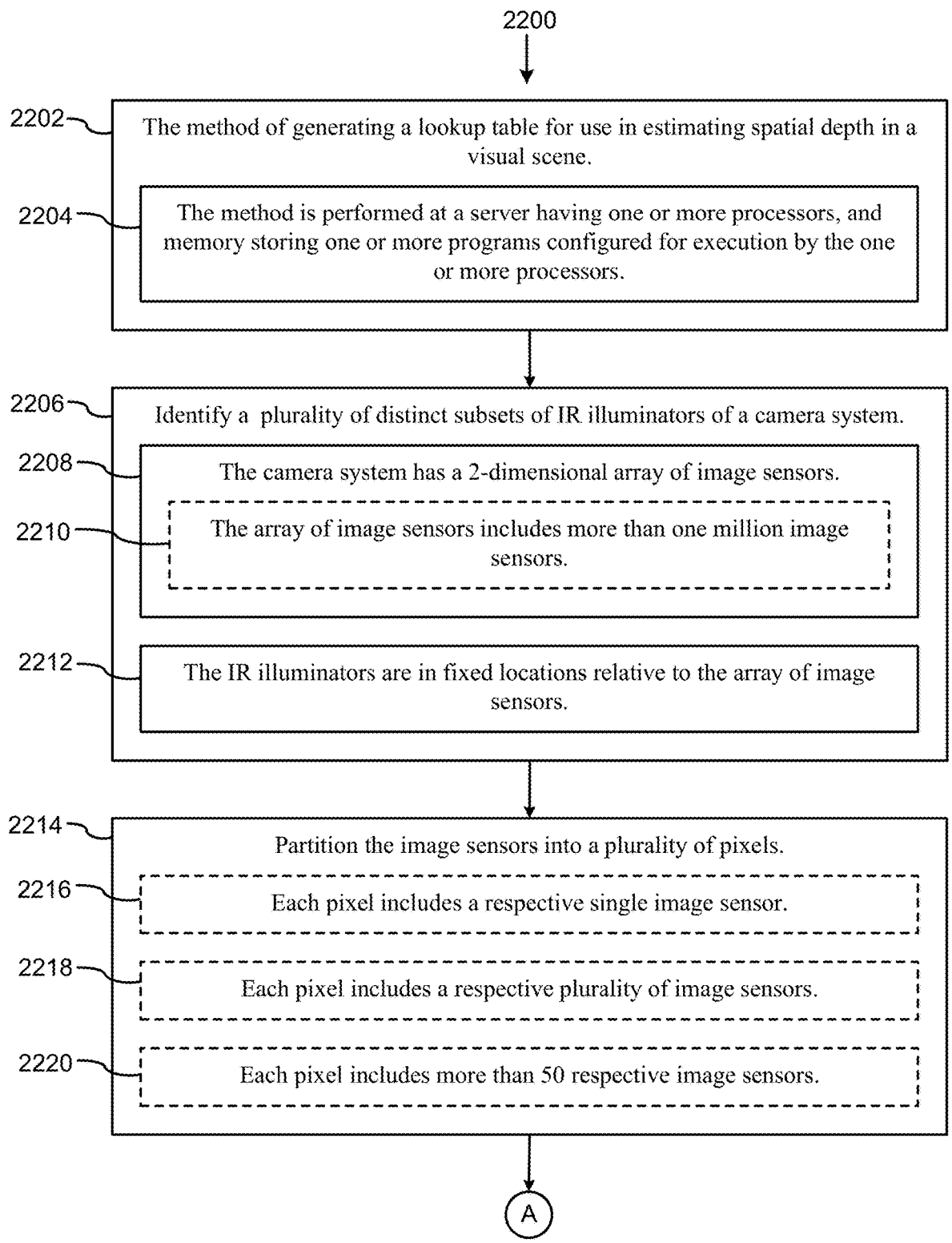
FIGS. 22A-22C provide a flowchart of a process for building a lookup table in accordance with some implementations.
Figure 22B:
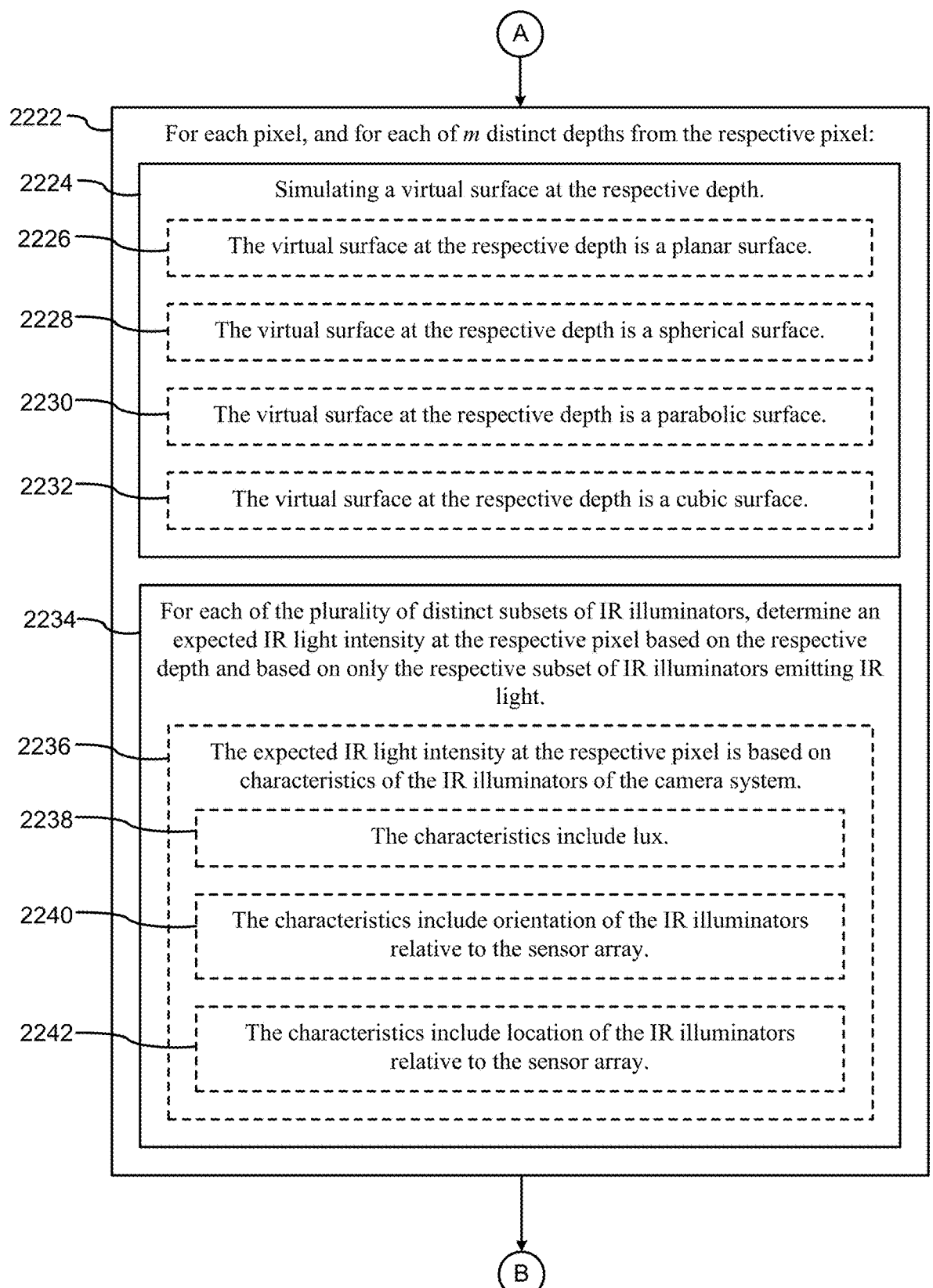
Figure 22C:
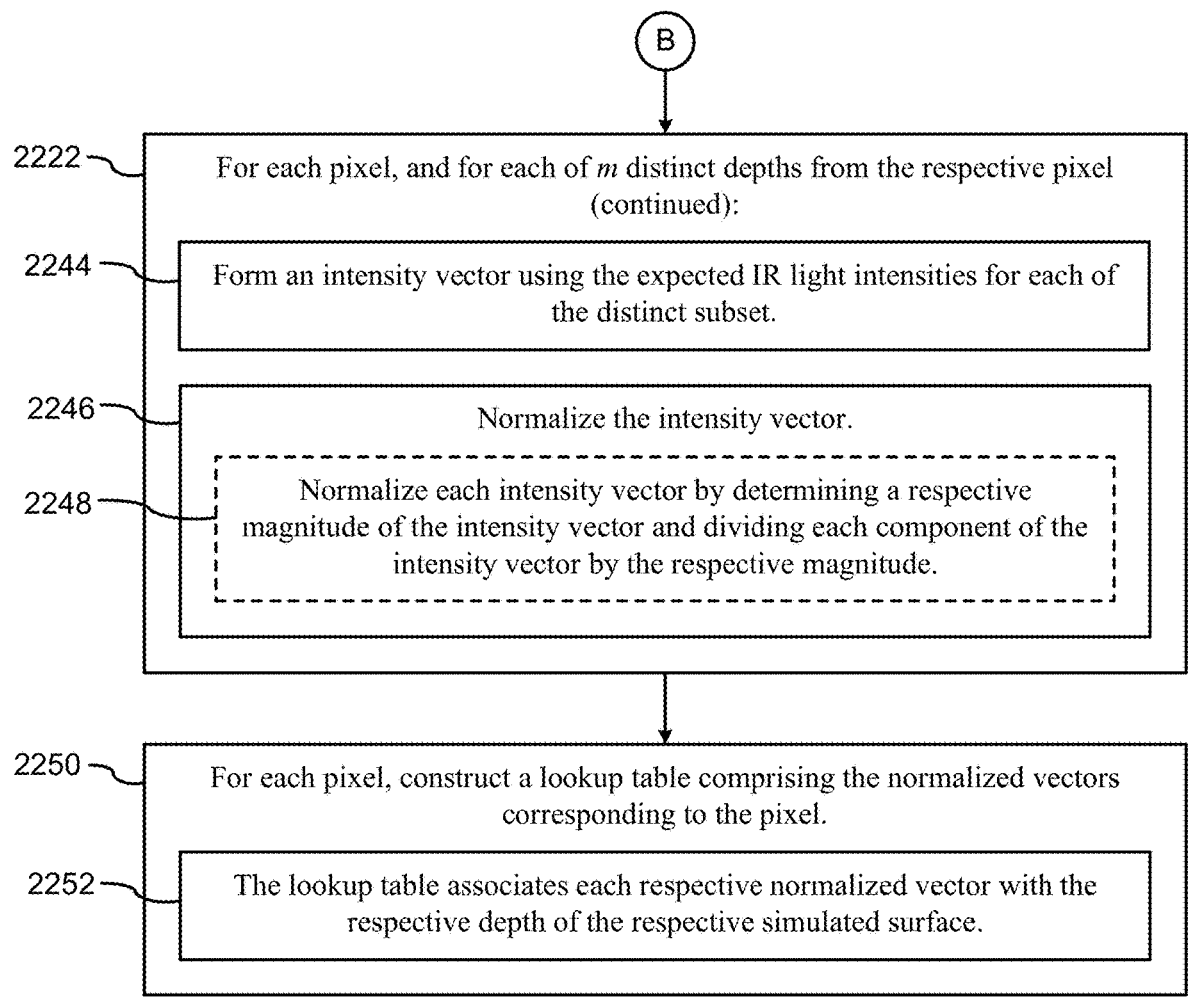

FIGS. 22A-22C provide a flowchart of a process 2200, performed by a computing device, for generating (2202) a lookup table for use in estimating spatial depth in a visual scene. The method is performed (2204) at a computing device (e.g., a scene understanding server 900) having one or more processors and memory. The memory stores (2204) one or more programs configured for execution by the one or more processors.

The process identifies (2206) a plurality of distinct subsets of IR illuminators 856 of a camera system 118. One example is illustrated above in FIGS. 16A-16D, where the camera's 8 illuminators 856 are grouped into four distinct subsets. One of skill in the art recognizes that many other alternatives are possible, such as having one illuminator in each subset, having some overlap between subsets, or having different subsets with different numbers of illuminators.

The camera also has (2208) a 2-dimensional array 852 of image sensors. The 2 dimensional array 852 is typically laid out in a rectangular pattern, as illustrated above in FIGS. 10 and 11, but the disclosed process 2200 can be applied regardless of the pattern to lay out the image sensors in the array. In some implementations, the array of image sensors includes (2210) more than 1,000,000 individual image sensors (e.g., $2^{24}$ sensors). The IR illuminators 856 are (2212) in fixed locations relative to the array 852 of image sensors, as illustrated in FIGS. 10 and 12 above.

The process partitions (2214) the image sensors into a plurality of pixels. In some implementations, each pixel includes (2216) a respective single image sensor. In some implementations, each pixel includes (2218) a respective plurality of image sensors. In some implementations, each pixel includes (2220) more than 50 respective image sensors. These are a few ways that implementations partition the individual image sensors into pixels. Typically the array of image sensors has a high resolution, but sensors are downsampled to create a more manageable number of pixels (e.g., 10,000 pixels).

A separate lookup table is constructed for each pixel. Each record in a lookup table corresponds to a depth in front of the pixel. The accuracy of subsequent depth estimation depends on the number of depths used to build each lookup table. For example, if depth data is created for each inch in front of the pixel, then subsequent depth estimation may be accurate within an inch. However, if there are only two depth data points, the accuracy for subsequent estimation will be limited.

For each pixel, and for each of m distinct depths from the pixel, the process performs (2222) the following operations. The process simulates (2224) a virtual surface at the respective depth. Implementations use various shapes for the virtual surfaces, such as planar (2226), spherical (2228), parabolic (2230), or cubic (2232). FIG. 13 illustrates the case of planar surfaces. Typically, an implementation uses the same surface shape for each of the pixels and depths, although potentially with different parameters. For example, when spherical surfaces are used, some implementations simulate a sphere whose radius is the given depth so that the surfaces at each of the depths create concentric spheres.

For each pixel and for each of the depths (2222), the process also determines (2234) an expected IR light intensity at the respective pixel based on the respective depth, the shape of the virtual surface, and which subset of IR illuminators is emitting IR light. In some implementations, the expected IR light intensity at the respective pixel is (2236) based on other characteristics of the IR illuminators of the camera system as well. For example, in some implementations, the characteristics include (2238) the lux of the IR illuminators 856. In some implementations, the characteristics include (2240) orientation of the IR illuminators relative to the sensor array. This is illustrated above in FIG. 12, with illuminator 856-1 oriented at an angle 1210. In some implementations, the characteristics include (2242) location of the IR illuminators relative to the sensor array.

For each pixel and for each of the depths (2222), the process also forms (2244) an intensity vector using the expected IR light intensity for each of the distinct subsets. This is illustrated in FIG. 17A above. Typically a baseline value is subtracted from each of the values, where the baseline value is measured when none of the illuminators are emitting light. The process then normalizes (2246) the intensity vector. In some implementations, the process normalizes each intensity vector by determining (2248) a respective magnitude of the intensity vector and dividing each component of the intensity vector by the respective magnitude.

The process constructs (2250) a lookup table for each pixel using the normalized vectors corresponding to the pixel. Each lookup table associates (2252) each respective normalized vector in the table with the respective depth of the respective simulated surface. Some implementations use this lookup table as described below with respect to the process 2300 illustrated in FIGS. 23A-23C.

Figure 23A:
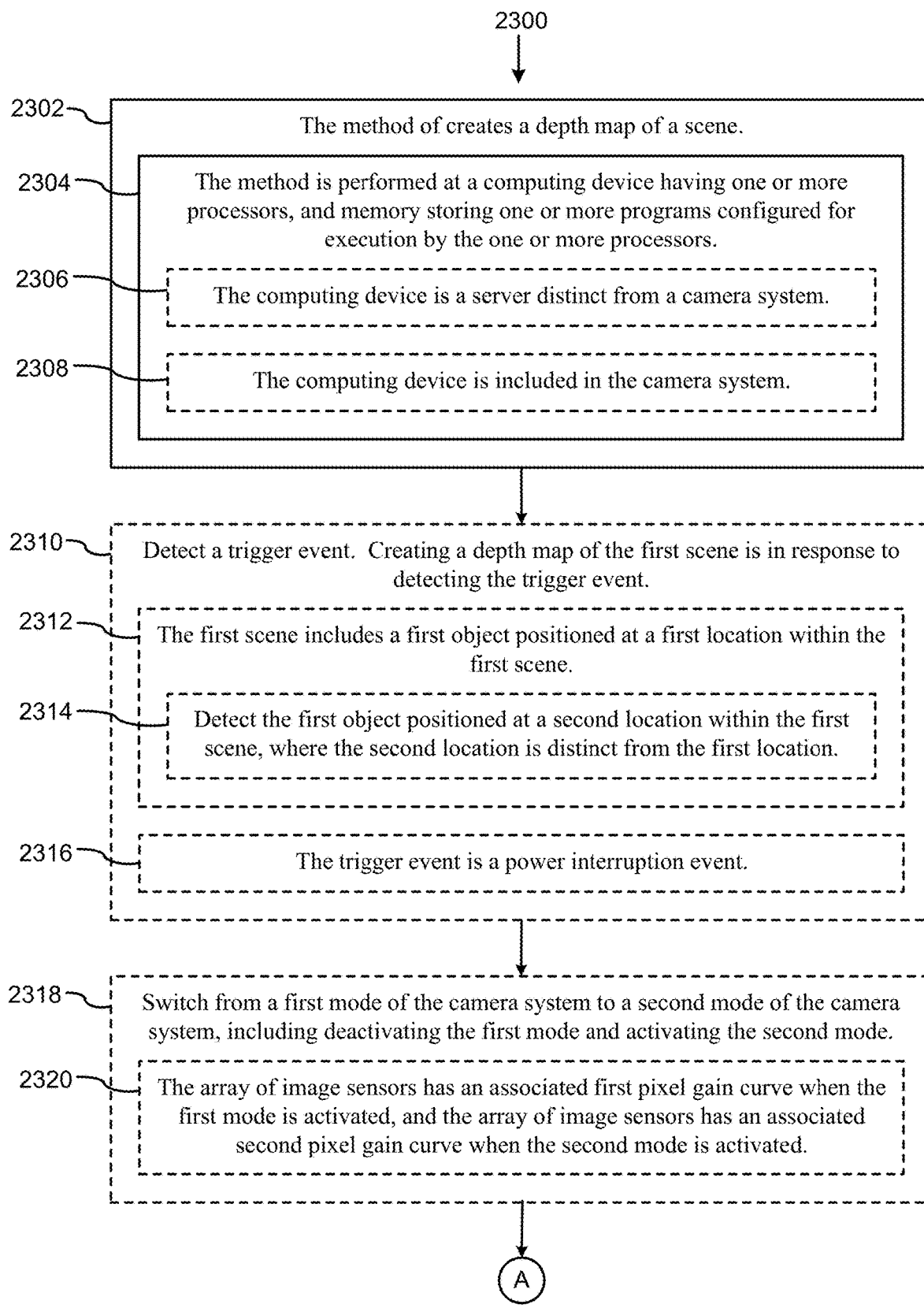
FIGS. 23A-23C provide a flowchart of a process for using a lookup table to build a depth map of a scene in accordance with some implementations.
Figure 23B:
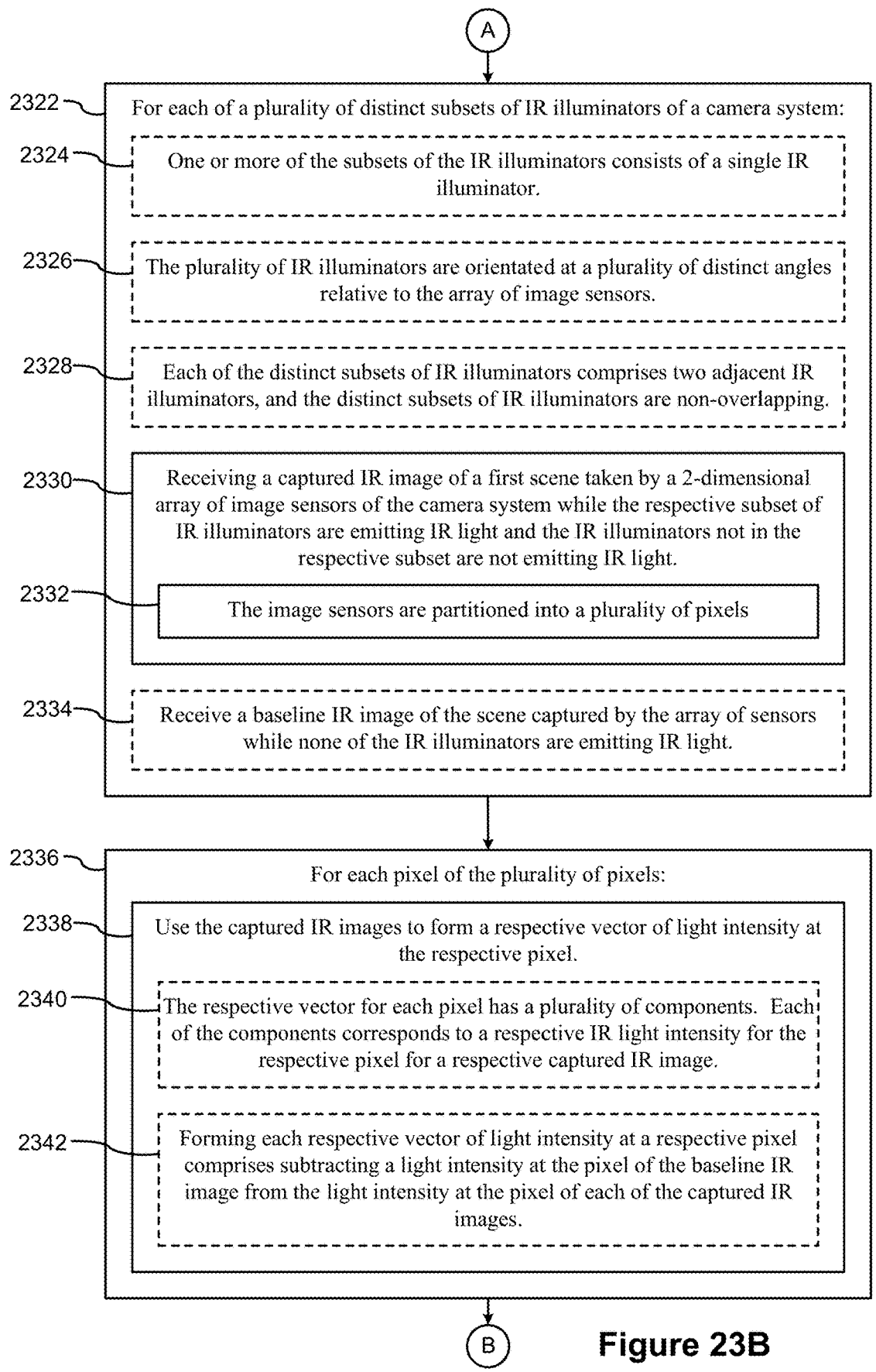
Figure 23C:
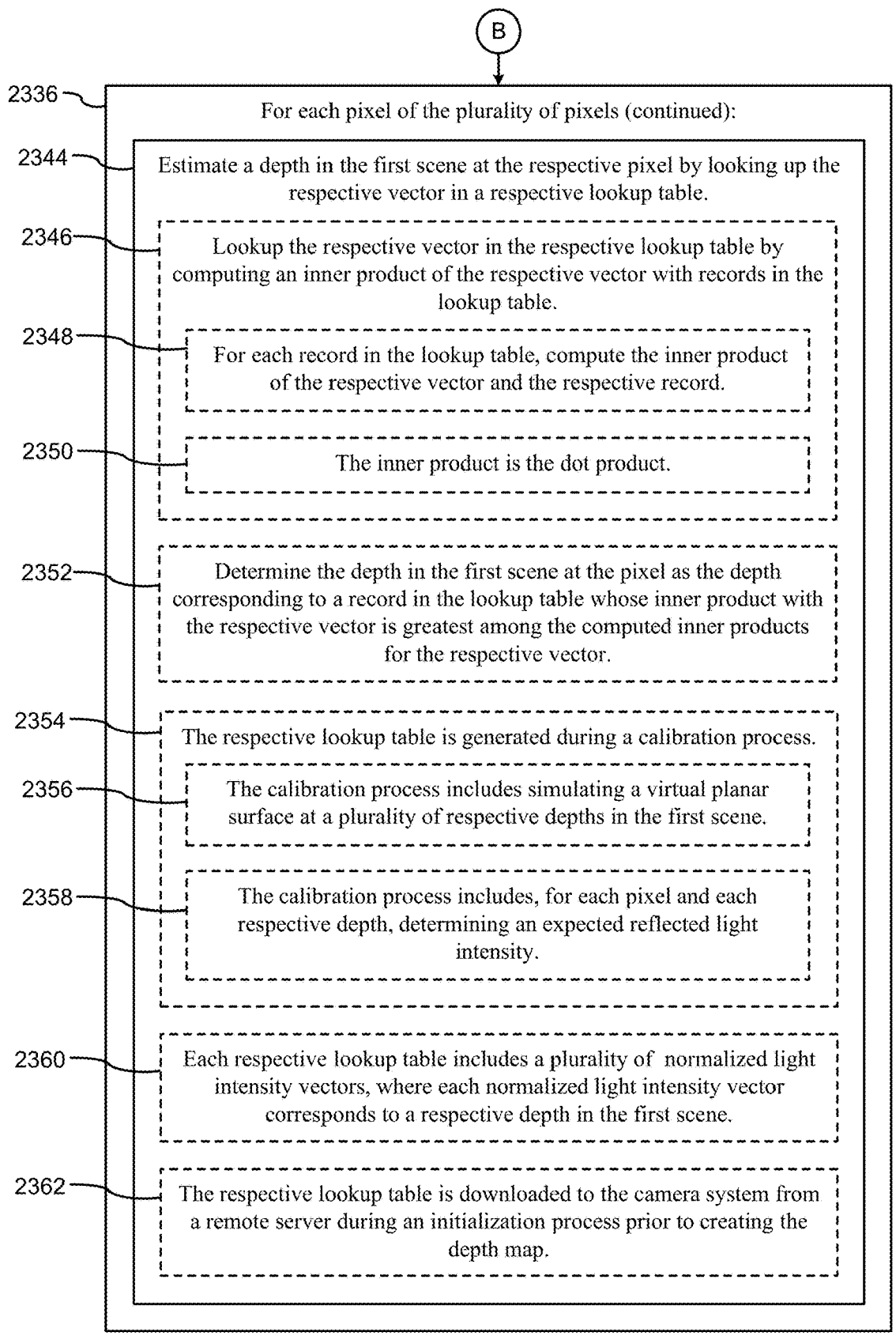

FIGS. 23A-23C provide a flowchart of a process 2300, performed by a computing device, for creating (2302) a depth map of a scene. The method is performed (2304) at a computing device (e.g., a scene understanding server 900) having one or more processors and memory. The memory stores (2304) one or more programs configured for execution by the one or more processors. In some implementations, the computing device is (2306) a server distinct from a camera system. In other implementations, the computing device is (2308) included in the camera system.

In some implementations, the process 2300 detects (2310) a trigger event. In some implementations, creating the depth map of the first scene is (2310) in response to detecting the trigger event. In some implementations, the first scene includes (2312) a first object positioned at a first location within the first scene and the process 2300 detects (2314) the first object positioned at a second location within the first scene, where the second location is distinct from the first location. The movement of the first object triggers the building of the depth map. In some implementations, the trigger event is (2316) a power outage (e.g., build or rebuild the depth map when the computing device reboots).

In some implementations, the process 2300 switches (2318) the mode of operation of the camera system when building the depth map. For example, some implementations switch (2318) from a first mode of the camera system to a second mode of the camera system, including deactivating the first mode and activating the second mode. In some implementations, the array of image sensors has (2320) an associated first pixel gain curve when the first mode is activated, and the array of image sensors has (2320) an associated second pixel gain curve when the second mode is activated.

For each of a plurality of distinct subsets of IR illuminators of the camera system, the process 2300 performs (2322) a set of operations. In some implementations, one or more of the subsets of the IR illuminators consists (2324) of a single IR illuminator. In some implementations, the plurality of IR illuminators are orientated (2326) at a plurality of distinct angles relative to the array of image sensors. In some implementations, each of the distinct subsets of IR illuminators comprises (2328) two adjacent IR illuminators, and the distinct subsets of IR illuminators are (2328) non-overlapping. One of skill in the art recognizes that various groupings, arrangements, and/or configurations may be used for the IR illuminators.

The process 2300 receives (2330) a captured IR image of a first scene taken by a 2-dimensional array of image sensors of the camera system while the respective subset of IR illuminators are emitting IR light and the IR illuminators not in the respective subset are not emitting IR light. This occurs for each distinct subset of IR illuminators. The image sensors are partitioned (2332) into a plurality of pixels. As noted above with respect to the process 2200 in FIG. 22A, the partitioning of image sensors into pixels can occur in various ways depending on the implementation. In some implementations, the process 2300 receives (2334) a baseline IR image of the scene captured by the array of sensors while none of the IR illuminators are emitting IR light. Some implementations subtract the light intensity from this baseline image from the light intensity in each of the other captured IR images, as illustrated above in FIG. 17A.

For each of the pixels, the process 2300 performs (2336) several operations, including using (2338) the captured IR images to form a respective vector of light intensity at the respective pixel. In some implementations, the respective vector for each pixel has (2340) a plurality of components. Each of the components corresponds (2340) to a respective IR light intensity for the respective pixel for a respective captured IR image. This is illustrated above in FIG. 17A, where the vector $\vec{b}_{i,j}$ 1706 has four components, corresponding to the four illumination groups 1602 illustrated in FIGS. 16A-16D. In some implementations, forming each respective vector of light intensity at a respective pixel comprises (2342) subtracting a light intensity at the pixel in the baseline IR image from the light intensity at the pixel in each of the captured IR images, as illustrated in FIG. 17A. In this way, the vector measures the additional light that is received at the image sensor array 852 based on reflections of light emitted from each of the illumination groups.

For each pixel (2336), the process 2300 then estimates (2344) a depth in the first scene at the respective pixel by looking up the respective vector in a respective lookup table. In some implementations, the process looks up (2346) the respective vector in the respective lookup table by computing (2346) an inner product of the respective vector with records in the lookup table. One of skill in the art recognizes that in a vector space an inner product can be used to measure the extent to which a pair of vectors are pointing in the same direction. In some instances, the inner product is (2350) an ordinary dot product. In some implementations, the process 2300 computes (2348) the inner product of the respective vector with each respective record in the respective lookup table. In some implementations, fewer than all of the inner products are computed for the lookup table (e.g., based on optimization techniques, such as recognizing that certain records in the lookup table would produce smaller inner products than some inner products that are already computed).

In some implementations, the process 2300 determines (2352) the depth in the first scene at the pixel as the depth corresponding to a record in the lookup table whose inner product with the respective vector is greatest among the computed inner products for the respective vector. This is illustrated above with respect to FIG. 17B.

In some implementations, the respective lookup table is generated (2354) during a calibration process at the camera 118. In some implementations, the calibration process includes (2356) simulating a virtual planar surface at a plurality of respective depths in the first scene. In some implementations, the calibration process includes (2358), for each pixel and each respective depth, determining an expected reflected light intensity. In some implementations, each respective lookup table is downloaded (2362) to the camera system 118 from a remote server during an initialization process prior to creating the depth map.

In some implementations, each respective lookup table includes (2360) a plurality of normalized light intensity vectors, where each normalized light intensity vector corresponds to a respective depth in the first scene. This is illustrated above in FIGS. 13, 14, 15A, and 15B.

Although lookup tables have been identified separately for each pixel, one of skill in the art recognizes that the separate logical lookup tables are not necessarily stored as separate files or databases. For example, some implementations store all of the lookup tables as a single physical table in a relational database or as a single physical file on a file server. In some implementations, the totality of lookup tables is stored as a small number of distinct files. As described above, implementations generate and use the lookup tables on various devices depending on the capabilities of the camera system 118, available network bandwidth, and other resources. For example, for camera systems with limited processing power and/or storage, some implementations build and use the lookup tables at a scene understanding server 900. The camera system 118 captures the IR images (e.g., baseline image plus additional images with different sets of illuminators on), and transmits them to the server 900. The server then constructs the depth map. In some implementations, the lookup tables are constructed at the server 900 based on the depth simulations and knowledge of the camera configuration, and then downloaded to the camera. In some of these implementations, the camera 118 uses the lookup tables itself to build a depth map.

Figure 24A:
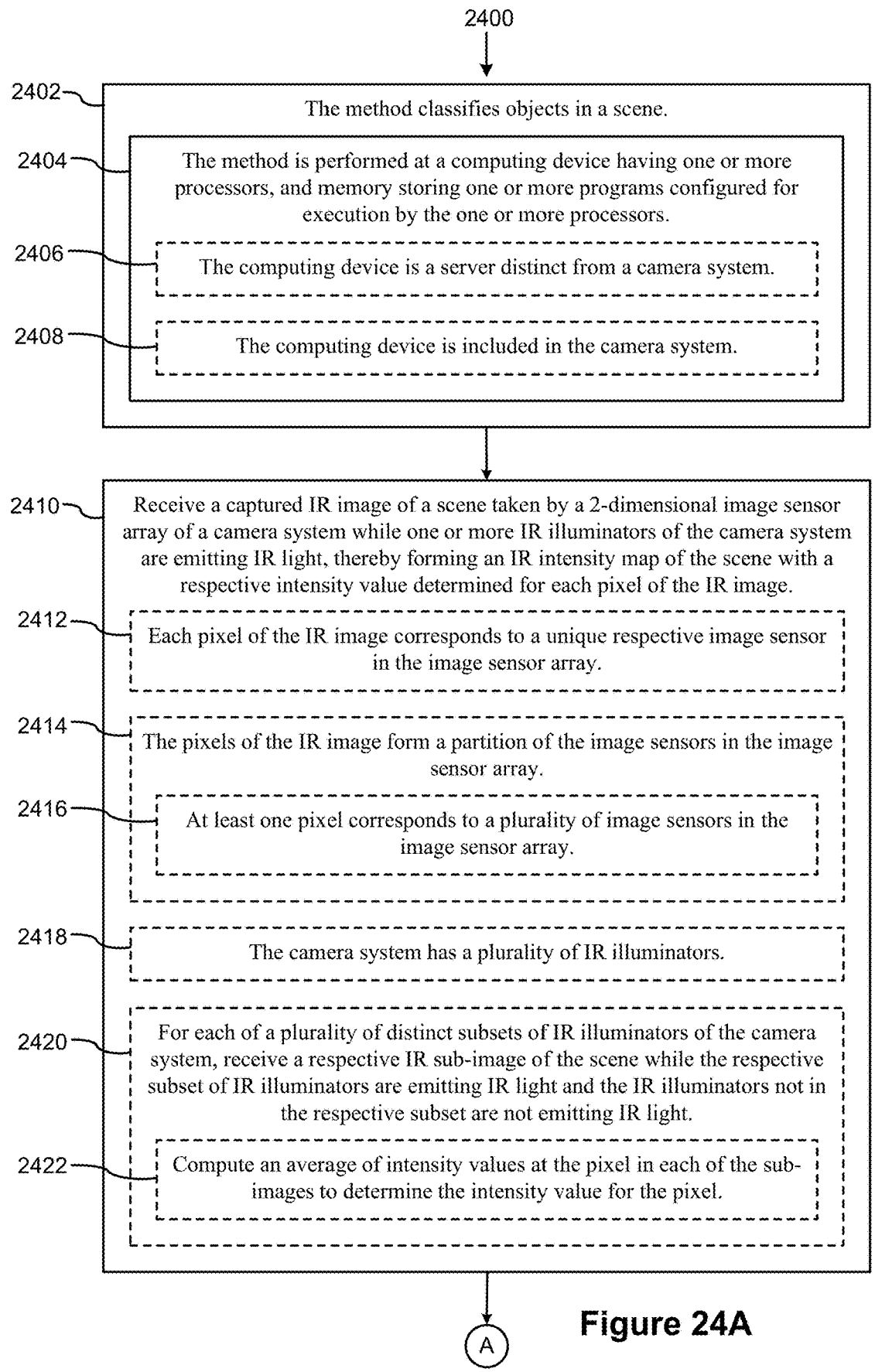
FIGS. 24A-24C provide a flowchart of a process for identifying objects, such as windows, based on specularity, in accordance with some implementations.
Figure 24B:
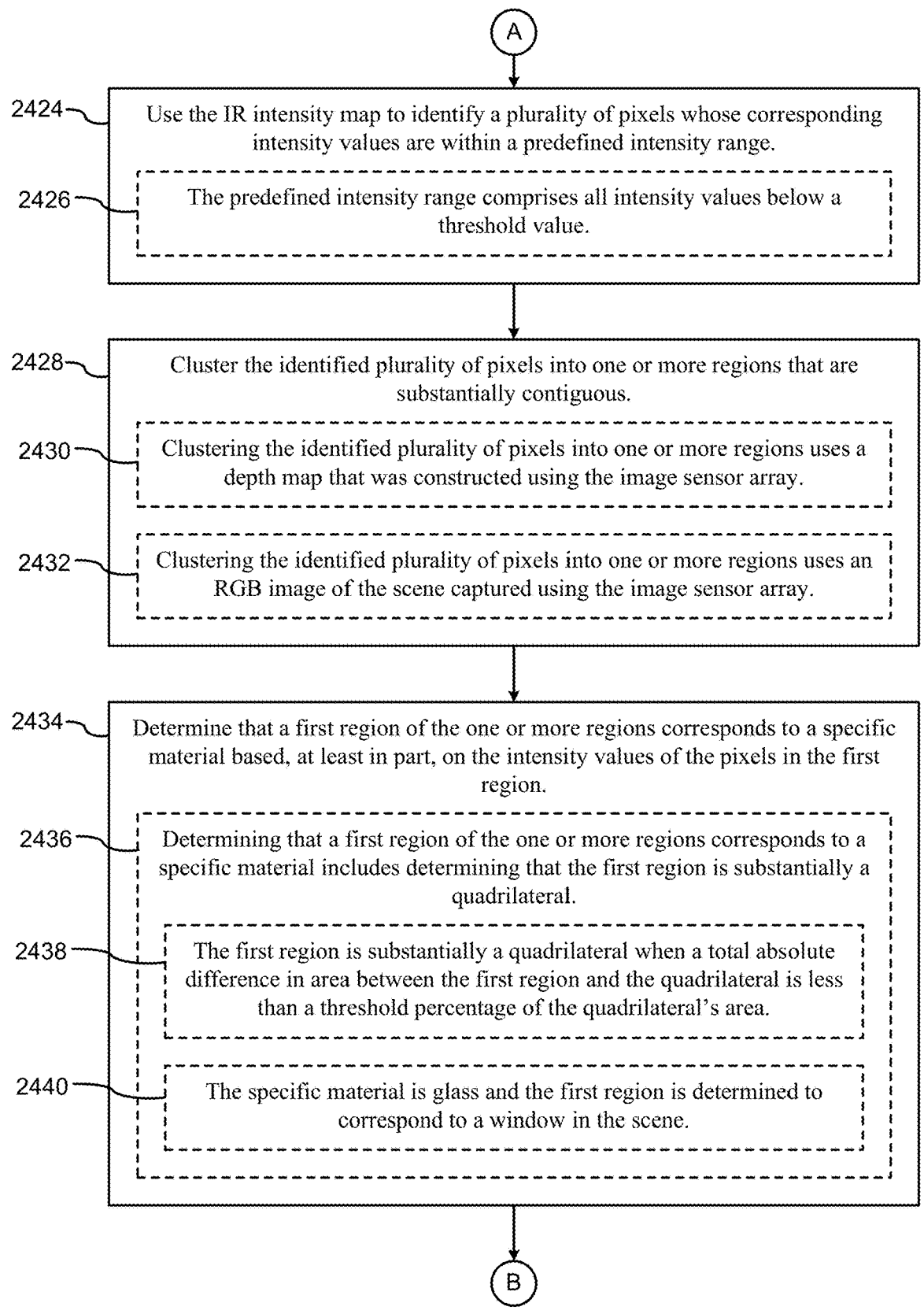
Figure 24C:
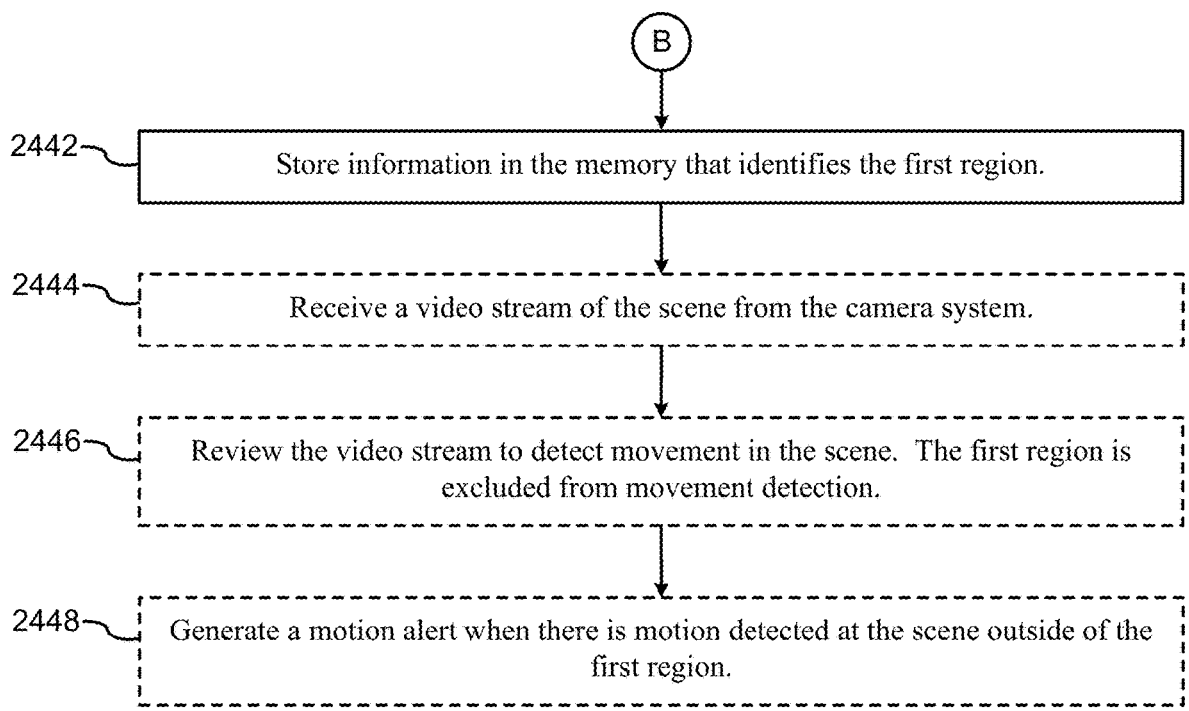

FIGS. 24A-24C provide a flowchart of a process 2400, performed by a computing device, for classifying (2402) objects in a scene. The method is performed (2404) at a computing device (e.g., a scene understanding server 900) having one or more processors and memory. The memory stores (2404) one or more programs configured for execution by the one or more processors. In some implementations, the computing device is (2406) a server distinct from a camera system. In other implementations, the computing device is (2408) included in the camera system.

The process receives (2410) a captured IR image of a scene taken by a 2-dimensional image sensor array of a camera system while one or more IR illuminators of the camera system are emitting IR light, thereby forming an IR intensity map of the scene with a respective intensity value determined for each pixel of the IR image. Typically, the IR image is captured at night, so most of the intensity is based on reflection of the light from the IR illuminators. Typical surfaces disperse light in all directions, so some of the emitted light is reflected back to the image sensor array. For a specular surface, however, such as a window, mirror, or some television screens, the incoming light at a surface is reflected off primarily in one direction, with the angle of incidence equal to the angle of reflection. A specular region therefore typically has low intensity in the IR intensity map.

The pixels in the IR intensity map can correspond to the image sensors in the array 852 in various ways, as previously illustrated with respect to FIG. 22A (boxes 2214-2220). In some implementations, each pixel of the IR image corresponds (2412) to a unique respective image sensor in the image sensor array. In some implementations, the pixels of the IR image form (2414) a partition of the image sensors in the image sensor array. In some of these implementations, at least one pixel corresponds (2416) to a plurality of image sensors in the image sensor array.

Typically, the camera system 118 includes (2418) a plurality of IR illuminators, as illustrated above in FIGS. 10 and 12. In some implementations, the process 2400 constructs the IR intensity map from multiple distinct IR images. For example, in some implementations, the process receives (2420) a respective IR sub-image of the scene for each of a plurality of distinct subsets of IR illuminators of the camera system. Each sub-image is captured (2420) while illuminators in a respective subset are emitting IR light and the IR illuminators not in the respective subset are not emitting IR light. The process 2400 computes (2422) an average of the intensity values at the pixel in each of the sub-images to determine the intensity value for the pixel.

The process uses (2424) the IR intensity map to identify a plurality of pixels whose corresponding intensity values are within a predefined intensity range. In some implementations, the predefined intensity range is (2426) all intensity values below a threshold value. This is the intensity range typically used when the goal is to identify windows. Some implementations use other ranges to identify other specific materials.

The process 2400 clusters (2428) the identified plurality of pixels (i.e., the pixels identified based on the intensity range) into one or more regions that are substantially contiguous. This is illustrated above with respect to FIG. 18B. Some implementations use other factors in the clustering process as well. For example, some implementations set a threshold size for a region. Small regions of low intensity are either combined with other nearby regions or ignored. In some implementations, clustering the identified plurality of pixels into one or more regions uses (2430) a depth map that was constructed using the image sensor array. For example, when trying to identify windows, a window should be continuous. A single region with two or more significantly disparate depths is not likely to be a window. In some implementations, clustering the identified plurality of pixels into one or more regions uses (2432) an RGB image of the scene captured using the image sensor array. For example, evaluating the color distribution of a region can identify some regions that are unlikely to be windows (e.g., the presence of certain colors or the number of distinct colors).

The process 2400 determines (2434) that a first region of the one or more regions corresponds to a specific material based, at least in part, on the intensity values of the pixels in the first region. In some implementations, determining that a first region of the one or more regions corresponds to a specific material includes (2436) determining that the first region is substantially a quadrilateral. This is illustrated by the quadrilaterals 1812 and 1814 in FIG. 18C above, and the quadrilaterals 1832 and 1834 in FIG. 18E. In some implementations, the first region is (2438) substantially a quadrilateral when a total absolute difference in area between the first region and the quadrilateral is less than a threshold percentage of the quadrilateral's area (e.g., less that 10% of the area of the quadrilateral). In some implementations, the specific material is (2440) glass and the first region is determined to correspond to a window in the scene. In some implementations, the region is identified as a probable window candidate, which is subsequently confirmed either by a user or other independent criteria.

Figure 30:
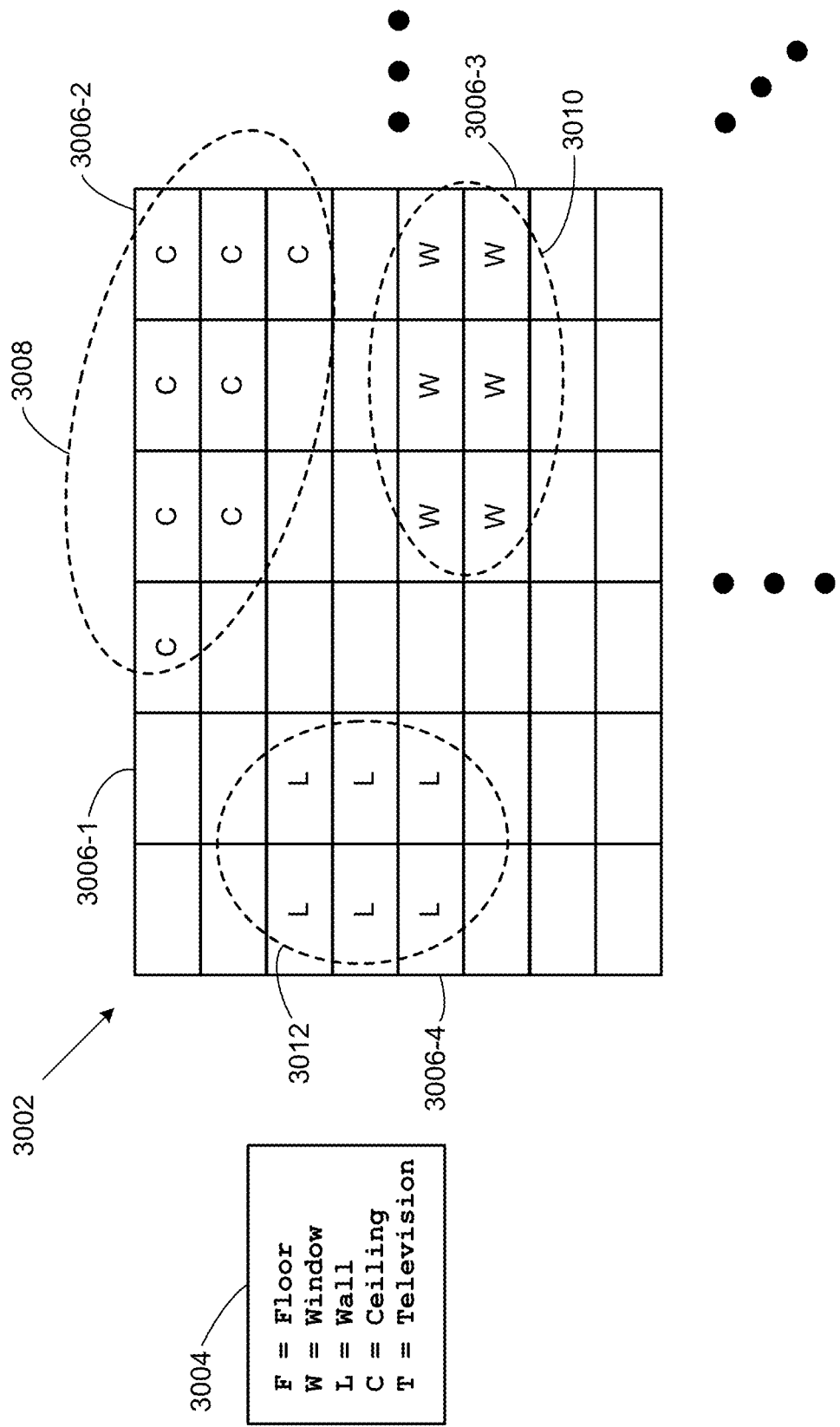

Once a region has been classified, the process 2400 stores (2442) information in the memory that identifies the region. The information can be stored in various ways. In some implementations, the process 2400 stores coordinates for the region, such as coordinates of a centroid, or coordinates of a subset of points along the boundary. In some implementations, the process 2400 creates a two-dimensional scene map corresponding to the pixels, and specifies a value (e.g., a number or a character) to identify the object/material/function for each pixel. For example, in some implementations, a value of 0 indicates no information, a value of 1 indicates a probable window, 2 indicates a probable floor, 3 indicates a probable wall, and 4 indicates a probable ceiling. Usage of a scene map is illustrated in FIG. 30 below. Identification of floors, walls, and ceilings is described above with respect to FIGS. 20A-20K and below with respect to FIGS. 25A-25B. Some implementations use characters instead of numbers, such as a "W" to indicate a probable window, an "F" to indicate a probable floor, and a blank space if there is no information about a possible object at the pixel.

In some implementations, the process 2400 receives (2444) a video stream of the scene from the camera system and reviews (2446) the video stream to detect movement in the scene. Movement in the scene can be used to identify possible intruders in a home or other potential problems. In some implementations, the first region is excluded (2446) from movement detection. For example, if the first region is identified as a window, movement in the window region may be movement on the other side of the window (e.g., outside), and thus not suitable for a motion alert. In another example, the first region is a television set, and thus "motion" in the region is typically based on displayed television images rather than real motion at the scene. In some implementations, the process 2400 generates (2448) a motion alert when there is motion detected at the scene outside of the first region.

Figure 25A:
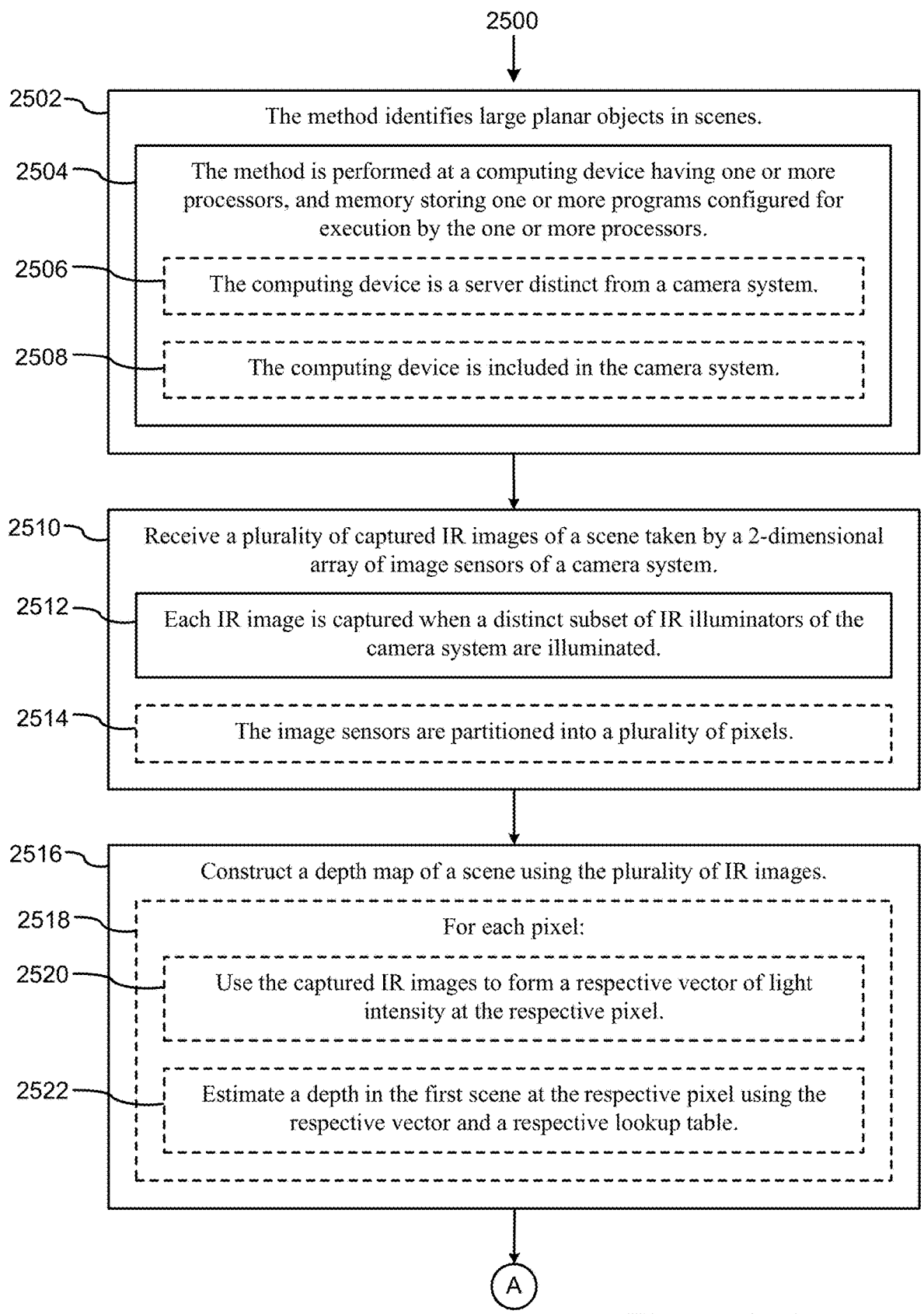
FIGS. 25A-25B provide a flowchart of a process for identifying floors, walls, ceilings, and other large planar surfaces in accordance with some implementations.
Figure 25B:
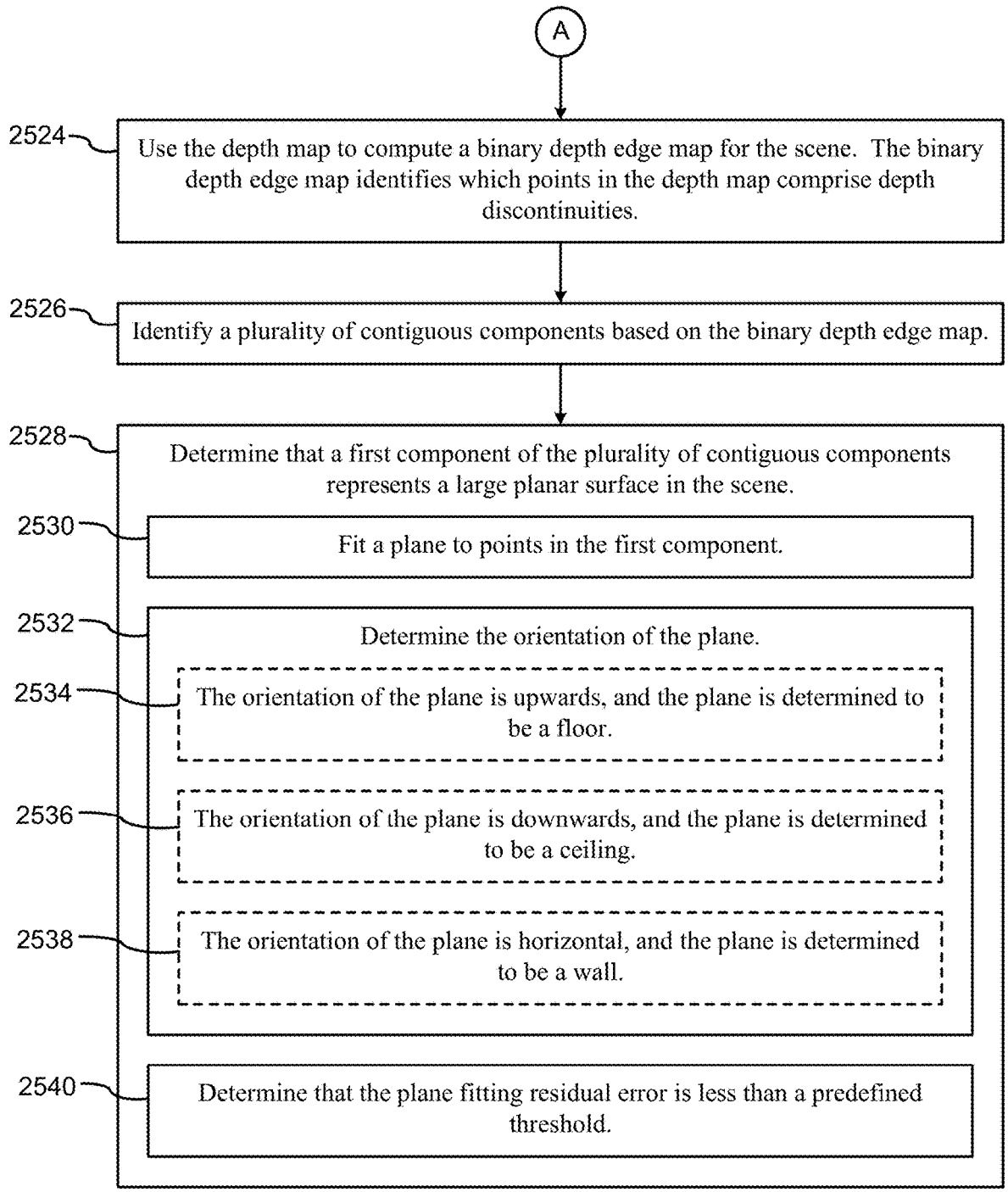

FIGS. 25A-25B provide a flowchart of a process 2500, performed by a computing device, for identifying (2502) large planar objects in scenes. The method is performed (2504) at a computing device (e.g., a scene understanding server 900) having one or more processors and memory. The memory stores (2504) one or more programs configured for execution by the one or more processors. In some implementations, the computing device is (2506) a server distinct from a camera system. In other implementations, the computing device is (2508) included in the camera system.

The process 2500 receives (2510) a plurality of captured IR images of a scene taken by a 2-dimensional array of image sensors of a camera system. Each IR image is captured (2512) when illuminators in a distinct subset of IR illuminators of the camera system 118 are emitting light. In some implementations, the image sensors are partitioned (2514) into a plurality of pixels. As described above with respect to FIG. 22A (e.g., boxes 2214-2220), implementations group the image sensors into pixels in various ways.

The process 2500 constructs (2516) a depth map of a scene using the plurality of IR images. Some implementations use a process as described in FIGS. 23A-23C (process 2300) to construct the depth map. In some implementations, for each pixel the process 2500 performs (2518) a set of operations. In some implementations, the set of operations includes using (2520) the captured IR images to form a respective vector of light intensity at the respective pixel. In some implementations, the set of operations includes estimating (2522) a depth in the first scene at the respective pixel using the respective vector and a respective lookup table. In some implementations, lookup tables are constructed using a process as described in FIGS. 22A-22C (process 2200).

The process 2500 uses (2524) the depth map to compute a binary depth edge map 944 for the scene. The binary depth edge map 944 identifies (2524) which points in the depth map comprise depth discontinuities. This is illustrated in FIGS. 20B-20D above. The process 2500 then identifies (2526) a plurality of contiguous components based on the binary depth edge map. This is illustrated in FIG. 20E above. Depth discontinuities create boundaries between components.

The process then determines (2528) that a first component of the plurality of contiguous components represents a large planar surface in the scene. This determination involves a few steps. A first step is to fit (2530) a plane to the points in the first component. In some implementations, the fitting uses least squares to find the best plane for the data in the component. Some implementations use other techniques to identify a "best" plane for the data, such as minimizing the sum of absolute differences between a hypothetical plan and the points in the component. Implementations typically use a sampling of data points from a component to fit the best plane. For example, some implementations use 50 or 100 sample data points from a component.

In making the determination that the first component represents a large planar surface, the process also confirms that the "best" plane is actually a good plane for the data. In some implementations, the process 2500 determines (2540) that the plane fitting residual error is less than a predefined threshold. In some implementations, the plane fitting residual error is the sum of the absolute differences between the plane and the sample points in the component. In some implementations, the plane fitting residual error is the sum of the squares of the differences between the sample points and the plane, or the square root of the sum of the squares. In some implementations, the plane fitting residual error is the maximum absolute difference between the sample points and the plane. Some implementations use two or more techniques to confirm that the residual error is small (e.g., the maximum absolute error is less than a first threshold and the sum of the absolute errors is less than a second threshold).

Once the plane is fitted and it is determined that the residual error is sufficiently small, the first component is identified as a large planar surface. The process 2500 then analyzes the plane to determine whether the surface is likely to be a floor, a ceiling, or a wall. To make this determination, some implementations determine (2532) the orientation of the plane. This is illustrated above with respect to FIG. 20G. When the orientation of the plane is upwards, the process 2500 determines (2534) that the plane is probably a floor. When the orientation of the plane is downwards, the process 2500 determines (2536) that the plane is probably a ceiling. When the orientation of the plane is horizontal, the process 2500 determines (2538) that the plane is probably a wall.

Some implementations use other criteria as well in making the determination that a component represents a large planar surface. For example, some implementations require the component to have a minimum threshold area to be classified as a probable floor, wall, or ceiling.

Figure 26A:
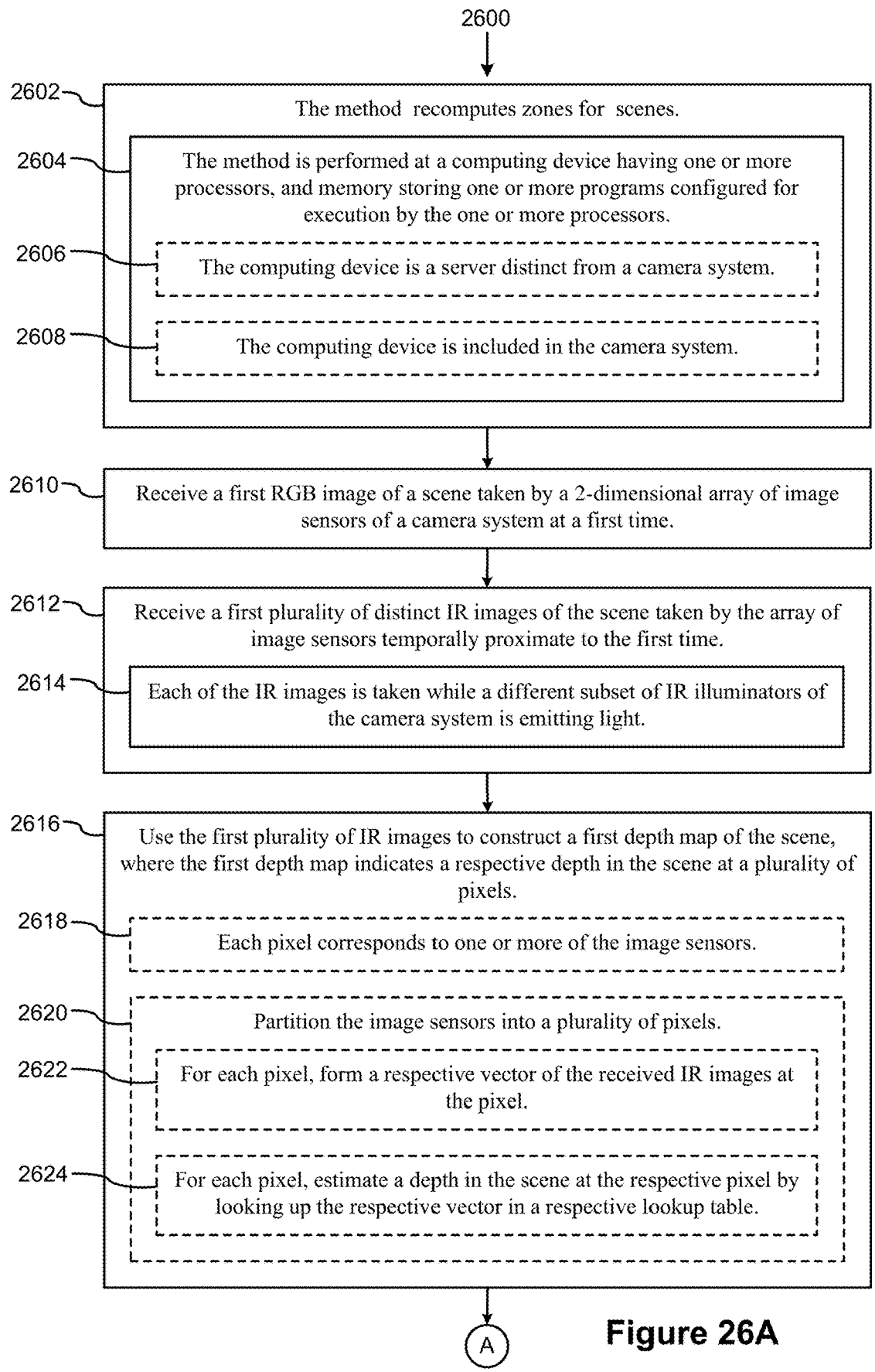
FIGS. 26A-26C provide a flowchart of a process for correcting user identified zones when a camera is moved according to some implementations.
Figure 26B:
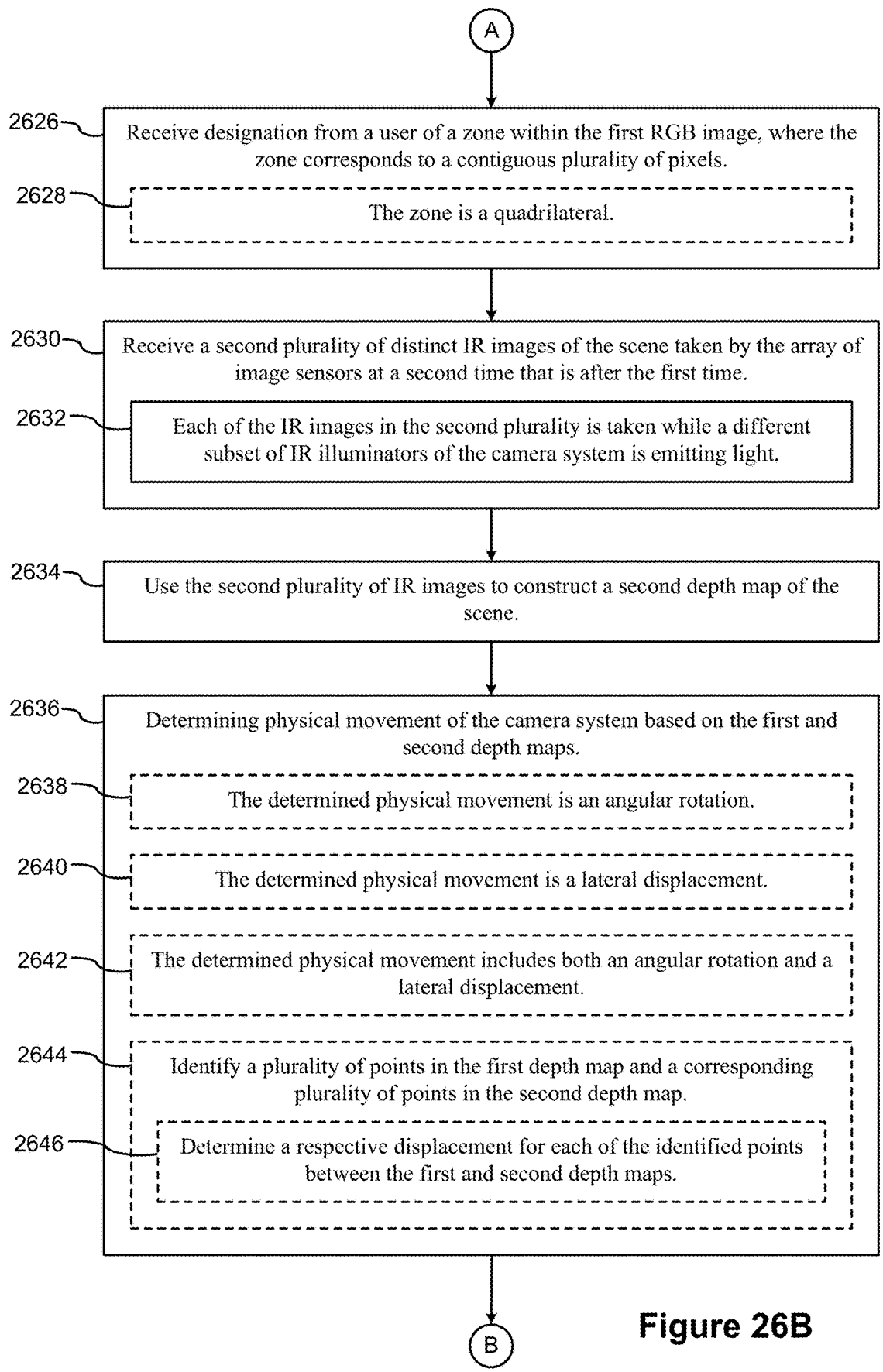
Figure 26C:
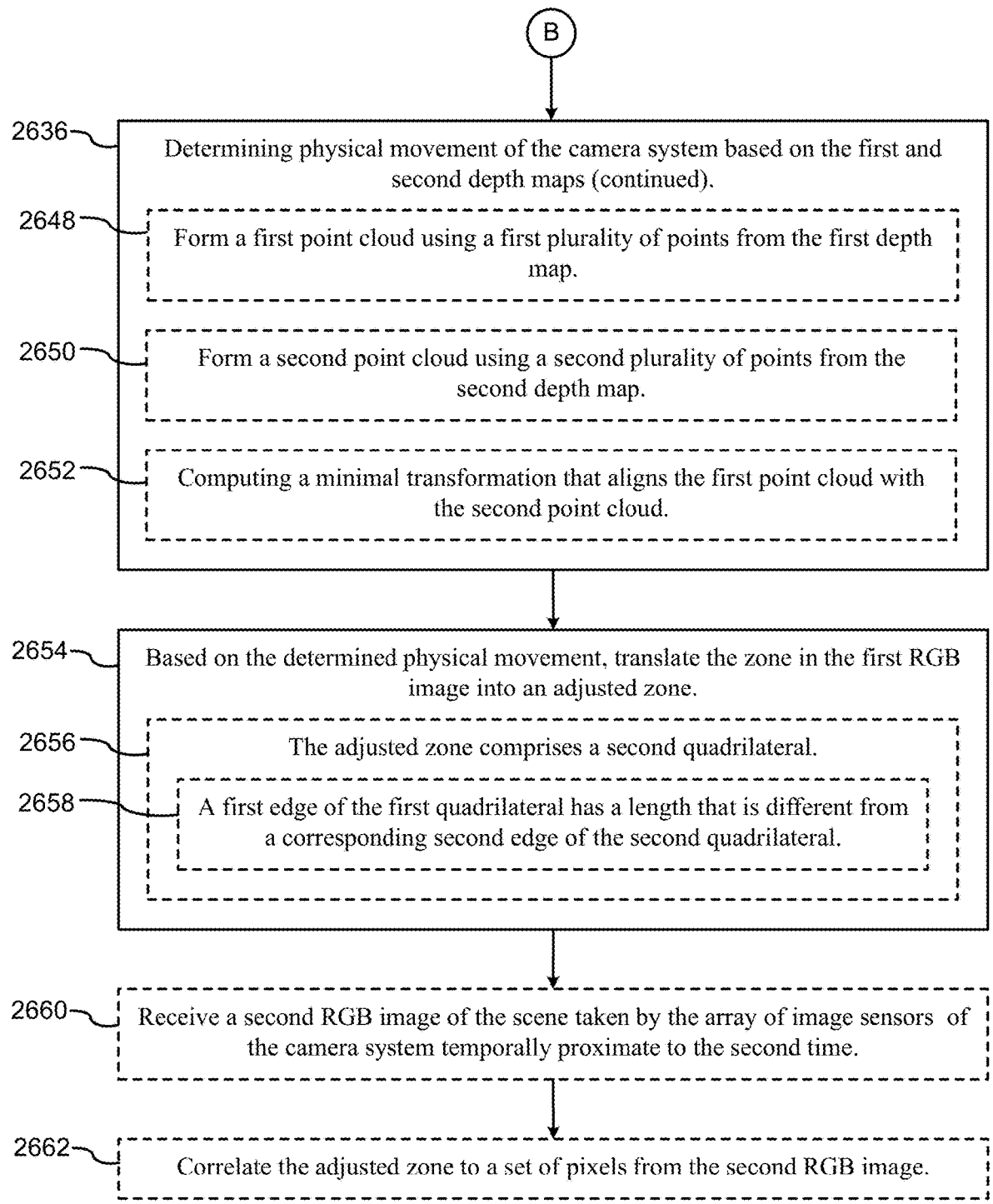
Figure 27A:
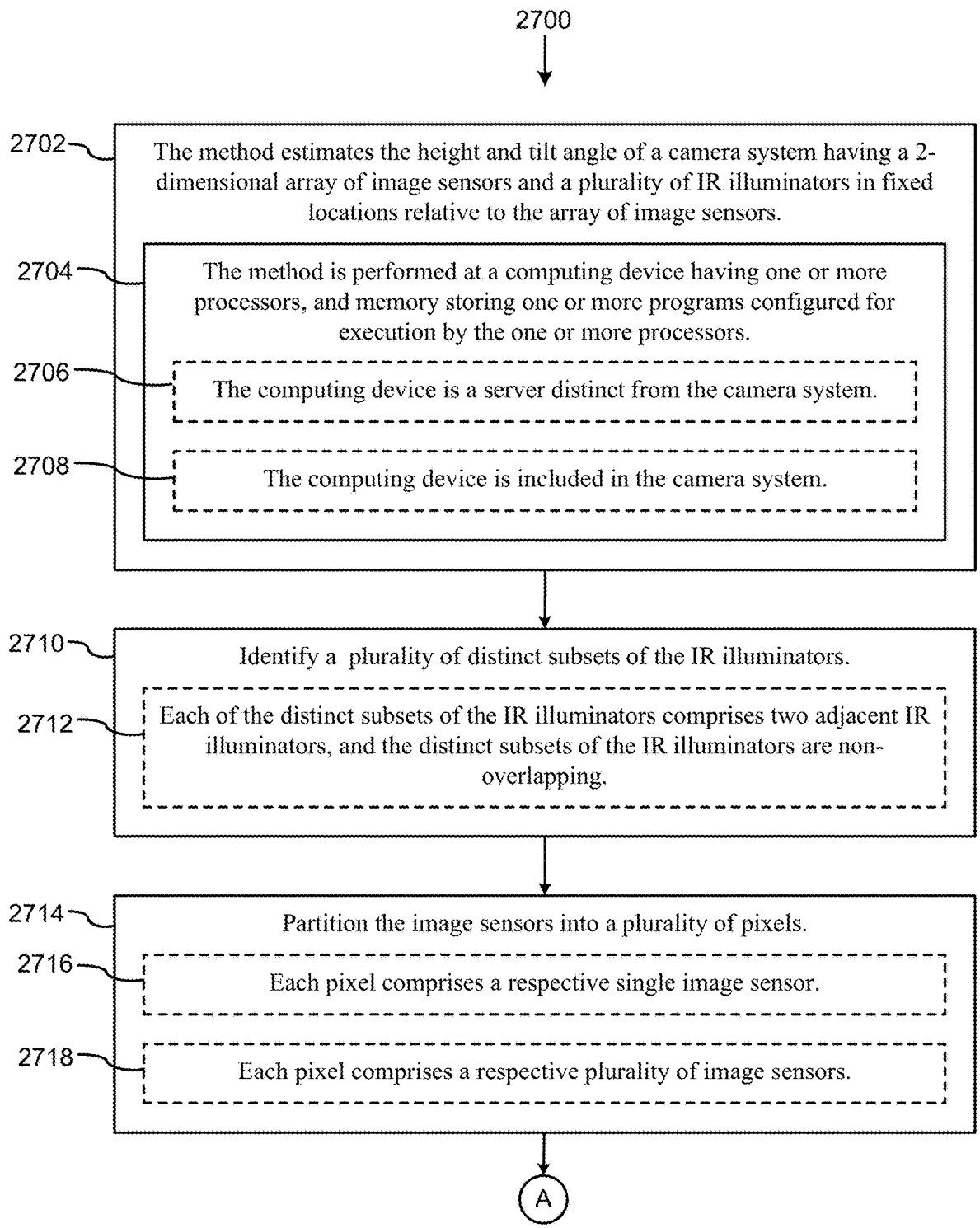
FIGS. 27A-27D provide a flowchart of a process for estimating camera pose in accordance with some implementations.
Figure 27B:
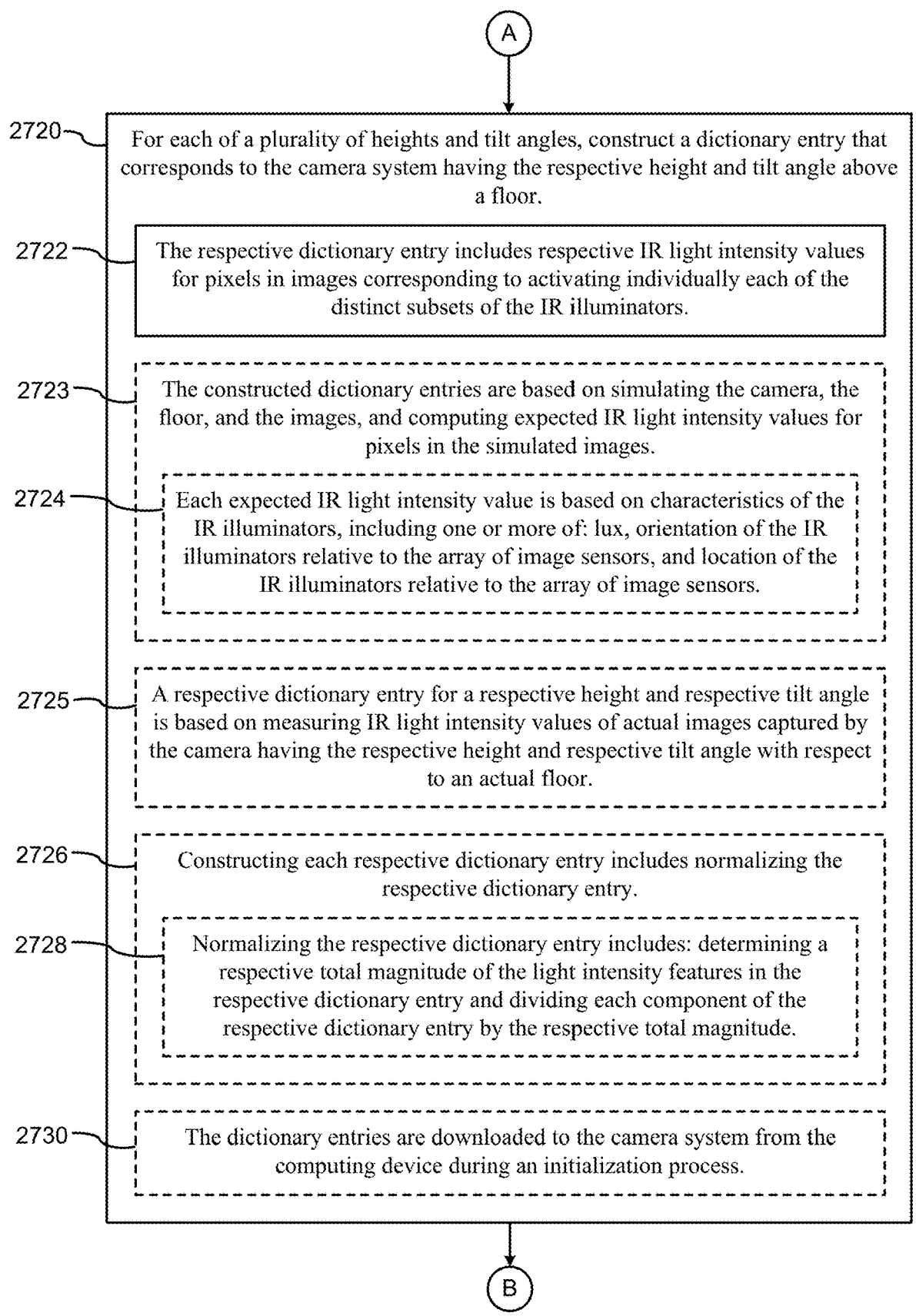
Figure 27C:
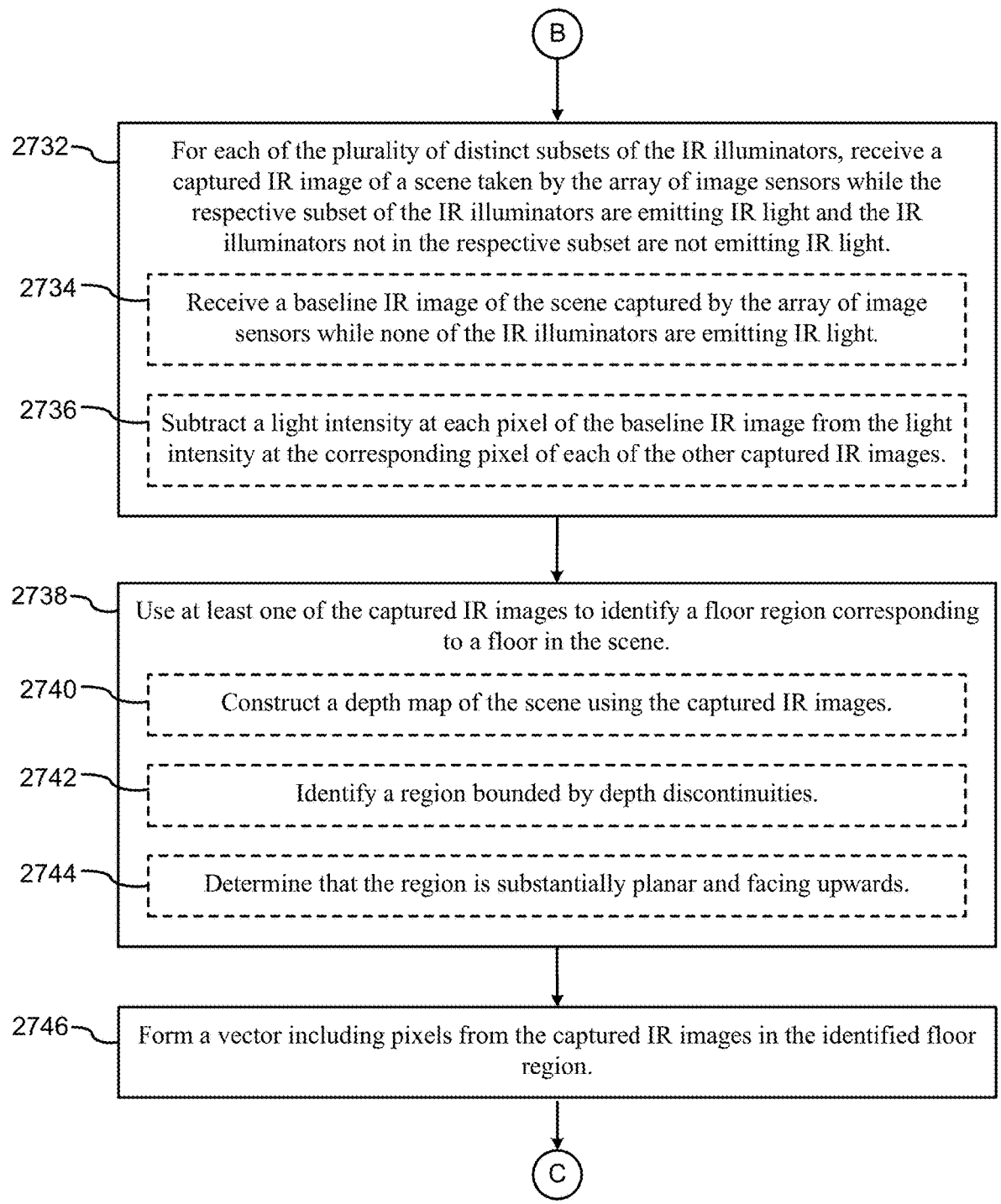
Figure 27D:
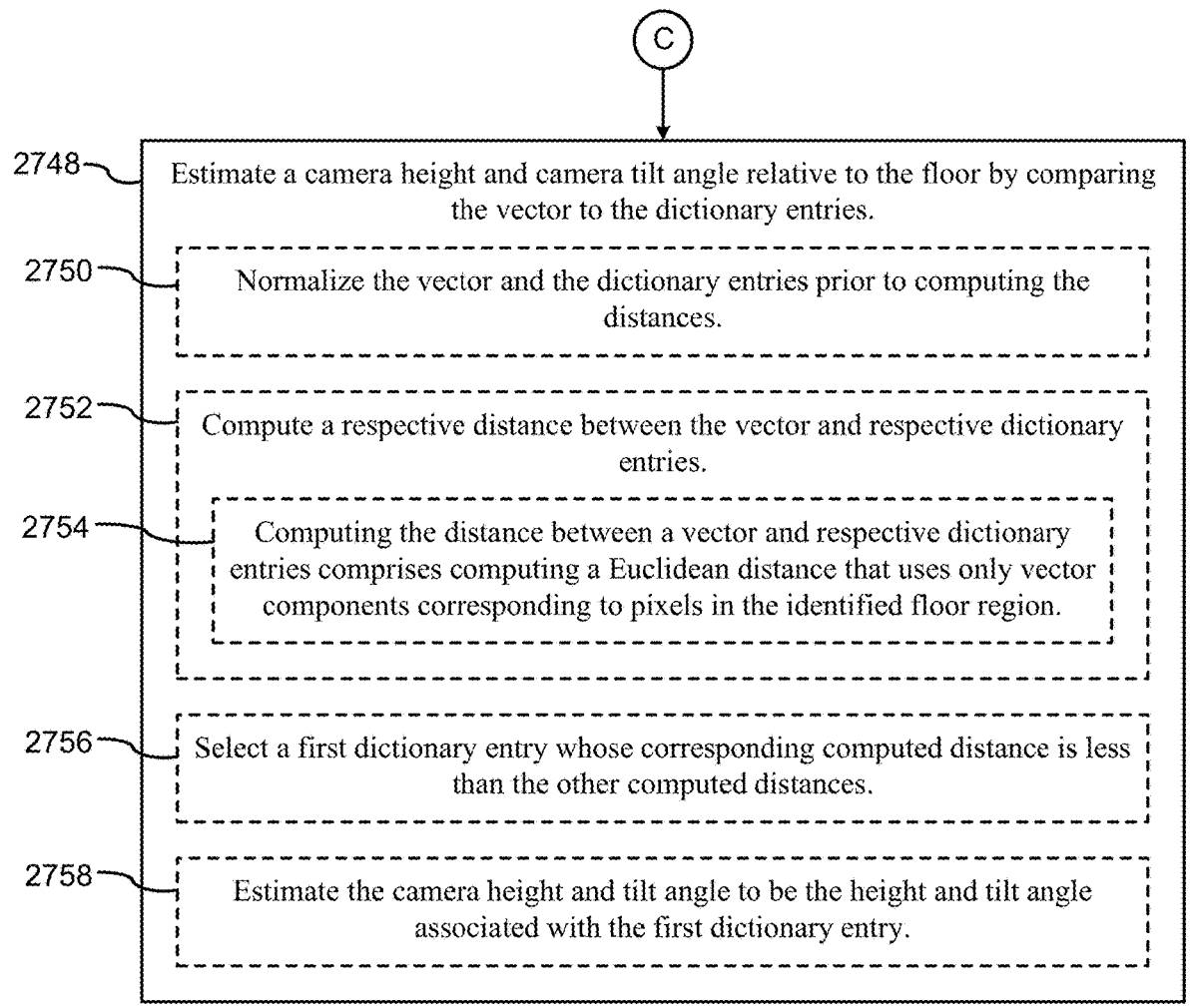

FIGS. 26A-26C provide a flowchart of a process 2600, performed by a computing device, for recomputing (2602) zones in scenes based on physical movement of a camera. The method is performed (2604) at a computing device (e.g., a scene understanding server 900) having one or more processors and memory. The memory stores (2604) one or more programs configured for execution by the one or more processors. In some implementations, the computing device is (2606) a server distinct from a camera system. In other implementations, the computing device is (2608) included in the camera system.

The process 2600 receives (2610) a first RGB image of a scene taken by a 2-dimensional array of image sensors of a camera system at a first time. The RGB image identifies what is in the field of vision of the camera. The process also receives (2612) a first plurality of distinct IR images of the scene taken by the array of image sensors temporally proximate to the first time. In general, the temporal proximity ensures that the field of vision of the camera while capturing the IR images is substantially the same as the field of vision of the camera while capturing the RGB image. Commonly, the RGB image is captured during daylight hours, whereas the IR images are captured at night. In some implementations, temporal proximity means within 24 hours or 12 hours. Each of the IR images is taken (2614) while a different subset of IR illuminators of the camera system is emitting light.

The process 2600 uses (2616) the first plurality of IR images to construct a first depth map of the scene, where the first depth map indicates a respective depth in the scene at a plurality of pixels. Some implementations use a process like the depth mapping process 2300 described with respect to FIGS. 23A-23C to construct the first depth map. The pixels of the depth map correspond to the image sensors of the array. In some implementations, each pixel corresponds (2618) to one or more image sensors. In some implementations, each pixel corresponds to a single image sensor. In some implementations, the process 2600 partitions (2620) the image sensors into a plurality of pixels. In some implementations, the process 2600 forms (2622) a respective vector of the received IR images for each pixel. For each pixel, the process 2600 estimates (2624) a depth in the scene at the respective pixel by looking up the respective vector in a respective lookup table. Some implementations use lookup tables constructed as described above with respect to the process 2200 in FIGS. 22A-22C.

A user designates (2626) a zone within the RGB image. In some implementations, the designated zone is a region of interest, such as a region with special monitoring. In some implementations, the special monitoring consists of excluding the region from monitoring movement. In some implementations, an alert is triggered when there is movement in a designated zone. In some implementations, the zone corresponds (2626) to a contiguous plurality of pixels. In some implementations, the zone is (2628) a quadrilateral. In some implementations, the zone is a polygon. In alternative implementations, the user designates a zone within an IR image instead of within an RGB image.

The process 2600 receives (2630) a second plurality of distinct IR images of the scene taken by the array of image sensors at a second time that is after the first time. In some implementations, each of the IR images in the second plurality is captured (2632) while a different subset of IR illuminators of the camera system is emitting light. Typically, the subsets of IR illuminators used to capture the second plurality of IR images are the same as the subsets of IR illuminators used to capture the first plurality of illuminators.

The process 2600 then uses (2634) the second plurality of IR images to construct a second depth map of the scene. The process 2600 typically uses the same steps for building the second depth map as used for building the first depth map, which was described above with respect to boxes 2618-2624 in FIG. 26A.

The process 2600 then determines (2636) physical movement of the camera system based on the first and second depth maps. In many cases, if there has been no movement of the camera, the second depth map is substantially the same as the first depth map. However, in some cases, objects in the scene itself change, such as placing a new item of furniture in the monitored area, placing new artwork on a wall, or even accumulated clutter on a floor.

In some instances, the determined physical movement is (2638) an angular rotation. In some implementations, the determined physical movement is (2640) a lateral displacement. For example, the camera may be bumped a little to the left or the right on a shelf. Note that lateral displacement can be a horizontal movement, a vertical movement, and/or a movement forward or backward. In some implementations, a "lateral displacement" is defined as any movement of the camera 118 in which the camera continues to point in the same direction (e.g., due east). In many cases, if the camera 118 is bumped or nudged, the physical movement includes (2642) both an angular rotation and a lateral displacement.

In some implementations, the process 2600 identifies (2644) a plurality of points in the first depth map and a corresponding plurality of points in the second depth map. The process 2600 then determines (2646) a respective displacement for each of the identified points between the first and second depth maps. By combining the displacements for a plurality of distinct points, the process 2600 determines the overall movement of the camera 118.

In some implementations, determining the movement of the camera uses point clouds. The process 2600 forms (2648) a first point cloud using a first plurality of points from the first depth map, and forms (2650) a second point cloud using a second plurality of points from the second depth map. The process then computes (2652) a minimal transformation that aligns the first point cloud with the second point cloud. One of skill in the art recognizes that correlating two point clouds can be performed in various ways. Based on the point cloud transformation, the process 2600 identifies the motion of the camera 118 that would produce the point cloud transformation.

Based on the determined physical movement of the camera system 118, the process 2600 translates (2654) the zone in the first RGB image into an adjusted zone. When the zone originally designated by the user is a quadrilateral, the adjusted zone is (2656) also a quadrilateral. However, because of the transformation, in some instances, a first edge of the quadrilateral has (2658) a length that is different from a corresponding second edge of the second quadrilateral.

In some implementations, the process 2600 receives (2660) a second RGB image of the scene taken by the array of image sensors of the camera system temporally proximate to the second time. In some implementations, the process 2600 correlates (2662) the adjusted zone to a set of pixels from the second RGB image. This can be helpful to a user who wants to view the zones.

FIGS. 27A-27D provide a flowchart of a process 2700, performed by a computing device, for estimating (2702) the height and tilt angle of a camera system having a 2-dimensional array of image sensors and a plurality of IR illuminators in fixed locations relative to the array of image sensors. The height and tilt angle are measured with respect to a floor near the location of the camera system. The method is performed (2704) at a computing device (e.g., a scene understanding server 900) having one or more processors and memory. The memory stores (2704) one or more programs configured for execution by the one or more processors. In some implementations, the computing device is (2706) a server distinct from the camera system. In other implementations, the computing device is (2708) included in the camera system.

The process 2700 identifies (2710) a plurality of distinct subsets of the IR illuminators. Subsequently, each of the distinct subsets of illuminators are activated one subset at a time, and the images captured with different illumination enables determination of the camera height and tilt angle. In some implementations, each of the distinct subsets of the IR illuminators comprises (2712) two adjacent IR illuminators, and the distinct subsets of the IR illuminators are non-overlapping. In some implementations, each individual illuminator is one of the distinct subsets. For example, if a camera system has eight illuminators, some implementations have eight distinct subsets, consisting of each individual illuminator. In some implementations there is overlap between the distinct subsets. For example, in a camera system with eight illuminators, some implementations have eight distinct subsets corresponding to each possible pair of adjacent illuminators. One of skill in the art recognizes that many other selections of subsets of IR illuminators are possible.

The process 2700 also partitions (2714) the image sensors in the array into a plurality of pixels. In some implementations, each pixel comprises (2716) a single image sensor. In other implementations, each pixel comprises (2718) a plurality of image sensors. Typically, the image sensor array 852 has a large number of image sensors (e.g., a million or more). Implementations commonly downsample the images, combining multiple sensors into a single virtual pixel. In some implementations, each pixel includes about 100 image sensors (e.g., a 10×10 contiguous square). In some implementations, each pixel corresponds to the same number of image sensors.

Before computing an actual camera position, implementations build a dictionary (also referred to as a training set). An example dictionary 2150 is provided in FIG. 21C above. Typically, the dictionary is constructed once, and used many times. The dictionary is constructed based on characteristics of a specific camera, but there are generally many cameras that can use the same dictionary (e.g., a million instances of a single camera model can all use the same dictionary as long as the cameras are substantially identical). The dictionary consists of a plurality of entries, each corresponding to a (height, tilt angle) pair. The height and tilt angle represent the relationship of the camera (i.e., the image sensor array 852 of the camera) relative to a floor near where the camera is located. In some implementations, all of the (height, tilt angle) pairs are unique, but in other implementations, two or more dictionary entries have the same height and tilt angle. In some implementations, the dictionary entries are constructed based on simulation (e.g., simulating a specific height and tilt angle above a floor, and simulating illumination from the identified subsets of illuminators). In other implementations, the dictionary entries are constructed based on experimental data (e.g., placing the camera at various heights and tilts and capturing images based on activating the various identified subsets of illuminators).

For each of a plurality of heights and tilt angles, the process 2700 constructs (2720) a dictionary entry that corresponds to the camera system 118 having the respective height and tilt angle above a floor. The respective dictionary entry includes (2722) respective IR light intensity values for pixels in images corresponding to activating individually each of the distinct subsets of the IR illuminators. For example, in some implementations with 15,000 pixels and four subsets of illuminators, each dictionary entry has a light intensity value for each of the 60,000 pixel/subset combinations plus the height and tilt angle (e.g., a vector with 60,002 entries). In some implementations, the dictionary entries only include pixels that correspond to the simulated floor. For example, if there are 15,000 pixels for the entire sensor array, the simulated floor may occupy 3000 pixels, thus creating dictionary entries with 12,002 components (12,000 components corresponding to the pixel/subset combinations, and two components for the height and tilt angle). Some implementations have about 100 dictionary entries (e.g., with height values of 0.0 meters, 0.3 m, 0.6 m, . . . , and tilt angles of −40°, −30°, −20°, . . . ). Some implementations include more entries to provide greater accuracy (e.g., height values every 0.1 meter and angles every 5 degrees).

In some implementations, the constructed dictionary entries are (2723) based on simulating the camera, the floor, and the images, and computing expected IR light intensity values for pixels in the simulated images. In some implementations, each expected IR light intensity value is (2724) based on characteristics of the IR illuminators. As noted previously, the characteristics may include (2724) one or more of: lux, orientation of the IR illuminators relative to the array of image sensors, and location of the IR illuminators relative to the array of image sensors. In some implementations, a respective dictionary entry for a respective height and respective tilt angle is (2725) based on measuring IR light intensity values of actual images captured by the camera having the respective height and respective tilt angle with respect to an actual floor.

In some implementations, the process 2700 normalizes (2726) each of the dictionary entries. In some implementations, this accounts for different surface reflectivity. In some implementations, the process 2700 normalizes (2728) each dictionary entry by determining (2728) a respective total magnitude of the light intensity features in the respective dictionary entry and dividing (2728) each component of the respective dictionary entry by the respective total magnitude. For example, with a dictionary entry having 12,002 elements, compute the total magnitude of the first 12,000 entries (corresponding to light intensity at pixels) and divide each of those 12,000 entries by the total magnitude. If the light intensity features are labeled $x_1, x_2, \ldots, x_{12000}$, then in some implementations the total magnitude is $\sqrt{\sum_{i=1}^{12000}(x_i)^2}$.

In some implementations, the dictionary entries are constructed at a computing device that is distinct from the camera system, then downloaded (2730) to the camera system from the computing device during an initialization process. In some implementations, the subsequent determination of height and tilt angle is calculated at the camera system 118, even when the building of the dictionary is performed at a separate computing device (e.g., a scene understanding server 900).

For each of the plurality of distinct subsets of the IR illuminators, the process 2700 receives (2732) a captured IR image of a scene taken by the array of image sensors while the respective subset of the IR illuminators are emitting IR light and the IR illuminators not in the respective subset are not emitting IR light. In some implementations, the process 2700 receives (2734) a baseline IR image of the scene captured by the array of image sensors while none of the IR illuminators are emitting IR light, and subtracts (2736) a light intensity at each pixel of the baseline IR image from the light intensity at the corresponding pixel of each of the other captured IR images. This can provide a better estimate of the light intensity due to the IR illuminators.

The process uses (2738) at least one of the captured IR images to identify a floor region corresponding to a floor in the scene. Some implementations use the techniques illustrated above in FIGS. 20A-20K and 25A-25B to identify a floor region. For example, in some implementations the process 2700 constructs (2740) a depth map of the scene using the captured IR images. In some implementations, the process 2700 then identifies (2742) a region bounded by depth discontinuities. This is illustrated above in FIGS. 20B-20F. In some implementations, the process 2700 also determines (2744) that the region is substantially planar and facing upwards.

The process 2700 then forms (2746) a feature vector including pixels from the captured IR images in the identified floor region. This is illustrated in FIG. 21E. Typically, the components of the feature vector are arranged in the same order as the components of the dictionary entries.

The process then estimates (2748) a camera height and camera tilt angle relative to the floor by comparing (2748) the feature vector to the dictionary entries. In some implementations, the process 2700 normalizes (2750) the feature vector and the dictionary entries prior to computing the distances.

In some implementations, the process 2700 computes (2752) a respective distance between the feature vector and respective dictionary entries, and selects (2756) a first dictionary entry whose corresponding computed distance is less than the other computed distances. In some implementations, computing the distance between a feature vector and respective dictionary entries comprises (2754) computing a Euclidean distance that uses only vector components corresponding to pixels in the identified floor region. This is illustrated in FIG. 21E. For example, the actual floor may have some objects on it, such as furniture or toys. The floor identification process typically excludes these objects because they are not part of the planar surface. Because the process 2700 determines the height and angle relative to the floor, only pixels that correspond to the floor region are relevant. The process 2700 estimates (2758) the camera height and tilt angle to be the height and tilt angle associated with the first dictionary entry.

Some implementations expand or modify this basic process in various ways. In some implementations, the process 2700 identifies a ceiling rather than a floor, and measures the "height" and tilt angle relative to the ceiling. As noted above in FIGS. 20A-20K and 25A-25B, the processes described with respect to a floor can be used for a ceiling as well. In this case, the dictionary entries are constructed relative to the ceiling. In some implementations, the position of the camera is computed both with respect to a floor and with respect to a ceiling. A side effect of this dual calculation is to estimate the height of the room where the camera is located.

As noted above, the data for the dictionary entries can be constructed by simulation or by experiments with an actual camera. When formed by experimentation, some implementations capture a baseline image for each camera position, and subtract the baseline from the other captured images with each of the subsets of illuminators activated. Alternatively, the experiments are performed in a room with no ambient light so that each captured image represents only light coming originally from the activated illuminators. The size of the dictionary can be selected based on the desired accuracy.

In some instances, multiple "floor" regions are identified. In some of these instances, the multiple regions are different portions of the same floor. In other instances, one or more of the regions may be tables and one or more regions may be an actual floor. Some implementations estimate the height and tilt angle based on each of the identified regions, then compare the multiple results. If they are all approximately the same, some implementations estimate the height and tilt based on all of them (e.g., by averaging the values, taking the values associated with the largest region, or choosing the first one). When the heights are substantially different, some implementations take the larger estimate, guessing that the smaller height estimate is based on a table or other planar object above the floor. Note that the process is only an estimate. If the camera is sitting on a table and the floor is not in the field of vision of the camera, the estimated height will be the height above the table.

Some implementations use interpolation to provide a finer estimate. For example, in some instances the feature vector has equally small distances from two dictionary entries. In some implementations, the estimated height and tilt angle are based on averaging these two closest entries. In some implementations, finding the matching dictionary entry uses a nearest neighbor algorithm. In some implementations, only the single nearest neighbor is used. In some implementations, the k nearest neighbors are used for a fixed small positive integer k, and a weighted average of these neighbors is used to compute the height and tilt angle of the camera. For example, in some implementations, the k nearest entries are selected, and each is weighted based on the inverse of its distance from the feature vector.

Figure 28:
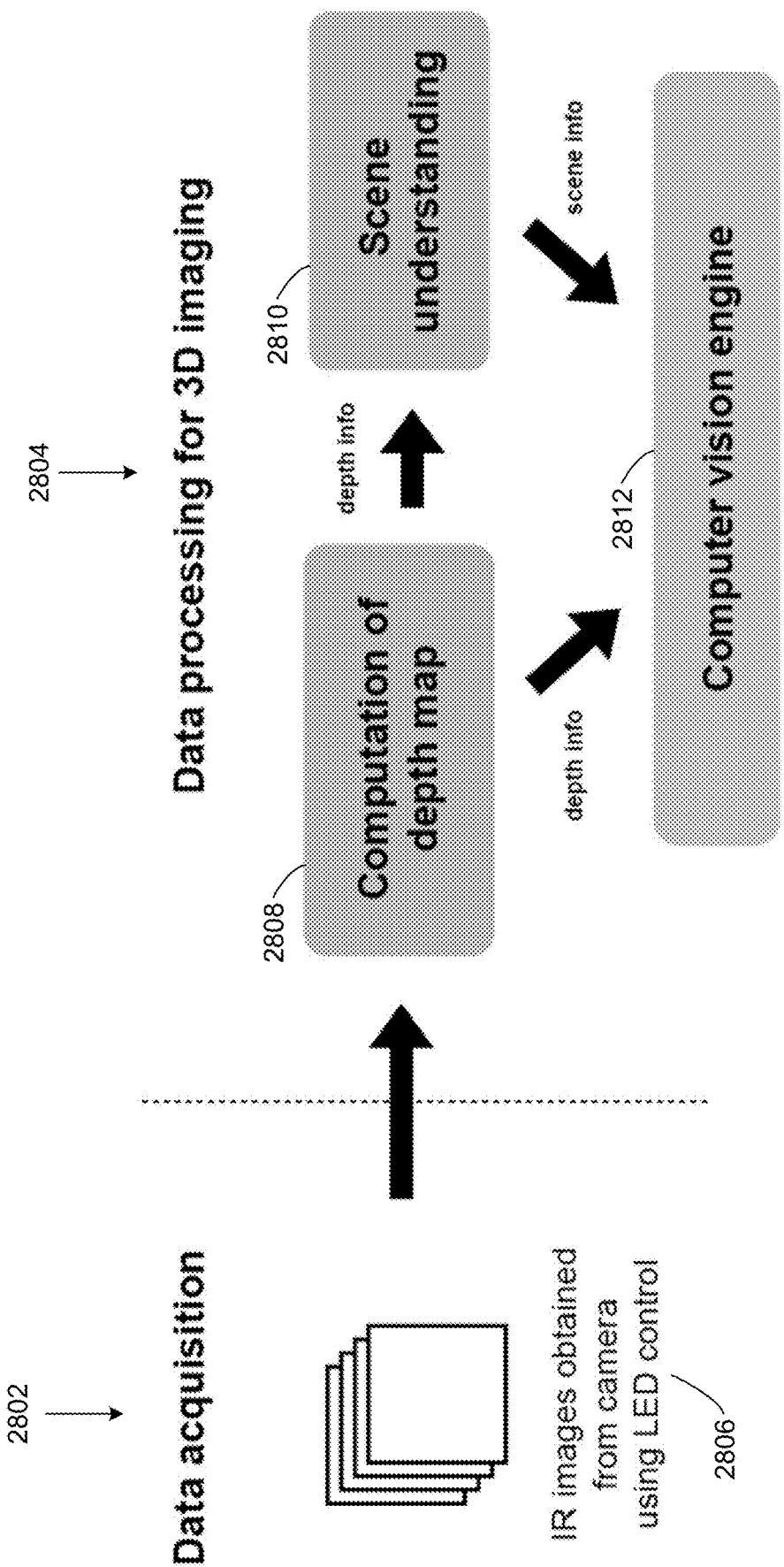
FIGS. 28-30 provide an overview of some of the processes described, and provide an overview of how the processes work together according to some implementations.

FIG. 28 provides an overview of some of the processes described herein, which utilize control of individual illuminators (e.g., LEDs) from a video monitoring camera to collect and calculate useful information. Not shown in the overview is preliminary processing that is typically performed at a server, such as building lookup tables (e.g., as illustrated in FIGS. 13, 14, 15A, 15B, and 22A-22C) or constructing a dictionary (e.g., as illustrated in FIGS. 21A-21C and 27A-27D).

In the data acquisition phase 2802, the camera 118 captures (2806) IR images while controlling which IR illuminators are on. In some implementations, the images are captured at night, and may occur multiple times each night (e.g., every hour). In some implementations, the camera 118 receives a command from the video server system 508 or scene understanding server 900 to collect the images. Before taking the images, the camera typically locks auto exposure so that all of the captured images are taken with the same parameter settings. FIG. 14 illustrates an example where the illuminators are grouped into adjacent pairs. In general, an additional IR image is taken with none of the illuminators active in order to determine the ambient light.

For cameras with substantial processing power and memory, subsequent processing may be performed at the camera. However, the data is commonly transmitted to a separate server for the data processing phase 2804, which commonly occurs at a video server system 508 or a scene understanding server 900. In some implementations, the data is transmitted from the camera to an external computing device in a native format (e.g., five IR images). In some implementations, some processing occurs on the camera before it is transmitted. For example, in some implementations, the images are downsampled at the camera, which reduces the amount of data transmitted. In some implementations, the captured background image is subtracted from the other images, so the data transmitted corresponds to light from the IR illuminators, and the background light is already canceled out. In some implementations, the data is transmitted as a single long array of data, such as the feature vector 2178 in FIG. 21E. In some implementations, the components of the transmitted data are arranged differently, such as grouping together the data for each pixel (e.g., placing $a_{11}$, $a_{21}$, $a_{31}$, and $a_{41}$ from the feature vector 2178 together).

In some implementations, the scene understanding server 900 includes a depth mapping module 878, which computes (2808) a 3-D depth map of the scene in the field of vision of the camera. Constructing a depth map is described above with respect to FIGS. 16A-16D, 17A, 17B, and 23A-23C. The depth map information is passed on to various scene understanding processes 2810, such as object classifiers 922, a camera pose estimator 932, or a zone correction module 928. These processes compute or determine various information about the scene. Both the depth information and the scene information are passed on to the computer vision engine 2812. In some implementations, the computer vision engine 2812 uses the information to provide better alerts. For example, the computer vision engine 2812 can reduce the number of false security alerts by excluding certain regions or by performing automatic zone correction when a camera is moved slightly. In some implementations, this data facilitates motion tracking and detection of humans. The data processing phase is described in more detail with respect to FIG. 29.

Figure 29:
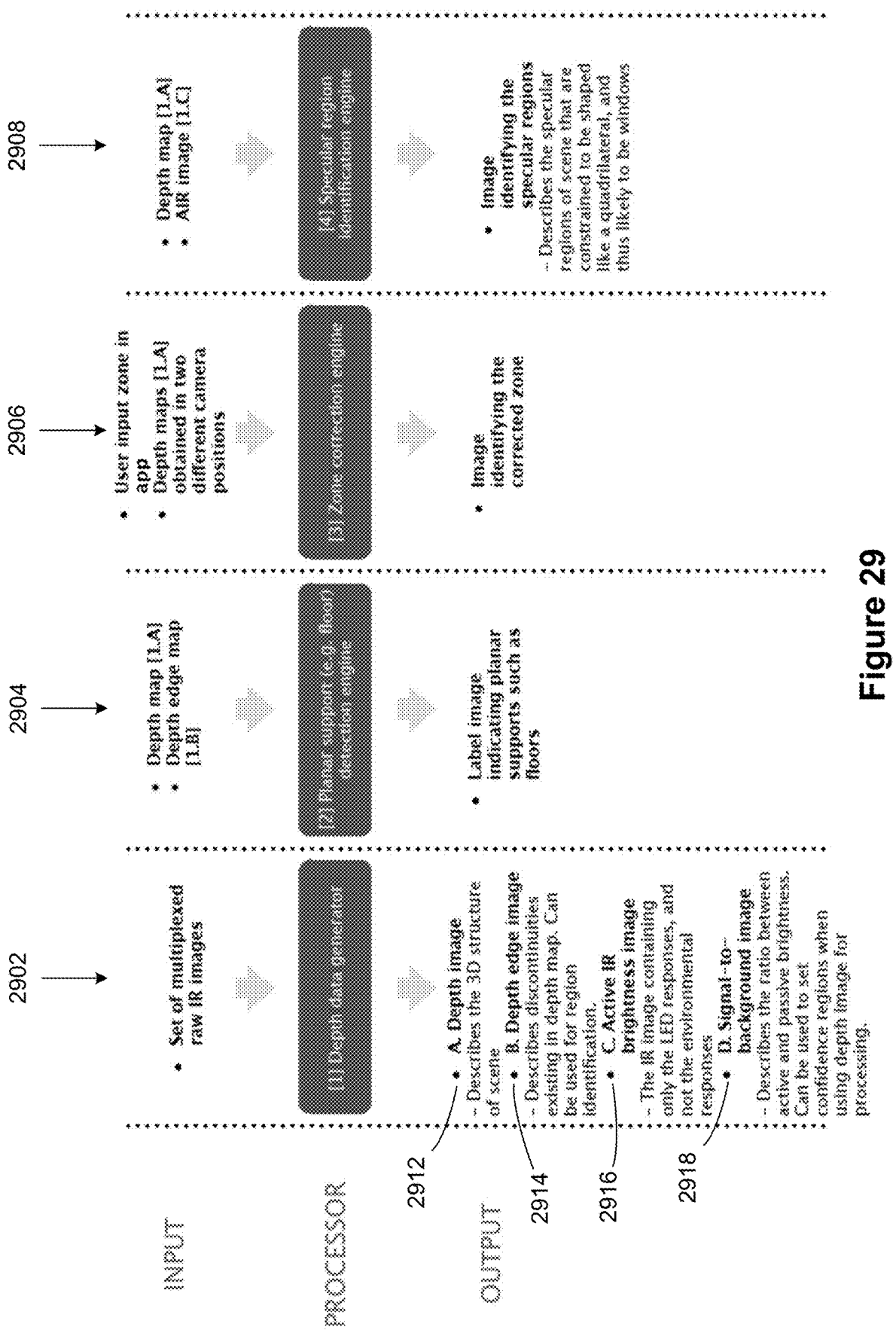

FIG. 29 illustrates the interrelationships between some of the scene understanding processes, including the inputs and outputs for each of the processes. The first process 2902 builds a depth map for the scene in the field of vision of the camera. The depth mapping module 878 is also referred to as a "depth data generator," as shown in the depth mapping process 2902. The inputs to the depth mapping process are the IR images, as discussed above. The depth mapping module 878 creates several outputs, including the depth map 2912, which is also referred to as a depth image. This provides a 3D structure of the scene, as described above with respect to FIGS. 16A-16D, 17A, 17B, and 23A-23C. In some implementations, the depth mapping module 878 also creates a depth edge map 2914, which is also referred to as a depth edge image. This is illustrated above with respect to FIGS. 20B, 20C, and 20D. In some implementations, the depth mapping module 878 computes an active IR brightness image 2916, which represents only reflections of light from the active IR illuminators, and not the environmental ambient light. In some implementations, this is performed by subtracting the baseline intensity values (when no illuminators are on) from each of the other images. In some implementations, the depth mapping module 878 computes a signal-to-background image 2918, which identifies the ratio of the active brightness (from illuminator light) to the passive brightness (from the environment). When there is too much background light, it can reduce the confidence in the calculated results.

The second process 2904 identifies large planar regions, such as floors, walls, and ceilings. This process is described above with respect to FIGS. 20A-20K and 25A-25B. The floor/wall/ceiling module 926 is also referred to as the planar support detection engine. The floor/wall/ceiling module 926 uses as inputs the depth map 2912 and the depth edge map 2914, and identifies regions that likely correspond to floors, walls, or ceilings. In some implementations, the floor/wall/ceiling module 926 labels the pixels of a scene image (either an RGB image or an IR image) as probable floors, walls, or ceilings. This is illustrated below in FIG. 30.

The third process 2906 performs zone correction, as described above with respect to FIGS. 19A-19I and 26A-26C. The zone correction module 928 uses depth maps constructed at two different times, as well as a user-defined zone. When the zone has changed slightly, the zone correction module 928 recommends an updated zone, which is typically presented to the user for verification. In some implementations, if the camera has moved significantly (e.g., to another room), the zone correction module recommends removing the zone.

The fourth process 2908 identifies specular regions in a scene, which generally correspond to windows, televisions, or sliding glass doors. This process is described above with respect to FIGS. 18A-18E and 24A-24C. The window detection module 924 is sometimes referred to as a specular region identification engine. The window detection module 924 uses the depth map 2912 and the active IR brightness image 2916 to identify regions that are probable windows, and typically uses other information to make such a confirmation. For example, in some implementations, the window detection module 924 uses the size of the region (e.g., is it too big or too small to be a likely window). In some implementations, the window detection module 924 uses the shape of the region based on the empirical fact that most windows are rectangular. Based on some distorting effects, an object that is rectangular generally appears as a quadrilateral in an image, and thus some implementations do quadrilateral fitting for windows.

The information provided by the scene understanding server can be used in various ways to reduce false motion alerts. For example, an identified specular region (identified as a possible window), may be a television set. In some implementations, a rectangular specular region that includes lots of motion is identified as a probable television. When a television is identified, "movement" within the television region that would otherwise create a false motion alert can be avoided. In some implementations, false motion alerts from ceilings can be avoided as well. Typically, "motion" on a ceiling is caused by lights, such as headlights from cars, and should not trigger a motion alert.

Some implementations are able to identify other characteristics of the camera location as well. For example, some implementations determine whether the camera is inside or outside (e.g., based on the presence of a ceiling). When a camera is inside, some implementations determine whether the room is a small room or a large room. These characteristics can help determine when to create motion alerts. For example, when a camera is outside, there are many regions where motion would be expected (e.g., plants or trees flowing with the wind). Therefore, motion detection may be limited to very specific areas and/or set at a high threshold for what triggers a motion event. In some implementations, the information about the camera environment (e.g., floors and windows) is used to make recommendations on where to place the camera and/or to recommend zones for more detailed monitoring. For example, in FIGS. 18D and 18E, the camera appears to be sitting on or close to a floor. In some implementations, the system recommends placing the camera at a higher location.

FIG. 30 illustrates conceptually how the information is provided by the scene understanding server 900 in some implementations. The image pixels are arranged in a two dimensional grid 3002. The grid 3002 includes many individual grid cells 3006, such as the grid cell 3006-1. Within each grid cell 3006, codes are used to provide information about what is estimated to be in that cell. The legend 3004 gives some example cell codes that use single characters. Some implementations use numeric codes, or use bit positions within an encoded number to specify what is in the cell. The grid corresponds to the selected pixels, which are typically downsampled from the individual image sensors from the sensor array 852. In some implementations, the pixels form a 94×162 grid. In some implementations, the pixels are substantially square, but in other implementations, the pixels are rectangular, as depicted in the example in FIG. 30 (e.g., each pixel may correspond to an 8×12 group of image sensors).

As illustrated in FIG. 30, some of the grid cells have information that identifies the type of object believed to be in the cell. For example, the upper right grid cell 3006-2 is encoded with a "C" to indicate that it is believed to be part of a ceiling. In this example, there are several cells in a contiguous region 3008 that are believed to be part of a ceiling. Although the region 3008 is identified in the figure, implementations typically do not store a region definition with the grid 3002. Instead, the encoded individual cells, such as the cell 3006-2 provide the information.

Similarly, a group of cells including the cell 3006-3 are encoded with a "W," indicating that the cells are part of a probable window. The region 3010 includes these cells. Also, on the left is a group 3012 of cells that include the cell 3006-4, which is identified as a probable wall. In some implementations, an individual cell can be labeled with at most object type, but in other implementations, each cell can have two or more designations. For example, the dark region 1822 in FIG. 18D appears to be a window, but it is also part of a door. In some implementations, the designations of "door" and "window" are compatible, so both are included. In some implementations, when there are two or more designations (which are potentially incompatible), each of the designations has an associated probability.

Although the grid 3002 in FIG. 30 shows only probable designations of objects in the monitored scene, some implementations provide additional information with the grid cells. For example, in some implementations, each pixel has an associated IR and/or RGB image value. In some implementations, each grid cell 3006 includes the estimated depth from the computed depth map 876. In some implementations, the grid cells encode a computed depth edge map 944 as well, such as the depth map 944 in FIG. 20E. In general, whatever features are computed for individual pixels are stored in the grid 3002.

Some implementations provide zone correction, as illustrated in FIGS. 19A-19I and 26A-26C above. Some implementations address camera movement more generally, recognizing that there are both small moves (e.g., a bump) and large moves (e.g., taking the camera to a different room). In a small move, the camera sees substantially the same field of vision, as illustrated in FIG. 19F. In this case, an activity zone can generally be adjusted. In a large move, the camera sees a substantially different field of vision. The previously defined activity zone is now irrelevant to the current field of vision, so the zone should be discarded. Whether a small move or a large move, some implementations issue a camera move alert so that the user can take appropriate action. Some implementations use push notifications to alert the user of a camera move event, but other implementations use pull notifications, allowing the user to receive a camera move event only when requested. Some implementations support both push and pull notifications, and select the type based on the importance. For example, some implementations use push notifications when there is a detected motion event (e.g., a possible intruder), but use pull notifications for camera move events. Some implementations track the history of camera move events, and provide the user with access to that history. In some implementations, each camera move event has additional data that is stored. For example, some implementations store the model of the camera, the software or firmware version, the existing activity zones, an identifier for the camera when a household has more than one camera, one or more timestamps to indicate when the camera moved, the recommended action, and so on.

Figure 31A:
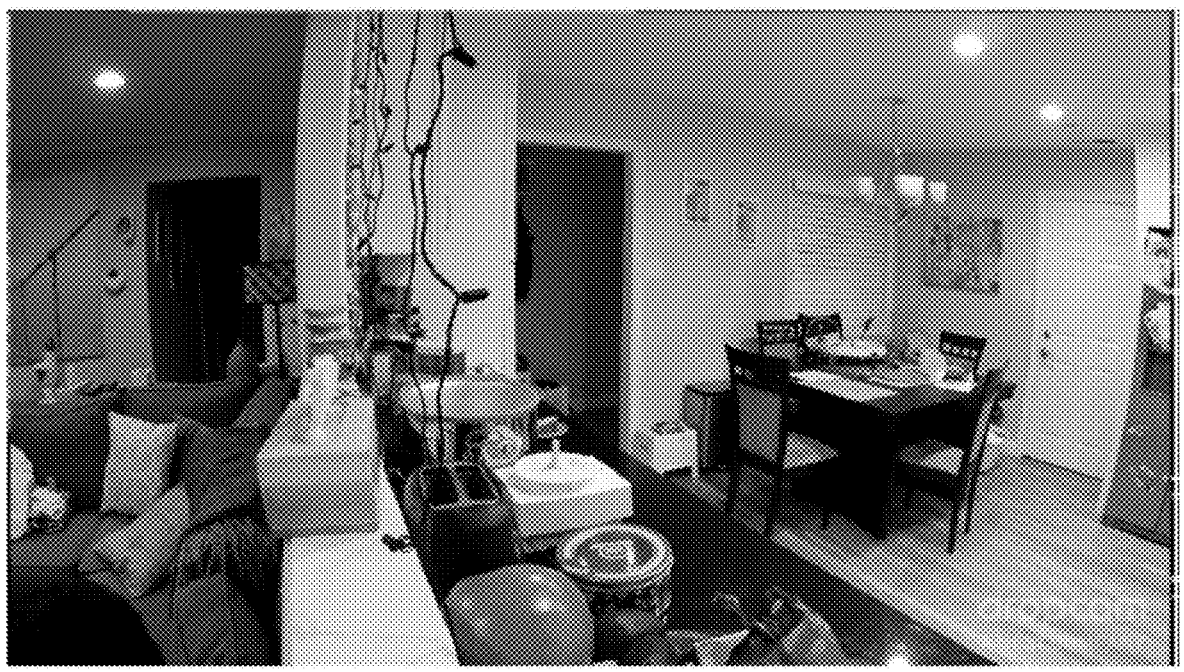
Figure 31B:
Figure 31D:

FIGS. 31A and 31B illustrate a camera that has moved slightly. Between the time of the image in FIG. 31A and the time of the image in FIG. 31B, the field of vision of the camera appears to have moved a little to the right and a little up. Using the techniques described above in FIGS. 19A-19I and 26A-26C, a recommended zone correction is determined. An alert or notification is then sent to the user, as illustrated in FIGS. 31C and 31D. In some instances, the notification is sent as an email. As indicated in FIG. 31C, the email message body indicates that the camera has moved, and identifies the zone. In this example, the zone has been previously labeled "Doorway From Kitchen" by the user. The notification message also includes the image in FIG. 31D. Superimposed on the image are the current zone 3102 (solid outline) and the recommended adjusted zone 3104 (dashed outline). In some implementations, the zones are outlined in color to make them more visible, using a color such as neon green. The message makes it easy for the user to accept the recommended zone adjustment (e.g., by clicking a link or button in the message).

Figure 31E:
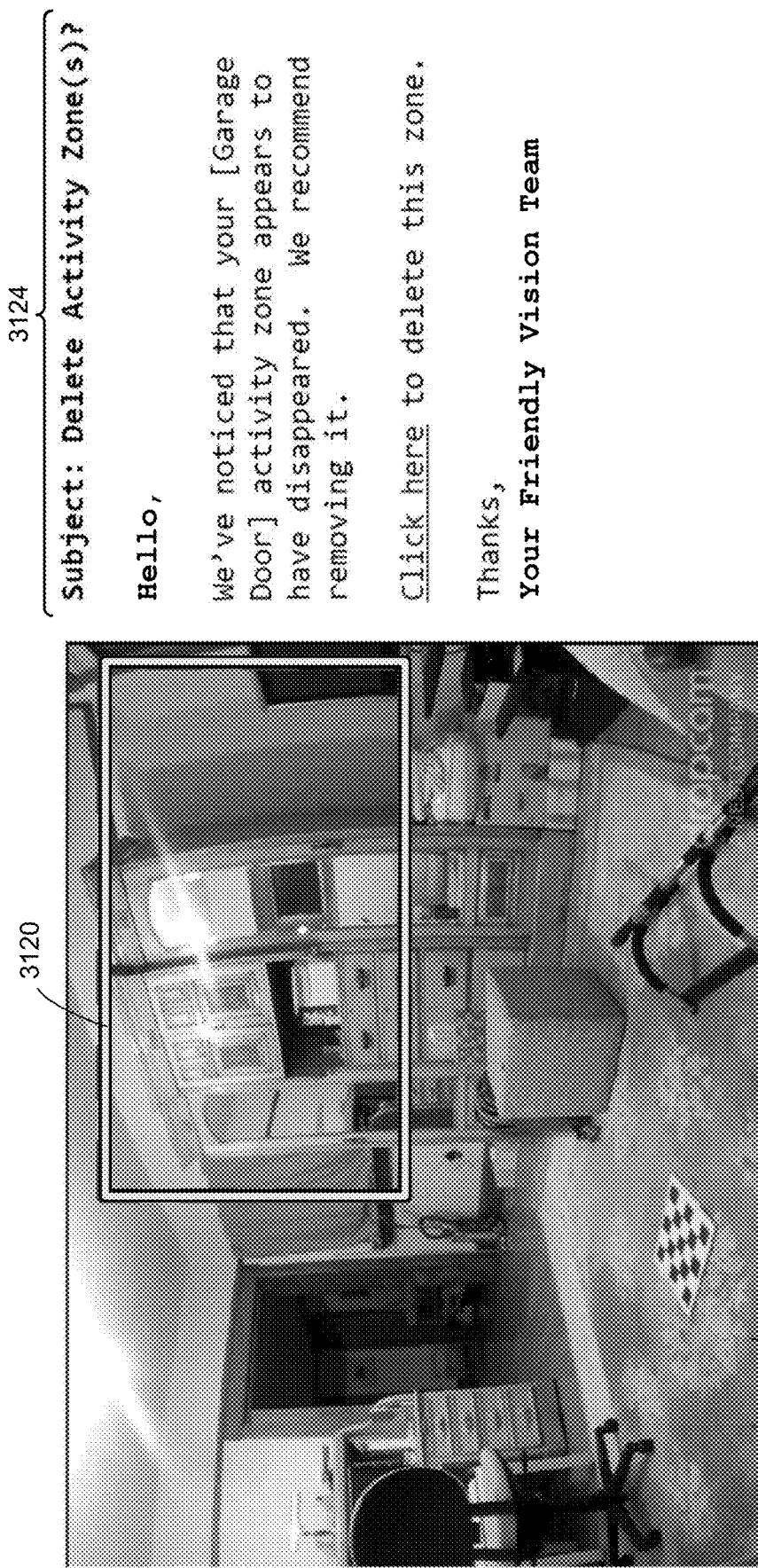

FIG. 31E illustrates a large move. Previously, the zone 3120 was identified as the "Garage Door," whereas it now appears to be in a family room or office. Using point cloud registration as described above with respect to FIGS. 19A-19I, the zone correction module 928 determines that the current point cloud is not a transformed version of the previous point cloud (the one having the garage door). Therefore, a notification message 3124 is sent to the user (e.g., by email, text message, or instant message). The message 3124 concisely points out the issue, and provides a simple way for the user to resolve the problem (e.g., delete the zone). The message 3124 also includes an image 3122 representing the current field of vision of the camera with the current zone 3120 identified. In this way the user can easily see the problem and resolve it quickly. If the user wants to create one or more replacement zones, the user can go into the application and create new zones.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that Personally Identifiable Information ("PII") is removed. For example, a user's identity may be treated so that no PII can be determined for the user, or a user's geographic location may be generalized where location information is obtained (such as to a city, ZIP code, or state level), so that a particular location of a user cannot be determined. Thus, the user may have control over how information is collected about the user and used by a content server.

It is to be appreciated that one or more implementations disclosed hereinabove is particularly advantageous for application in the home monitoring context, for which there are particular combinations of desirable goals including low cost hardware, very low device power (especially for battery-only devices), low device heating, nonintrusive device operation, ease of device installation and configuration, tolerance to intermittent network connectivity, low-maintenance or maintenance-free device operation, long device lifetimes, the ability to operate in a variety of different lighting conditions, and so forth, the home monitoring context further involving particular sets of expected target characteristics and/or constraints for which the preferred implementations may be particularly effective, such as the statistically prominent presence of certain target types (humans, pets, houseplants, ceilings, floors, furniture, doors, windows, household fixtures, various household items, etc.), the fact that the monitoring device is usually stationary relative to the monitored space, the fact that certain target types have certain expected ranges of sizes and characteristics (e.g., humans and pets have certain sizes and any movement is usually parallel to a floor or stairway; floors-ceilings-walls are also usually of certain size or height ranges and are stationary; doors-windows rotate or slide within expected ranges; furniture is usually stationary and has certain expected sizes), and so forth. However, it is to be appreciated that the scope of the present teachings is not so limited, with other implementations being applicable for the monitoring of other types of structures (e.g., multi-unit apartment buildings, hotels, retail stores, office buildings, industrial buildings) and/or to the monitoring of any other indoor or outdoor facility or space. It is to be still further appreciated that, while facility or space monitoring represents one particular advantageous application, the scope of the present teachings can further be applicable to any field in which automated machine characterizations of stationary or moving objects, facilities, environments, persons, animals, or vessels, are desired based on optical, ultraviolet, or infrared electromagnetic reflection or emission characteristics.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both user interfaces, but they are not the same user interface.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for generating depth maps, comprising:
in a camera having a plurality of illuminators, a lens assembly, an image sensing element, a processor, and memory, wherein the illuminators are configured to operate in a first mode to provide illumination using all of the illuminators, the lens assembly is configured to focus incident light on the image sensing element, the memory is configured to store one or more programs to control operation of the camera, for execution by the processor, the method comprising:
reconfiguring the plurality of illuminators to operate in a second mode wherein each of a plurality of subsets of the plurality of illuminators provides illumination of a scene separately, including, for each subset;
activating the illuminators in the subset without activating the illuminators not in the subset;
receiving reflected illumination from the illuminated scene incident on the lens assembly and focused onto the image sensing element;
measuring light intensity values of the received reflected illumination at the image sensing element; and
transmitting to a server the measured light intensity values for processing at the server.

2. The method of claim 1, further comprising storing to the memory the measured light intensity values associated with activation of the subset.

3. The method of claim 1, wherein differences in the measured light intensity values correlate with spatial depth of an object in the scene from which reflected light was received at the respective image sensor.

4. The method of claim 1, further comprising:
storing to the memory the measured light intensity values associated with activation of the subset;
capturing a baseline image while none of the illuminators are emitting light, wherein the captured baseline image measures ambient light intensity of the scene at each of the image sensors;
storing the captured baseline image to the memory; and
for each image sensor, subtracting the baseline intensity value from the stored intensity values for the respective image sensor to correct the stored intensity values for ambient light at the scene.

5. The method of claim 1, wherein the image sensors are partitioned into a plurality of pixels; and
for each pixel of the plurality of pixels:
using the captured IR images to form a respective vector of light intensity at the respective pixel; and
estimating a depth in the first scene at the respective pixel by looking up the respective vector in a respective lookup table.

6. The method of claim 5, wherein each respective lookup table includes a plurality of normalized IR light intensity vectors, each normalized light intensity vector corresponding to a respective depth in the first scene.

7. The method of claim 5, wherein the respective lookup table is downloaded to the camera from a remote server during an initialization process.

8. A camera system, comprising:
a plurality of illuminators;
a lens assembly;
an image sensing element;
a processor;
memory; and one or more programs to control operation of the camera system, stored in the memory and configured for execution by the processor;

wherein the illuminators are configured to operate in a first mode to provide illumination using all of the illuminators, the lens assembly is configured to focus incident light on the image sensing element, and the one or more programs are configured for:

reconfiguring the plurality of illuminators to operate in a second mode wherein each of a plurality of subsets of the plurality of illuminators provides illumination of a scene separately, including, for each subset;

activating the illuminators in the subset without activating the illuminators not in the subset;

receiving reflected illumination from the illuminated scene incident on the lens assembly and focused onto the image sensing element;

measuring light intensity values of the received reflected illumination at the image sensing element; and transmitting to a server the measured light intensity values for processing at the server.

9. The camera system of claim 8, wherein the image sensors are partitioned into a plurality of pixels; and for each pixel of the plurality of pixels the one or more programs are configured for:

using the captured IR images to form a respective vector of light intensity at the respective pixel; and estimating a depth in the first scene at the respective pixel by looking up the respective vector in a respective lookup table.

10. The camera system of claim 9, wherein looking up the respective vector in the respective lookup table comprises:

computing an inner product of the respective vector with records in the lookup table; and determining the depth in the first scene at the pixel as a depth corresponding to a record in the lookup table whose inner product with the respective vector is greatest among the computed inner products for the respective vector.

11. The camera system of claim 10, wherein computing an inner product of the respective vector with records in the lookup table comprises:

for each record in the respective lookup table, computing an inner product of the respective vector and the respective record.

12. The camera system of claim 10, wherein:

the respective vector for a respective pixel comprises a plurality of components, each of the components corresponding to a respective IR light intensity for the respective pixel for a respective captured IR image; and computing the inner product comprises computing a dot product.

13. A non-transitory computer readable storage medium storing one or more programs configured for execution by a camera system having a plurality of illuminators, a lens assembly, an image sensing element, a processor, and memory, wherein the illuminators are configured to operate in a first mode to provide illumination using all of the illuminators, the lens assembly is configured to focus incident light on the image sensing element, the memory is configured to store one or more programs to control operation of the camera, for execution by the processor, and the one or more programs comprise instructions for:

reconfiguring the plurality of illuminators to operate in a second mode wherein each of a plurality of subsets of the plurality of illuminators provides illumination of a scene separately, including, for each subset;

activating the illuminators in the subset without activating the illuminators not in the subset;

receiving reflected illumination from the illuminated scene incident on the lens assembly and focused onto the image sensing element;

measuring light intensity values of the received reflected illumination at the image sensing element; and transmitting to a server the measured light intensity values for processing at the server.

14. The non-transitory computer readable storage medium of claim 13, wherein each of the subsets of illuminators is configured at a different angle relative to the image sensing element.

15. The non-transitory computer readable storage medium of claim 13, wherein each of the subsets of illuminators highlights a different portion of the scene.

16. The non-transitory computer readable storage medium of claim 13, further comprising:

transmitting the measured light intensity values to a depth mapping module configured to estimate spatial depths of objects in the scene based on the measured light intensity values, predetermined illumination specifications of the illuminators, and response specifications of the image sensors.

17. The non-transitory computer readable storage medium of claim 13, wherein the illuminators are IR illuminators.

18. The non-transitory computer readable storage medium of claim 13, wherein the illuminators comprise 8 IR illuminators and each of the subsets of the illuminators comprises two adjacent IR illuminators.

19. The non-transitory computer readable storage medium of claim 13, wherein the image sensing element is a 2-dimensional array of image sensors.

20. The non-transitory computer readable storage medium of claim 19, wherein the image sensors are partitioned into a plurality of pixels; and for each pixel of the plurality of pixels:

using the captured IR images to form a respective vector of light intensity at the respective pixel; and estimating a depth in the first scene at the respective pixel by looking up the respective vector in a respective lookup table.

* * * * *